United States Patent
Pabla et al.

(10) Patent No.: US 7,783,777 B1
(45) Date of Patent: Aug. 24, 2010

(54) PEER-TO-PEER CONTENT SHARING/DISTRIBUTION NETWORKS

(75) Inventors: Kuldipsingh A. Pabla, Santa Clara, CA (US); Steven Waterhouse, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 1305 days.

(21) Appl. No.: 10/657,976

(22) Filed: Sep. 9, 2003

(51) Int. Cl.
*G06F 15/173* (2006.01)
(52) U.S. Cl. .................. 709/238; 709/239; 709/242; 709/243
(58) Field of Classification Search .............. 709/238, 709/239, 242, 243
See application file for complete search history.

(56) References Cited

U.S. PATENT DOCUMENTS

| | | | |
|---|---|---|---|
| 2002/0062310 A1* | 5/2002 | Marmor et al. ............... 707/3 |
| 2002/0065919 A1* | 5/2002 | Taylor et al. ............... 709/226 |
| 2002/0107982 A1* | 8/2002 | Teodosiu et al. ........... 709/245 |
| 2003/0074403 A1* | 4/2003 | Harrow et al. ............. 709/203 |
| 2003/0217139 A1* | 11/2003 | Burbeck et al. ............ 709/224 |
| 2003/0233455 A1* | 12/2003 | Leber et al. .............. 709/226 |
| 2004/0122903 A1* | 6/2004 | Saulpaugh et al. ......... 709/206 |
| 2004/0260701 A1* | 12/2004 | Lehikoinen et al. ........ 707/10 |

OTHER PUBLICATIONS

Krishnan. The JXTA solution to P2P. Javaworld. 12 pages. 2001.*
Gong, Project JXTA: A Technology Overview. 2001.*
Maibaum et al. JXTA: A Technology Facilitating Mobile Peer-To-Peer Networks. IEEE. 2002.*
Saroiu et al., "A Measurement Study of Peer-to-Peer File Sharing Systems," Technical Report #UW-CSE-01-06-02, Department of Computer Science & Engineering, University of Washington, Jan. 6, 2002, (15 Pages).

* cited by examiner

*Primary Examiner*—Thu Nguyen
*Assistant Examiner*—Hieu Hoang
(74) *Attorney, Agent, or Firm*—Robert C Kowert; Meyertons, Hood, Kivlin, Kowert & Goetzel, P.C.

(57) ABSTRACT

Embodiments of a peer-to-peer-based content sharing/distribution network (CDN). In embodiments, some peers are content publishers while other peers are content consumers. When a consumer peer gets content from a content publisher, the consumer peer may become a content publisher that may be accessed by other peers. If a peer desires a particular content, the peer may get the content from a nearby content publisher, saving access to a central server. The more a content is in demand, the more likely it is to be replicated, and hence more likely to be found by consumer peers on nearby content publisher peers. If a content publisher peer does not have all of a requested content, the requesting peer may be redirected to another content publisher peer to obtain the missing content. Embodiments may be implemented in peer-to-peer networks implemented according to a peer-to-peer platform.

23 Claims, 30 Drawing Sheets

| UUID 170 | Length of Remainder 172 | Name 174 |
|---|---|---|

FIG. 3

| Element Name (A String) | Element Value Type |
|---|---|
| Name | <String> |
| Keywords | <String> |
| Properties | <Properties> |
| Service | <Service Advertisement[]> (an array) |
| Endpoint | <Endpoint Advertisement[]> (an array) |

FIG. 6

| Element Name (A String) | Element Value Type |
|---|---|
| Name | <String> |
| Keywords | <String> |
| GroupID | <ID> |
| PeerID | <ID> |
| Service | <Service Advertisement[]> (an array) |

FIG. 7

| Element Name (A String) | Element Value Type |
|---|---|
| Name | <String> |
| Identifier | <ID> |
| Type | <String> |

FIG. 8

| Element Name (A String) | Element Value Type |
|---|---|
| Name | <String> |
| Keywords | <String> |
| Identifier | <ID> |
| Version | <String> |
| Pipe | <PipeAdvertisement> |
| Params | <String> |
| URI | <String> |
| Provider | <String> |
| Access Method | <Method[]> (an array) |

FIG. 9

| Element Name (A String) | Element Value Type |
|---|---|
| Mime-Type (Optional) | <String> |
| Size | Long |
| Encoding | <String> |
| ContentID | <ID> |
| RefID (Optional) | <ID> |
| Document | <Document> |

FIG. 10

| Element Name (A String) | Element Value Type |
|---|---|
| Name | <String> |
| Keywords | <String> |
| Address | <String> |
| Transport | <Transport Advertisement> |

PEER-TO-PEER CONTENT SHARING/DISTRIBUTION NETWORKS

BACKGROUND OF THE INVENTION

1. Field of the Invention

This invention relates to peer-to-peer networking, and more particularly to content sharing and distribution in peer-to-peer networks.

2. Description of the Related Art

The Internet has three valuable fundamental assets—information, bandwidth, and computing resources—all of which are vastly underutilized, partly due to the traditional client-server computing model. No single search engine or portal can locate and catalog the ever-increasing amount of information on the Web in a timely way. Moreover, a huge amount of information is transient and not subject to capture by techniques such as Web crawling. For example, research has estimated that the world produces two exabytes or about $2 \times 10^{18}$ bytes of information every year, but only publishes about 300 terabytes or about $3 \times 10^{12}$ bytes. In other words, for every megabyte of information produced, only one byte is published. Moreover, Google claims that it searches about only $1.3 \times 10^{\wedge}8$ web pages. Thus, finding useful information in real time is increasingly difficult.

Although miles of new fiber have been installed, the new bandwidth gets little use if everyone goes to one site for content and to another site for auctions. Instead, hot spots just get hotter while cold pipes remain cold. This is partly why most people still feel the congestion over the Internet while a single fiber's bandwidth has increased by a factor of $10^{\wedge}6$ since 1975, doubling every 16 months.

New processors and storage devices continue to break records in speed and capacity, supporting more powerful end devices throughout the network. However, computation continues to accumulate around data centers, which have to increase their workloads at a crippling pace, thus putting immense pressure on space and power consumption.

Finally, computer users in general are accustomed to computer systems that are deterministic and synchronous in nature, and think of such a structure as the norm. For example, when a browser issues a URL (Uniform Resource Locator) request for a Web page, the output is typically expected to appear shortly afterwards. It is also typically expected that everyone around the world will be able to retrieve the same page from the same Web server using the same URL.

The term peer-to-peer networking or computing (often referred to as P2P) may be applied to a wide range of technologies that greatly increase the utilization of information, bandwidth, and computing resources in the Internet. Frequently, these P2P technologies adopt a network-based computing style that neither excludes nor inherently depends on centralized control points. Apart from improving the performance of information discovery, content delivery, and information processing, such a style also can enhance the overall reliability and fault-tolerance of computing systems.

FIGS. 1A and 1B are examples illustrating the peer-to-peer model. FIG. 1A shows two peer devices 104A and 104B that are currently connected. Either of the two peer devices 104 may serve as a client of or a server to the other device. FIG. 1B shows several peer devices 104 connected over the network 106 in a peer group. In the peer group, any of the peer devices 104 may serve as a client of or a server to any of the other devices.

In the client-server model, content may be published on a server for user (client) access. Content publishing in the client-server model may encounter problems related to one or more of, but not limited to:

- how powerful the server is
- how many servers are required
- how are the servers configured and connected
- server load
- load balancing between the servers
- where the servers are located
- bandwidth and latency Content publishing in the client-server model may also be affected by changes in demand patterns. As examples, at certain times of the day, a server may be heavily loaded due to an increased number of clients, or particular items of content (e.g. a streaming movie) may become popular, resulting in increased demand. Changes in demand may result in scaling problems. A server may not be able to efficiently handle peak load periods, potentially resulting in poor performance from the clients' perspective. However, fluctuating demand may not justify investing in servers that are more powerful and/or additional servers.

Client/server content sharing/distribution networks (CDNs) may help address some of the problems encountered with client/server content distribution. CDNs are third party networks that a content distributor can lease. CDNs replicate contents within the network, pushing contents to the edges of the Internet. Content distribution may be controlled by a central authority to meet the demand over time and region. From the user's perspective, the contents come from the content distributor. In a Client/Server CDN, it is the server that is the primary content publisher/distributor.

For example, if a user is interested in a popular video stream, the user may use a search engine (e.g. google.com or yahoo.com) to search for the video stream. The search engine may locate the video stream on a server of the content distributor. In the process of accessing the video stream, a CDN may redirect the user to a server closest to the origin of request (an edge server) and the user then may get the feed/content from this server, while to the user it appears that the content came from the content distributor.

This model works as long as the contents are strategically distributed physically close to potential users/client systems. When there is a content miss, i.e. content is not found on an edge server close to the user, the model fails. In this case, either the user is redirected to the actual source of the content (a central server), or the edge server contacts the actual source of the content, gets the content, potentially caches the content, and serves the user. In both of these scenarios, access from the actual source of the content (the central server) cannot be avoided, potentially resulting in overloading of the central server. The user experience may suffer due to delays in accessing the content. This may be particularly true if the desired content is an audio or video stream. The user experience may be particularly poor if the user happens to be far on the network from the central server and/or if there is a relatively slow network connection between the user (client system) and the central server.

SUMMARY OF THE INVENTION

Embodiments of a peer-to-peer-based content sharing/distribution network (CDN) are described. In embodiments, some peers may be content publishers while other peers may be content consumers. When a consumer peer downloads from a peer serving as a primary source of content (a content publisher), the consumer peer may become a secondary source of content (a content publisher) that may be accessed by another consumer peer, and so on. In this way, content may replicate on the network in proportion to its popularity. The more a content is in demand, the more likely it is to be replicated, and hence more likely to be found by consumer peers on nearby content publisher peers. In peer-to-peer CDNs, if an edge peer requires or desires a particular content, the edge peer may get the content from a nearby peer acting as a content publisher, thus saving access to a central server. In the peer-to-peer CDN model, an edge peer (or any peer) may be a primary content publisher/distributor, thus providing freedom for anyone to publish and distribute contents rather than just servers.

Some embodiments of the peer-to-peer CDN may be implemented in peer-to-peer networks implemented according to a peer-to-peer platform. In one embodiment, the peer nodes may participate in a peer-to-peer networking environment implemented in accordance with one or more peer-to-peer platform protocols for enabling peer nodes to discover each other, communicate with each other, and cooperate with each other to form peer groups and share network resources in the peer-to-peer environment.

In one embodiment, one or more peers (e.g. edge peers, edge content publishers and primary content publishers) may form a peer group. Contents may be published on the peer-to-peer network, for example using advertisements of a peer-to-peer platform. The advertisements may be referred to as content metadata. The edge peers and edge content publishers may cache contents and content metadata. In one embodiment, caching of contents and content metadata may be performed using a content management service of the peer-to-peer platform.

A peer (e.g. an edge peer) may query for desired content. A nearby peer caching the content may respond to the query by providing the content to the querying peer. In one embodiment, the nearby peer is preferably the closest peer on the network to the querying peer. In one embodiment, the edge peer may discover one or more advertisements for the content through the query, and may then connect and communicate with the nearby peer according to connection information provided in the advertisement. In one embodiment, a communication channel mechanism of the peer-to-peer platform may be used to connect and communicate with the nearby peer to receive the content. In one embodiment, the querying peer may then cache the received content, and then may itself perform as an edge content publisher for the content. In one embodiment, other peers that desire to access the contents may themselves become members of the peer group.

In one embodiment, one or more of edge content publishers and primary content publishers may form peer groups. The edge content publishers may cache contents and content metadata. An edge content publisher may receive contents from one or more primary content publishers. If the edge content publisher determines that it is missing content, the edge content publisher may query for the missing content. Rather than receiving the missing content from a primary content publisher that may not be nearby on the network, the missing data may be received from a nearby peer on the network.

In one embodiment, a peer may query another peer for content. The other peer may provide a portion of the requested content to the querying peer and may redirect the querying to another, nearby peer for the rest of the content, for example by sending an advertisement for the contents on the nearby peer to the querying peer. The querying peer may then communicate with one or more other nearby peers to receive the rest of the contents not provided by the other peer.

BRIEF DESCRIPTION OF THE DRAWINGS

FIG. 3 illustrates an exemplary content identifier according to one embodiment;

FIG. 6 illustrates the content of a peer advertisement according to one embodiment;

FIG. 7 illustrates the content of a peer group advertisement according to one embodiment;

FIG. 8 illustrates the content of a pipe advertisement according to one embodiment;

FIG. 9 illustrates the content of a service advertisement according to one embodiment;

FIG. 10 illustrates the content of a content advertisement according to one embodiment;

FIG. 11 illustrates the content of an endpoint advertisement according to one embodiment;

Figure 1A:
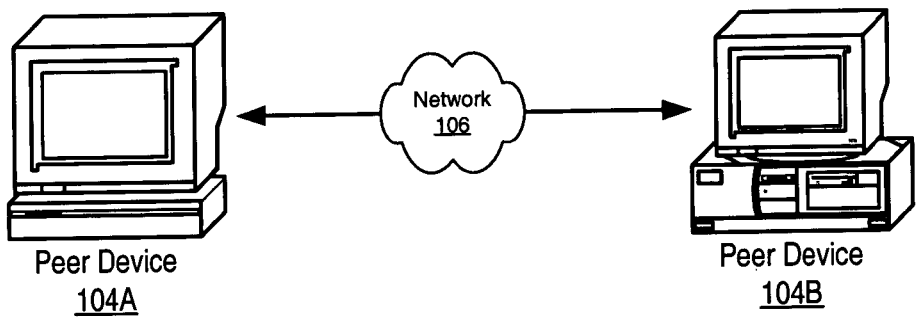
FIG. 1A illustrates a prior art example of two devices that are currently connected as peers.
Figure 1B:
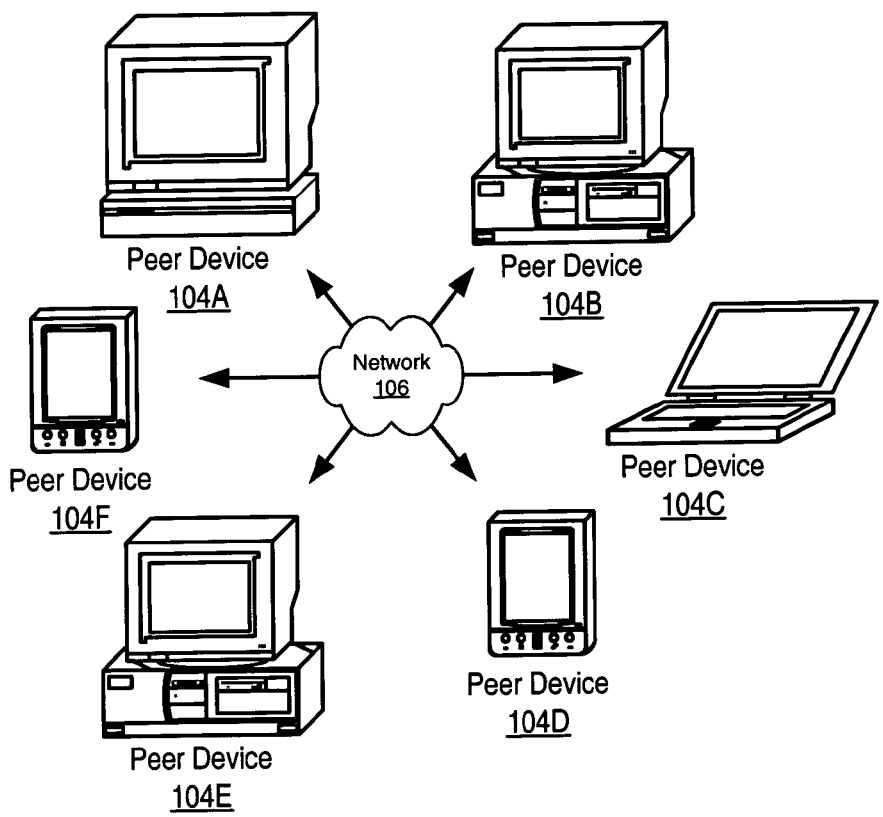
FIG. 1B illustrates a prior art example of several peer devices connected over the network in a peer group.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a peer-to-peer-based content sharing/distribution network (CDN) are described. Embodiments may be used to distribute content to the edges of a network and/or the Internet. In addition, embodiments may be used to distribute content within an Intranet and/or on a proprietary network, e.g. a network of Set Top Boxes. In embodiments of a peer-to-peer CDN, content consumers may also serve as content publishers, as the content publishers and consumers are peers in the peer-to-peer network. Thus, embodiments may serve contents to and from the edge of the network or Internet. Embodiments preferably provide an economic solution to the problems of prior art client/server content distribution models. In the Client/Server CDN model, it is the server that is the primary content publisher/distributor. In the peer-to-peer CDN model, an edge peer (or any peer) may be a primary content publisher/distributor, thus providing freedom for anyone to publish and distribute contents rather than just servers.

A content may be any computer content (e.g. code, data, applications, active content such as services, or other collection of computer-representable resources). Examples of content may include, but are not limited to, a text file, a structured document (e.g. a PDF or a XML file), a Java ".jar" or loadable library, code or even an executable process (checkpointed state). No size limitation is assumed.

In embodiments of a peer-to-peer CDN, some peers are content publishers while other peers are content consumers. When a consumer peer downloads from a peer serving as a primary source of content (a content publisher), the consumer peer may become a secondary source of content (a content publisher) that may be accessed by another consumer peer, and so on. In this way, content may replicate on the network in proportion to its popularity. The more a content is in demand, the more likely it is to be replicated, and hence more likely to be found by consumer peers on nearby content publisher peers. Unlike prior art client/server CDNs, peer-to-peer CDNs tend to have peers as content publishers of a particular content in regions of the network where the demand for the content is high.

For the purpose of this document, a "nearby peer" may be considered a logically nearby peer. A logically nearby peer is a peer that may respond as fast as or faster than other peers, but that may or may not be physically nearby or physically closer than at least some other peers. A physically nearby peer is a peer in close physical proximity. However, a physically nearby peer may or may not be logically nearby. In summary, a nearby peer may be considered a peer that is logically nearby which may or may not be physically nearby.

This adaptive property of peer-to-peer CDNs preferably provides economical solutions for content distribution in networks. Since, in a peer-to-peer CDN, there is no central or master server, there is no need for powerful, expensive hardware to host the server. In peer-to-peer CDNs, if an edge peer misses a content, the edge peer does not need to access a central server (that is potentially far away) to get the content. Instead, the edge peer may get the content from a nearby peer acting as a content publisher, thus saving access to a central server, and preferably helping to prevent the bottlenecks that may result from overloading of a central server. Since the time to access content from a nearby peer is typically less than the time to access contents from a central server that is potentially far away on the network, the user experience in a peer-to-peer CDN is preferably improved over the user experience in typical prior art client-server content distribution models. In addition, there is preferably a higher probability of finding content in a peer-to-peer CDN than in typical prior art client-server content distribution models.

Embodiments of the peer-to-peer CDN may move contents closer to the edges of networks. Embodiments may provide intelligent replication of contents. Embodiments may allow peers to discover and adapt to new content sources. Through the adaptive nature of the architecture, embodiments may provide load balancing of content distribution by disseminating contents to peers in regions of the network where demand is high and allowing consumer peers to obtain content from nearby peers rather than a central server.

As an example of using peer-to-peer CDNs, if a first user on a first peer is looking for a newly released content such as a movie clip, the first user may not find the content on a local peer. The first user may access the source of the content on a peer that is a primary source, the original content publisher. The first user's experience may depend on various factors such as bandwidth, location etc. The first peer may cache a portion or all of the content obtained from the primary source peer. If a second user on a second peer subsequently looks for the same content, the second peer may obtain the content from the primary source peer, from the first peer, or a portion of the content from both peers. As a result, the second user's experience may be better than the first user's. Again, the second peer may cache a portion or all of the content. A third user on a third peer may get the same content from the primary source peer, the first peer, and/or the second peer. As more peers cache the same content, the probability of finding the content on a nearby peer goes up, preferably resulting in better user experience.

In one embodiment, a content provider may use a peer-to-peer CDN to distribute digital rights along with the contents. In this embodiment, when a content is replicated, so are its digital rights. When a secondary user tries to access the content, rights associated with the content may either prohibit the user or may ask the user (programmatically) to register to access the content and/or to purchase the content, if required.

Some embodiments of the peer-to-peer CDN may be implemented in peer-to-peer networks implemented according to a peer-to-peer platform such as the exemplary peer-to-peer platform described below.

In one embodiment, one or more of edge peers, edge content publishers and primary content publishers (i.e. a content publisher that is the primary source of the content) may form peer groups. Note that the edge content publishers and primary content publishers are also peers. In one embodiment, the peers may participate in a peer-to-peer network according to a peer-to-peer platform such as the exemplary peer-to-peer platform described below, and the peer groups may be formed in accordance with the peer-to-peer platform. Contents may be published on the peer-to-peer network, for example using advertisements of a peer-to-peer platform such as the exemplary peer-to-peer platform. The advertisements may be considered content metadata. The edge peers and edge content publishers may cache contents and content metadata. In one embodiment, caching of contents and content metadata may be performed using a content management service of the peer-to-peer platform.

An edge peer may query for desired content. In one embodiment, querying for content may be performed using messages of a query mechanism of a peer-to-peer platform such as the exemplary peer-to-peer platform described below. A nearby peer caching the content may respond to the query by providing the content to the querying peer. In one embodiment, the nearby peer is preferably the closest peer on the network (i.e. logically closest; not necessarily physically closest) to the querying peer. In one embodiment, distance in a peer-to-peer network may be at least partially a function of the number of jumps or interconnections between two peers on the network. In one embodiment, the edge peer may discover one or more advertisements for the content through the query, for example using a discovery mechanism of a peer-to-peer platform such as the exemplary peer-to-peer platform described below, and may then connect and communicate with the nearby peer according to connection information provided in the advertisement. In one embodiment, a communication channel mechanism, such as the pipes of the exemplary peer-to-peer platform described below, may be used to connect and communicate with the nearby peer to receive the content. In one embodiment, the querying peer may then cache the received content and then may itself perform as an edge content publisher for the content. In one embodiment, other peers that desire to access the contents may themselves become members of the peer group.

In one embodiment, one or more of edge content publishers and primary content publishers may form peer groups. The edge content publishers may cache contents and content metadata (e.g. advertisements). An edge content publisher may receive contents from one or more primary content publishers. If the edge content publisher determines that it is missing content (e.g. content needed to fulfill a query for content from another peer), the edge content publisher may query for the missing content. Rather than receiving the missing content from a primary content publisher that may not be nearby on the network, the missing data may be received from a nearby peer on the network.

In one embodiment, a peer (e.g. an edge content publisher) may query another peer (e.g. a primary content publisher or edge content publisher) for contents. The other peer may provide a portion of the requested contents to the querying peer and may redirect the querying to another, nearby peer for the rest of the contents, for example by sending an advertisement for the contents on the nearby peer to the querying peer. The querying peer may then communicate with one or more other nearby peers to receive the rest of the contents not provided by the other peer.

Figure 34A:
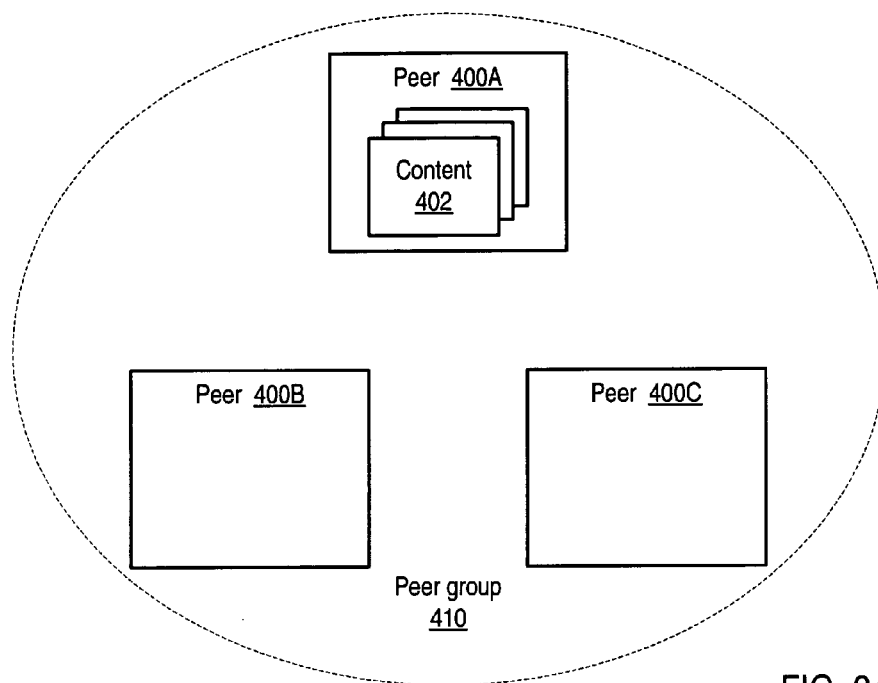
FIGS. 34A and 34B illustrate content distribution in a peer-to-peer CDN according to one embodiment.
Figure 34B:
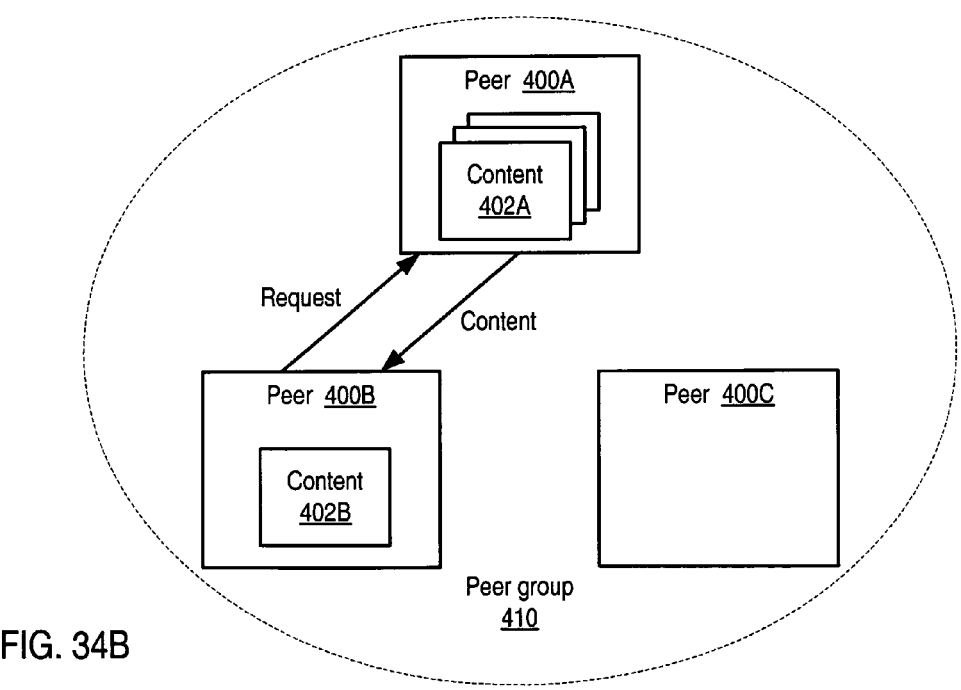

FIGS. 34A and 34B illustrate content distribution in a peer-to-peer CDN according to one embodiment. In FIG. 34A, peer 400A may be a primary content publisher for content 402. Peer 400A may form a peer group 410 with one or more other peers 400, such as peers 400B and 400C, for content distribution. In one embodiment, the peers 400 may participate in a peer-to-peer network according to a peer-to-peer platform such as the exemplary peer-to-peer platform described below, and the peer group 410 may be formed in accordance with the peer-to-peer platform. Content 402 may be advertised on the peer-to-peer network, for example using advertisements of a peer-to-peer platform such as the exemplary peer-to-peer platform.

As illustrated in FIG. 34B, peer 400B may request at least a portion of content 402 and then may receive the requested content from peer 400A. Peer 400B may cache the received content as content 402B. Peer 400B may then serve as an edge content publisher for content 402B in peer group 410.

Figure 35:
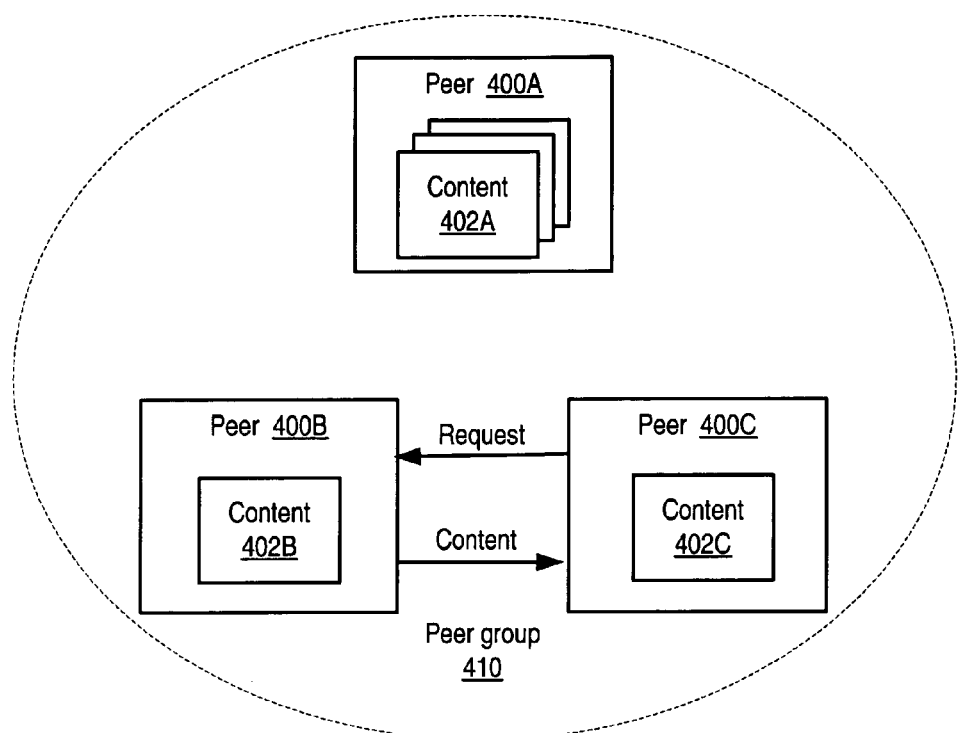
FIG. 35 illustrates an edge peer querying for and receiving content according to one embodiment.

FIG. 35 illustrates an edge peer querying for and receiving content according to one embodiment. In one embodiment, querying for content may be performed using messages of a query mechanism of a peer-to-peer platform such as the exemplary peer-to-peer platform described below. In this example, peer 400C may be an edge peer in peer group 410 and may initiate a query for desired content. Peer 400B may be the nearest peer that caches the content, and so peer 400C may receive the requested content from peer 400B. Peer 400B may cache the received content as content 402C. Peer 400B may then serve as an edge content publisher for content 402C in peer group 410. In one embodiment, peer 400C may discover one or more advertisements for the content through the query, for example using a discovery mechanism of a peer-to-peer platform such as the exemplary peer-to-peer platform described below, and may then connect and communicate with peer 400B according to connection information provided in an advertisement for the content on peer 400B. In one embodiment, a communication channel mechanism, such as the pipes of the exemplary peer-to-peer platform described below, may be used to connect and communicate with peer 400B to receive the content.

Figure 36:
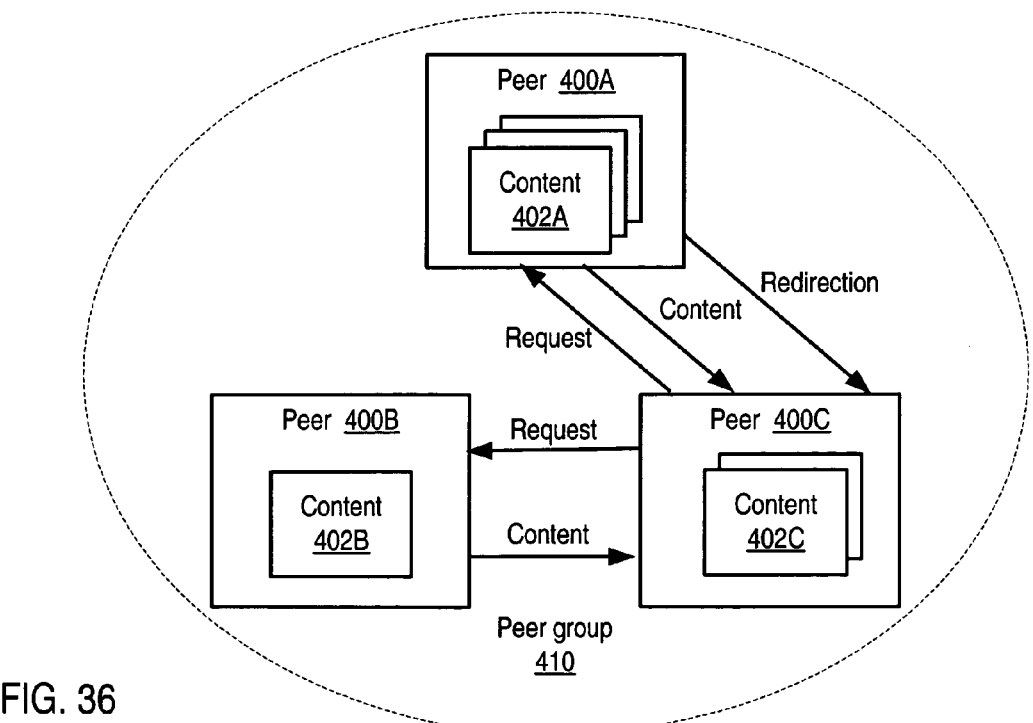
FIG. 36 illustrates redirection for an edge peer querying for and receiving content according to one embodiment.

FIG. 36 illustrates redirection for an edge peer querying for and receiving content according to one embodiment. Peer 400C may be, for example, an edge content publisher in peer group 410. Peer 400C may query for a desired content. Peer 400A, for example a primary content publisher, may respond to the query by providing a portion of the requested content from content 402A. Peer 400A may also provide redirection to peer 400C for the remainder of the content that redirects peer 400C to one or more other peers in peer group 410 that serve the missing content. Peer 400C may then request and receive the missing content from one or more of the other peers that serve the missing content, in this example peer 400B. Peer 400C may then cache the content received from peers 400A and 400B as content 402C.

Figure 37:
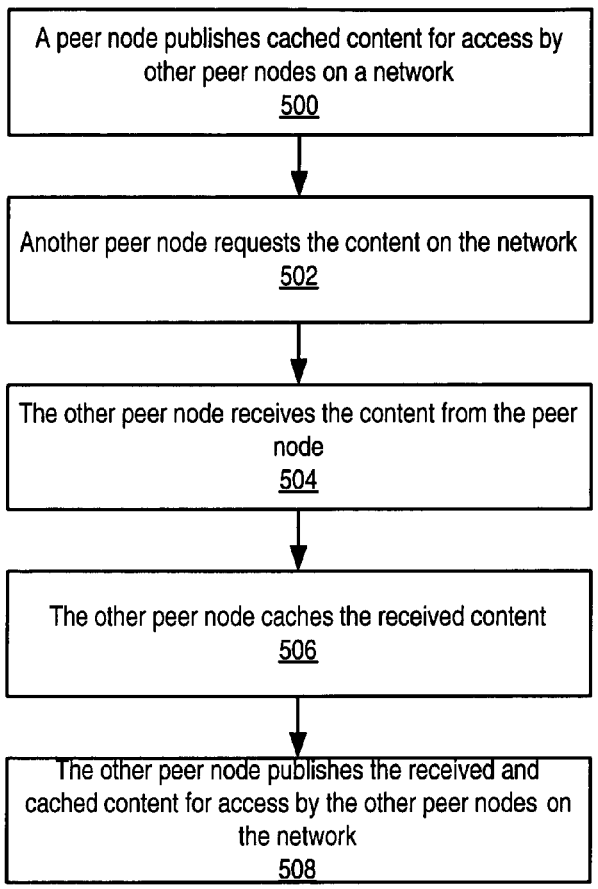
FIG. 37 is a flowchart of a method for distributing content in a peer-to-peer CDN according to one embodiment.

FIG. 37 is a flowchart of a method for distributing content in a peer-to-peer CDN according to one embodiment. As indicated at 500, a peer node may publish cached content for access by other peer nodes on a network. In one embodiment, the peer node may be a primary content publishing peer node. As indicated at 502, another peer node may request the content on the network. As indicated at 504, the other peer node may receive the content from the peer node. In one embodiment, the other peer node may broadcast a query for the content on the network, and may receive one or more advertisements for the content from one or more other peer nodes, including an advertisement for the content on the peer node. The requesting peer node may then access the peer node to get the requested content according to connection information in the advertisement. As indicated at 506, the other peer node may cache the received content. As indicated at 508, the other peer node may then publish the received and cached content for access by other peer nodes on the network. In one embodiment, the other peer node may be an edge content publisher.

In one embodiment, the peer nodes may be member peers in a peer group. In one embodiment, the peer nodes may participate in a peer-to-peer networking environment implemented in accordance with one or more peer-to-peer platform protocols for enabling peer nodes to discover each other, communicate with each other, and cooperate with each other to form peer groups and share network resources in the peer-to-peer environment.

Figure 38:
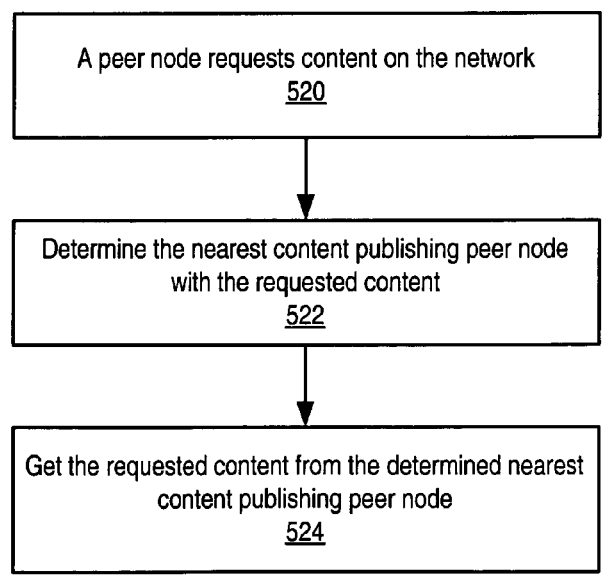
FIG. 38 is a flowchart of a method for locating and obtaining nearby content in a peer-to-peer CDN according to one embodiment.

FIG. 38 is a flowchart of a method for locating and obtaining nearby content in a peer-to-peer CDN according to one embodiment. As indicated at 520, a peer node may request a particular content on the network. As indicated at 522, the nearest content publishing peer node with the requested content may be determined. In one embodiment, the requesting peer node may receive two or more responses (e.g. advertisements) to the request for the content, and may determine from these responses the nearest content publishing peer node with the requested content. The peer node may then get the requested content from the determined nearest content publishing peer node. For example, if the two peer nodes discussed in FIG. 37 respond to the request, the nearest of the two peer nodes may be determined. If the other peer node (the edge content publisher) is nearer to the requesting peer node on the network than the peer node (the primary content peer node), the requesting peer node may receive the content from the edge content publisher. If the peer node (the primary content peer node) is nearer to the requesting peer node on the network than the other peer node (the edge content publisher), the requesting peer node may receive the content from the primary content peer node. After receiving the requested content, the requesting peer node may cache and publish the content for access by other peer nodes on the network. Thus, the requesting peer node may itself become a content publishing peer node for the requested content. In one embodiment, the requesting peer node may be an edge peer node.

In one embodiment, the peer nodes may be member peers in a peer group. In one embodiment, the peer nodes may participate in a peer-to-peer networking environment implemented in accordance with one or more peer-to-peer platform protocols for enabling peer nodes to discover each other, communicate with each other, and cooperate with each other to form peer groups and share network resources in the peer-to-peer environment.

Figure 39:
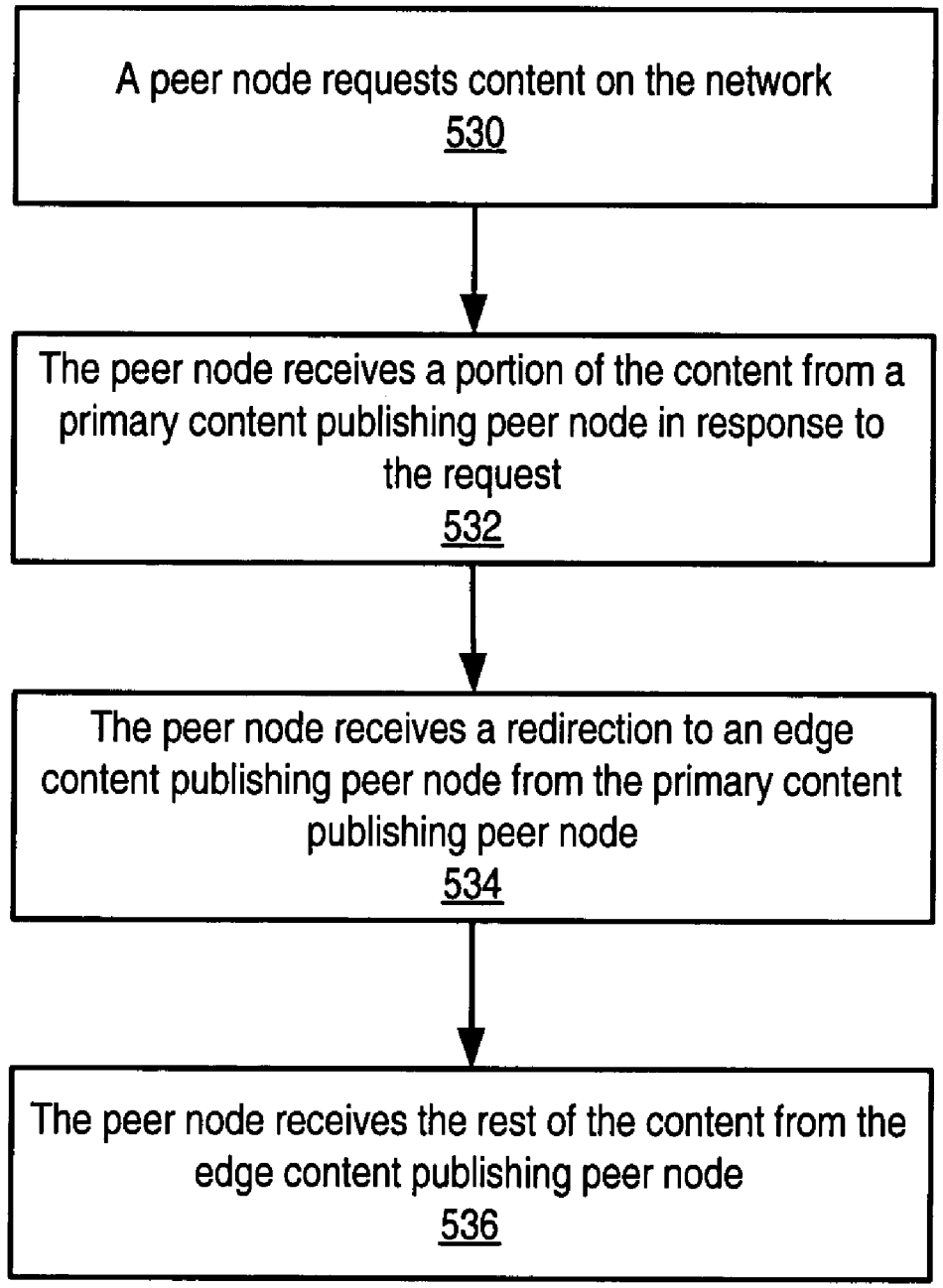
FIG. 39 is a flowchart of a method for locating and obtaining content in a peer-to-peer CDN according to one embodiment.

FIG. 39 is a flowchart of a method for locating and obtaining content in a peer-to-peer CDN according to one embodiment. In one embodiment, portions of a content may be distributed on two or more content publishing peer nodes. As indicated at 530, a peer node may request a particular content on the network. As indicated at 532, the peer node may receive a portion of the content from the primary content publishing peer node in response to the request. As indicated at 534, the primary content publishing peer node may also send redirection information to the requesting peer node indicating one or more other content publishing peer nodes that cache other portions of the requested content. In this example, the peer node receives a redirection to an edge content publishing peer node from the primary content publishing peer node. In one embodiment, the redirection information may be an advertisement for the content portion on the other content publishing peer node. As indicated at 536, the peer node may then get the rest of the content from the edge content publishing peer node indicated by the redirection.

In one embodiment, the peer nodes may be member peers in a peer group. In one embodiment, the peer nodes may participate in a peer-to-peer networking environment implemented in accordance with one or more peer-to-peer platform protocols for enabling peer nodes to discover each other, communicate with each other, and cooperate with each other to form peer groups and share network resources in the peer-to-peer environment.

Peer-to-Peer Platform

The following is a description of an open network computing platform designed for peer-to-peer computing in which embodiments of . . . may be implemented. It is noted that this description is included for exemplary purposes and that embodiments of . . . as described herein may be used with other peer-to-peer platforms and protocols.

Embodiments of an open network computing platform designed for peer-to-peer computing are described. The network computing platform may be referred to as a peer-to-peer platform. The peer-to-peer platform may be used to build a wide range of distributed services and applications in which every device is addressable as a peer, and where peers can bridge from one domain into another. The peer-to-peer platform may enable developers to focus on their own application development while easily creating distributed computing software that is flexible, interoperable, and available on any peer on the expanded Web. The peer-to-peer platform may enable software developers to deploy interoperable services and content, further spring-boarding the peer-to-peer revolution on the Internet. The peer-to-peer platform addresses the problems of prior art peer-to-peer systems by providing a generic and service-agnostic peer-to-peer platform that may be preferably defined by a small number of protocols. Each protocol is preferably easy to implement and easy to be adopted into peer-to-peer services and applications. Thus, service offerings from one vendor may be used, perhaps transparently, by the user community of another vendor's system.

The peer-to-peer platform extends P2P computing to enable a wide range of distributed computing applications and overcome the limitations typically found in prior art P2P applications. The peer-to-peer platform is a network computing technology that provides a set of simple, small, and flexible mechanisms that can support P2P computing on any platform, anywhere, and at any time. The peer-to-peer platform generalizes P2P functionality and provides core technology that addresses the limitations of prior art P2P computing technologies.

The peer-to-peer platform is a modular platform that provides simple and essential building blocks for developing a wide range of distributed services and applications. The peer-to-peer platform specifies a set of protocols rather than an API. Thus, the peer-to-peer platform can be implemented in any language on any Operating System to provide solutions ranging from providing a simple protocol-based wrapper that enables a small device to join a network of peers to developing a fully integrated application that supports metering, monitoring, high-level security and communication across server-class systems.

In one embodiment, the peer-to-peer platform architecture may include, but is not limited to, protocols, advertisements, and core services. Network protocol bindings may be used to preferably ensure interoperability with existing content transfer protocols, network transports, routers, and firewalls. The peer-to-peer platform may be used to combine network nodes (peers) into a simple and coherent peer-to-peer network computing platform. Embodiments the peer-to-peer platform may be directed at providing several benefits including one or more of, but not limited to, no single point of failure, asynchronous messaging, the ability for peers to adapt to their network environment, and moving content towards its consumers.

Figure 2:
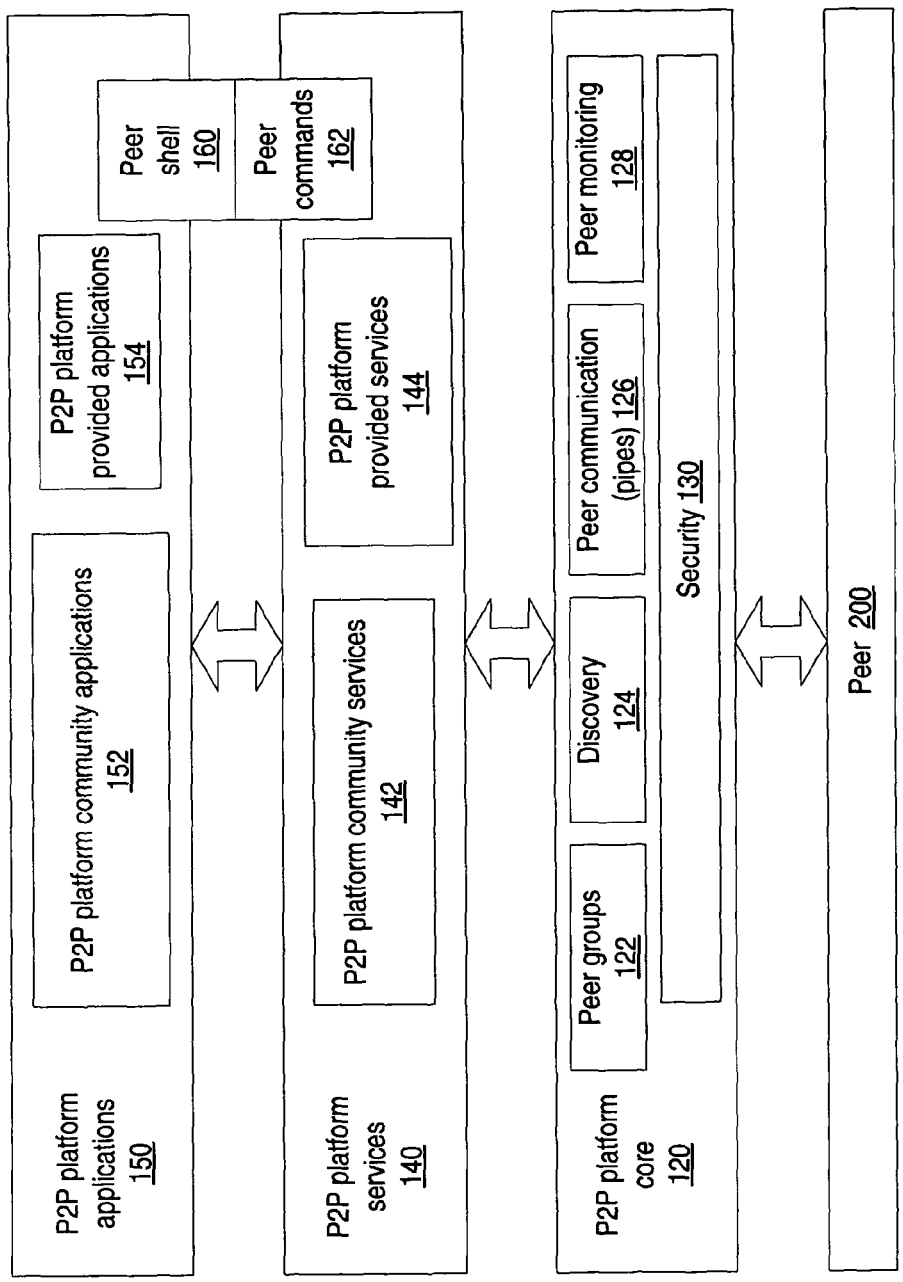
FIG. 2 illustrates one embodiment of peer-to-peer platform software architecture at the conceptual level.

FIG. 2 illustrates one embodiment of peer-to-peer platform software architecture at the conceptual level. The peer-to-peer platform may include several layers. In one embodiment, the software stack may be described using three layers; a peer-to-peer platform (core) layer 120, a service layer 140 and an application layer 150. In one embodiment, the peer-to-peer platform may include a core layer 120 that defines and encapsulates minimal primitives that are common to peer-to-peer networking, including, but not limited to, peers 110, peer groups 122, peer discovery 124, peer communication (e.g. pipes) 126, peer monitoring 128, and associated security primitives 130. This layer may be shared by all peer-to-peer devices so that interoperability becomes possible.

A peer may be defined as any entity that runs some or all of one or more protocols provided by the peer-to-peer platform core layer. As such, a peer may manifest in the form of a processor, a process or a device. A peer may be anything with a digital heartbeat that supports the peer-to-peer platform core, including sensors, servers, PCs, computers up to and including supercomputers, PDAs, manufacturing and medical equipment, phones and cellular phones. In order to interact with other peers (e.g. to form or join peer groups), the peer needs to be connected to some kind of network (wired or wireless), such as IP, Bluetooth, or Havi, among others.

The peer-to-peer platform may provide mechanisms through which peers may discover each other, communicate with each other, and cooperate with each other to form peer groups. Peers may discover each other on the network to form transient or persistent relationships called peer groups. A peer group is a collection of peers connected by a network that share a common set of interests and that have agreed upon a common set of rules to publish, share and access any computer content (code, data, applications, or other collections of computer representable resources), and communicate among themselves. Peer groups may also be statically predefined. The peers in a peer group may cooperate to provide a common set of services. A peer group may be viewed as an abstract region of the network, and may act as a virtual subnet. The concept of a region virtualizes the notion of routers and firewalls, subdividing the network in a self-organizing fashion without respect to actual physical network boundaries. In one embodiment, peer groups implicitly define a region scope that may limit peer propagation requests. Conceptually, a peer group may be viewed as a virtual entity that speaks the set of peer group protocols.

The core layer 120 provides core support for peer-to-peer services and applications. In a multi-platform, secure execution environment, the core mechanisms of peer groups, peer pipes and peer monitoring may be provided. Peer groups 122 may establish a set of peers and naming within a peer group with mechanisms to create policies for creation and deletion, membership, advertising and discovery of other peer groups and peer nodes, communication, security, and content sharing. Pipes provide virtual communication channels among peers. Messages sent in pipes may support transfer of data, content, and code in a protocol-independent manner, allowing a range of security, integrity, and privacy options. In one embodiment, messages may be structured with a markup language such as XML. Peer monitoring 128 enables control of the behavior and activity of peers in a peer group and can be used to implement peer management functions including access control, priority setting, traffic metering, and bandwidth balancing.

The core layer 120 may include protocols and building blocks to enable key mechanisms for peer to peer networking, including discovery, transport (including firewall handling and limited security), and the creation of peers and peer groups. In one embodiment, the core layer 120 may be thin and small, and may provide interesting and powerful primitives for use by services and applications in the other layers. The core layer 120 may support choices such as anonymous vs. registered users and encrypted vs. clear text content without imposing specific policies on developers. Policy choices may be made, or when necessary, implemented, at the service layer 140 and/or application layer 150. For example, administration services such as accepting or rejecting a peer's membership in a peer group may be implemented using the functionality provided by the core layer 120.

The core components of the peer-to-peer protocol may be used to implement discovery mechanisms for searching, publishing and recovering of core abstractions (e.g. peers, peer group, pipes, endpoints, and advertisements). In one embodiment, these mechanisms may be simple, administration free, and may not require special peers to act as "master" peers. These mechanisms may allow processes in the peer-to-peer network, in absence of help from other applications and/or services, to bootstrap and find out the information necessary to access applications and services that can help. In addition, the core may "return" to this standalone behavior and still function if helper applications or services fail. In one embodiment, safety mechanisms may be put in place in order to avoid a major overflow of "web-crawling." In one embodiment, applications and/or services that support the peer-to-peer protocol may access, control, and/or override the core components, even to the extreme of implementing a centralized, client-server model based on the core components.

At the highest abstraction level, the peer-to-peer platform may be viewed as a set of protocols provided at the core layer 120. In one embodiment, a common thread among peer-to-peer platform peers is protocols, not APIs or software implementations. In one embodiment, the peer-to-peer platform protocols may guarantee interoperability between compliant software components executing on potentially heterogeneous peer runtimes. Thus, embodiments of the peer-to-peer platform may be agnostic to programming languages. The term compliant may refer to a single protocol only. That is some peers may not implement all the core protocols. Furthermore, some peers may only use a portion (client-side or server-side only) of a protocol.

Each protocol may be defined by one or more messages exchanged among participants of the protocol. Each message may have a predefined format, and may include various data fields. In one embodiment, the protocols may utilize messaging such as XML messages. The peer-to-peer platform connects peer nodes with each other. In one embodiment, the peer-to-peer platform may be platform-independent by virtue of being a set of protocols. As such, the peer-to-peer platform may not require APIs and remains independent of programming languages, so that it can be implemented in C/C++, Java, Java 2ME, Perl, Python or other languages. This means heterogeneous devices with completely different software stacks can preferably interoperate through the peer-to-peer platform protocols. To underpin this set of protocols, the peer-to-peer platform may define a number of concepts including peer, peer group, advertisement, message, pipe, and more.

In one embodiment, peer-to-peer protocols may be embodied as markup language (e.g. XML) messages that may be sent between two peers. In one embodiment, the peer-to-peer platform messages may define the protocols used to discover and connect peers and peer groups, and to access resources offered by peers and peer groups, among others. The use of markup language (e.g. XML) messages to define protocols may allow many different kinds of peers to participate in a protocol. Each peer may be free to implement the protocol in a manner best suited to its abilities and role. For example, not all peers are capable of supporting a Java runtime environment. In one embodiment, the protocol definition does not require nor imply the use of Java on a peer.

Several peer-to-peer platform protocols that may be provided by embodiments of the peer-to-peer platform are described later in this document. The protocols defined in this document may be realized over networks including, but not limited to, the Internet, a corporate intranet, a dynamic proximity network, a home networking environment, LANs, and WANs. The protocols defined in this document may also be realized within a single computer. Thus, in one embodiment, the peer-to-peer platform may be transport protocol independent. The size and complexity of the network peers that may support these protocols preferably includes a wide range of peer implementations including peers implemented on, but not limited to, simple light switches, PDAs, cell phones, pagers, laptop and notebook computers, smart appliances, personal computers, workstations, complex, highly-available servers, mainframe computers and even supercomputers.

The peer-to-peer platform may further include a peer-to-peer services layer 140. This layer may provide capabilities that may not be absolutely necessary for a peer-to-peer network to operate but that may be desirable to provided added functionality beyond the core layer 120 in the peer-to-peer environment. The service layer 140 may deal with higher-level concepts such as search and indexing, directory, storage systems, file sharing, distributed file systems, resource aggregation and renting, protocol translation, authentication and PKI (public key infrastructure) systems. These services, which may make use of the protocols and building blocks provided by the core layer 120, may be useful by themselves but also may be included as components in an overall P2P system. Thus, services may include one or more services 144 provided by the peer-to-peer platform. These platform-provided services 144 may include indexing, searching and file sharing services, for example. The services layer 140 may provide hooks for supporting generic services (such as searching, sharing and added security) that are used in many P2P applications. Thus, services may also include one or more services 142 not provided as part of the peer-to-peer platform but rather provided by the peer-to-peer platform community. These services 142 may be user-defined and may be provided, for example, to member peers in a peer group as a peer group service.

Services may expand upon the capabilities of the core layer 120 and may be used to facilitate application development. Facilities provided as services in the service layer 140 may include mechanisms for search and indexing, directory, storage systems, file sharing, distributed file systems, resource aggregation and renting, protocol translation, authentication, PKI services, and caching code and content to enable cross-application bridging and translation of files, among others. Searching capabilities may include distributed, parallel searches across peer groups that are facilitated by matching an XML representation of a query to be processed with representations of the responses that can be provided by each peer. These facilities may be used for simple searches, for example searching a peer's repository, or more complex searches of dynamically generated content that is unreachable by conventional search engines. P2P searches may be conducted across a company's intranet, for example, to quickly locate relevant information within a secure environment. By exercising tight control over peer group membership and enabling encrypted communication between peers, a company may extend this capability to its extranet, including business partners, consultants, and suppliers as peers. The same mechanisms that facilitate searches across the peer group may be used as a bridge to incorporate Internet search results, and to include data outside of the peer's own repository, for example searching a peer's disk. The peer services layer 140 may be used to support other custom, application-specific functions. For example, a secure peer messaging system may be built to allow anonymous authorship and a persistent message store. The peer services layer 140 provides the mechanisms to create such secure tools; the application developers themselves may determine specific tool policies.

The peer-to-peer platform may also include a peer-to-peer application layer 150. The application layer 140 may support the implementation of integrated applications such as file sharing, resource sharing, monetary systems, distributed storage, peer-to-peer instant messaging, entertainment, content management and delivery, peer-to-peer email systems, distributed auction systems, among others. Applications may be "vertical" or they may be developed to interoperate with other distributed applications. One or more applications 154 may be provided as part of the peer-to-peer platform. For example, one embodiment of the peer-to-peer platform may include a shell application 160 as a development environment built on top of the platform. The shell application may provide interactive access to the peer-to-peer platform via a simple command line interface 162.

Applications may also include community applications 152 not provided by the peer-to-peer platform. These community applications 152 may be user-defined and may be provided, for example, to member peers in a peer group as a peer group application.

In one embodiment, the boundary between services and applications is not rigid. An application to one customer can be viewed as a service to another customer. An application may use services. Services may serve as protocols that may be shared among various applications. An application may provide a user interface, a way to define a set of files to share, a way to initiate a search, a way to display the results, and a way to initiate a file transfer, for example. Such an application may make use of a set of services, for example a reliable point-to-point file transfer service, a distributed search service, a discovery service to locate other peers, among others.

Applications may be built using peer services as well as the core layer 120. The peer-to-peer platform may support the fundamental levels broadly, and rely on the P2P development community to provide additional peer services and applications. Peer applications enabled by both the core layer 120 and peer services layer 140 may include P2P auctions that link buyers and sellers directly, with buyers able to program their bidding strategies using a simple scripting language, for example. Resource-sharing applications, such as SETI@home, may be built more quickly and easily, with heterogeneous, worldwide peer groups supported from day one. Instant messaging, mail, and calendaring services may facilitate communication and collaboration within peer groups that are secure and independent of service provider-hosted facilities. Virtually any other type of application may be build on top of the core layer 120 and services layer 140.

Some features, such as security, may manifest in all three layers and throughout a P2P system, albeit in different forms according to the location in the software architecture. In one embodiment, the system may be modular, and allows developers to pick and choose a collection of services and applications that suits their needs.

A typical peer-to-peer platform network may provide an inherently nondeterministic topology/response structure. In a peer-to-peer platform network, a specific resource request may not return for minutes, hours, or even days; in fact, it may never return at all. In addition, people from different parts of the world requesting the same resource are likely to get different copies of the resource from completely different locations. Peers may obtain content from multiple servers, ideally reaching a nearby one that is up and running. The original source peer need not service every resource request; in fact, it does not even have to be up and running. The nondeterministic structure may also help provide the optimized use of network bandwidth. The concentrated localized traffic congestion typical of today's Web doesn't affect P2P networking. The nondeterministic structure may also help provide a lowered cost of content distribution. The P2P network can absorb contents and replicate it for easy access. The nondeterministic structure may also help provide leveraged computing power from every node in the network. With asynchronous operations, a user may issue many requests for many resources or services simultaneously and have the network do the work. The nondeterministic structure may also help provide unlimited scalability. A properly designed P2P application may span the entire known connected universe without hitting scalability limits; this is typically not possible with centralized schemes. Note, however, that the peer-to-peer platform also may support deterministic, synchronous applications.

As an example of a nondeterministic, asynchronous application, consider a network-based music request service that operates over a peer-to-peer platform-based P2P network. A peer submits multiple requests for music files and then checks back later to see if the music request service in the peer group has found them. A few requested files have been found, but others cannot be located. The service's response in regards to the files that cannot be located may be something like "Music selection and availability changes continuously; please retry your request later." This is an acceptable nondeterministic outcome. Even though the service could not find a file, the same file may be available later if the same request is resubmitted, because peers that host the desired files may have come online in the meantime.

The peer-to-peer platform provides the ability to replicate information toward end users. Popular content tends to be replicated more often, making it easier to find as more copies are available. Peers do not have to always go back to the same peer to obtain the information they want, as is typical in the client/server model. Peers may obtain information from neighboring peers that have already cached the information. Each peer may become a provider to all other peers.

In one embodiment, the peer-to-peer platform may enable peers to find content that is closest to them. This content may include data (e.g. files) or even services and applications. For example, if a peer node in an office peer-to-peer network using the peer-to-peer platform is moved, the peer-to-peer platform may allow the peer to automatically locate content (e.g. using a discovery service that participates in the discovery protocol) including services (e.g. a printer service and an email service) hosted by other peers closest to the peer's new location, without requiring any manual reconfiguration. Further, at least some content may be copied or moved to the peer in its new location and/or to other peers proximate to the new location.

In one embodiment, the peer-to-peer platform may provide a decentralized environment that minimizes single points of failure and is not dependent on any centralized services. Both centralized and decentralized services may be developed on top of the peer-to-peer platform. With the addition of each new network peer, the network platform preferably becomes more robust as it expands. In the environment, services may be implemented to interoperate with other services giving rise to new P2P applications. For example, a P2P communications service like instant messaging may easily be added to a resource-sharing P2P application if both support at least the necessary peer-to-peer platform protocols.

The peer-to-peer platform may provide interoperability. The peer-to-peer platform may be used by developers independent of preferred programming languages, development environments, or deployment platforms. Embodiments of the peer-to-peer platform may enable interconnected peers to easily locate each other, communicate with each other, participate in community-based activities, and offer services to each other seamlessly across different P2P systems and different communities. The peer-to-peer platform may also provide platform independence. Embodiments of the peer-to-peer platform may be independent of programming languages (such as C/C++, Java, Perl, and KVM), system platforms (such as the Microsoft Windows, UNIX®, Solaris, Linux and Macintosh platforms), and networking platforms (such as TCP/IP, Bluetooth and Havi). Thus, heterogeneous devices with completely different software stacks may interoperate through the peer-to-peer platform protocols. Embodiments of the peer-to-peer platform may be implementable on any device with a digital heartbeat, including, but not limited to, sensors, consumer electronics, Personal Digital Assistants (PDAs), appliances, network routers, desktop computers, data-center servers, and storage systems. Embodiments of the peer-to-peer platform may enable peers, independent of software and hardware platform, to benefit and profit from being connected to millions of other peers.

In one embodiment, the peer-to-peer platform may run on any of various operating systems including embedded operating systems (with the appropriate level of Java runtime support, if required) such as Windows95, 98, 2000, ME, and NT, Solaris, Unix, Macintosh, Linux, Java 2 Platform, Micro Edition (J2ME) and PersonalJava Technology. The peer-to-peer platform may be implemented in any of a variety of development environments using any of a variety of programming languages, or combinations of programming languages, including, but not limited to, Java, Java 2ME, C/C++, Perl, Python and KVM. In one embodiment, the peer-to-peer platform may be implemented in Java. In one embodiment, a peer-to-peer platform may be implemented in C/C++ on some devices, for example, to support devices without Java support. In one embodiment, a peer-to-peer platform may be implemented in KVM on some devices, for example, so that all KVM capable devices such as PDAs and cell phones can be peer-to-peer platform peers. Programming languages other than those listed may also be used in various embodiments.

A minimal device with the ability to generate a text string may theoretically participate in a peer-to-peer platform network (though not necessarily in every P2P application). The simplistic device may need a surrogate peer on the P2P network. This surrogate peer may perform discovery, advertisement, and communications on behalf of the simplistic device (or many simplistic devices). The location of the surrogate may be hard-wired into the simplistic device. In this way, the simplistic device with the help of the surrogate can be a full-fledged peer on the peer-to-peer platform network. For example, a GPS locator, strapped to a sea turtle and sending out peer-to-peer platform messages wirelessly with location information, may become a peer on a peer-to-peer platform network.

Embodiments of the peer-to-peer platform may be independent of transport protocols. For example, the peer-to-peer platform may be implemented on top of TCP/IP, HTTP, Bluetooth, HomePNA, and other protocols. Thus, a system built on top of the peer-to-peer platform preferably functions in the same or similar fashion when the system is expanded to a new networking environment or to a new class of devices, as long as there is a correct transport protocol handler for the new networking protocol.

In one embodiment, the peer-to-peer platform may use XML as the encoding format. XML may provide convenience in parsing and extensibility. Other embodiments of the peer-to-peer platform may use other encoding formats. The use of XML does not imply that all peer-to-peer platform peer nodes must be able to parse and to create XML documents. For example, a cell phone with limited resources may be programmed to recognize and to create certain canned XML messages and can still participate in a peer-to-peer platform network of peers. In one embodiment, a lightweight XML parser may be used that supports a subset of XML. This may help reduce the size of the peer-to-peer platform.

There may be areas in a peer-to-peer environment where there is not one correct way to do something or where what should be done depends on the nature and context of the overriding application. For example, in the area of security, every P2P application may choose a different authentication scheme, a different way to ensure communication security, a different encryption algorithm for data security, a different signature scheme for authenticity, and a different access control policy. Therefore, for these areas, the peer-to-peer platform may preferably focus on mechanisms instead of policy, so that application developers can have the maximum freedom to innovate and offer competitive solutions.

Implementations of the peer-to-peer platform may be illustrated with a few application or usage scenarios. For example, assume there is a peer-to-peer community offering a search capability for its members, where one member can post a query and other members can hear and respond to the query. One member is a Napster user and has implemented a feature so that, whenever a query is received seeking an MP3 file, this member will look up the Napster directory and then respond to the query with information returned by the Napster system. Here, a member without any knowledge of Napster may benefit because another member implemented a bridge to connect their peer-to-peer system to Napster. The peer-to-peer platform may provide a platform bridge that may be used to connect the various peer-to-peer systems together.

In another example, one engineering group requires a sizable storage capability, but also with redundancy to protect data from sudden loss. Using the peer-to-peer platform, each group may buy a simple storage system without a mirroring feature, where the disks can then discover each other automatically, form a storage peer group, and offer mirroring facilities using their spare capacity.

As yet another example, many devices such as cell phones, pagers, wireless email devices, Personal Digital Assistants (PDAs), and Personal Computers (PCs) may carry directory and calendar information. Using the peer-to-peer platform, these devices may be able to interact with each other, without extra networking interfaces except those needed by the devices themselves, using the peer-to-peer platform as the common layer of communication and data exchange.

Peer-to-Peer Platform Identifiers

In embodiments the peer-to-peer platform, peer-to-peer platform protocols may need to refer to peers, peer groups, pipes and other peer-to-peer platform resources. In one embodiment, these references may be presented in the protocols as peer-to-peer platform identifiers. Peer-to-peer platform identifiers may provide a mechanism for uniquely identifying specific peer groups, peers, pipes, contents and service instances, among other resources. Peer-to-peer platform identifiers may provide unambiguous references to the various peer-to-peer platform entities. There may be several types of peer-to-peer platform entities which may have peer-to-peer platform identifier types defined including one or more of, but not limited to: peer groups, peers, pipes, content, module classes and module specifications.

In one embodiment, peer-to-peer platform identifiers may be presented as Uniform Resource Names (URNs). URNs are a form of URI (Uniform Resource Identifier) that are intended to serve as persistent, location-independent, resource identifiers. Like other forms of URI, peer-to-peer platform identifiers are presented as text. Refer to IETF RFC 2141 for more information on URNs.

In one embodiment, a peer-to-peer platform identifier is a standard URN in the peer-to-peer platform identifier namespace. Peer-to-peer platform identifier URNs may be identified by a namespace identifier, for example "xxxx." Each peer-to-peer platform identifier URN may also include an identifier format keyword. The identifier format keyword may indicate how the identifier was created and may allow peer-to-peer platform bindings to extract additional information from the identifier. In one embodiment, peer-to-peer platform identifier formats may be defined to refer to resources both within peer-to-peer platform and to bridge to other technologies. One embodiment may use the ABNF syntax as defined in "IETF RFC 2234" as a format specification.

When peer-to-peer platform identifiers are used within peer-to-peer platform protocols, the identifiers may be manipulated as text string URIs. Operations available for URIs may include compare, resolve, and decompose. Peer-to-peer platform identifier URIs may be compared for equality as strings. Peer-to-peer platform identifier URIs may also be resolved to the resource they reference. Peer-to-peer platform identifier URIs may be decomposed and interpreted by peer-to-peer platform bindings. To interpret a peer-to-peer platform identifier, a peer-to-peer platform binding may support the identifier format used by that peer-to-peer platform identifier. For many peer-to-peer platform protocols and operations, it may not be necessary to decompose the peer-to-peer platform identifiers.

In one embodiment, peer group identifiers may be used to refer to peer groups. In one embodiment, a peer group identifier may canonically, uniquely and unambiguously refer to a peer group. In one embodiment, other identifier formats may support this identifier type because the other identifier types may refer to the peer group to which they belong.

In one embodiment, peer identifiers may be used to refer to peers. In one embodiment, a peer identifier may canonically, uniquely and unambiguously refer to a peer. If a peer-to-peer platform binding recognizes the identifier format, it may be able to extract a peer group identifier from a peer identifier. This peer group identifier identifies the peer group of which the peer is a member.

In one embodiment, codat identifiers may be used to refer to codats. A codat identifier may canonically, uniquely and unambiguously refer to a codat. In one embodiment, support for codat identifiers may be optional. In one embodiment, if a peer-to-peer platform binding recognizes the codat identifier format, it should be able to extract a peer group identifier from a given codat identifier. This peer group identifier identifies the peer group to which the codat belongs.

The term "codat" as used herein refers to any computer content—code, data, applications, or other collection of computer representable resources. In one embodiment, the peer-to-peer protocol may not distinguish among different types of resources that can be stored on a computer and shared among peers in a peer group. Examples of codat include text files, photographs, applets, executable files, serialized Java objects, SOAP messages, etc. Codats are the elementary unit of information that is exchanged among peers. In this embodiment, given that codats may have arbitrary forms and properties, it may not be clear what sets of actions should be defined for them. In one embodiment, the codats may carry or include definitions of how they should be accessed. Such codats are analogous to objects, which may define for themselves access methods others can invoke.

In one embodiment, pipe identifiers may be used to refer to pipes. A pipe identifier may canonically, uniquely and unambiguously refer to a pipe. In one embodiment, support for pipe identifiers may be optional. In one embodiment, if a peer-to-peer platform binding recognizes the pipe identifier format, it should be able to extract a peer group identifier from a given pipe identifier. This peer group identifier identifies the peer group to which the pipe belongs.

In one embodiment, a module class identifier may identify a particular local behavior; for example, a specific API for each execution environment for which an implementation of the module exists. A module class identifier may canonically, uniquely and unambiguously refer to a module class as defined by an advertisement. If a peer-to-peer platform binding recognizes the module class identifier type, it should be able to extract a base class identifier from a module class identifier. The base class identifier allows applications to determine if two module class identifiers differ only in the "role" they perform. In one embodiment, a module specification identifier's "roles" may allow the same module to be reused within a group and to have instances distinguished. This may be necessary when, for example, a common database service is used, with each role accessing a different data set.

In one embodiment, a module specification identifier may uniquely identify a particular network behavior (e.g. wire protocol and choreography) that may be embodied by a software module. In one embodiment, there may be any number of implementations of a given module specification identifier. A module specification identifier may uniquely identify an abstract module for which there may be multiple platform-specific implementations. A module specification identifier may be used to locate a compatible implementation so that it can be instantiated. In one embodiment, all such implementations are assumed to be network compatible. A module specification identifier may canonically, uniquely and unambiguously refer to a module specification. If a peer-to-peer platform binding recognizes this identifier type, it should be able to extract a Module class identifier from a Module specification identifier. In one embodiment, each peer-to-peer platform identifier types may have a specific definition for how its fields are represented within its structure.

In one embodiment, for peer-to-peer platform module class identifiers, each module may be assigned a module service identifier that may enable canonical references to be made to the service in the context of a specific peer group, and optionally within the context of a specific peer. In one embodiment, for peer-to-peer platform module specification identifiers, each service may be assigned a unique service identifier that may enable canonical references to be made to the service in the context of a specific peer group, and optionally within the context of a specific peer.

One embodiment of the peer-to-peer platform may define an identifier format that may be used for encoding peer-to-peer platform identifiers. Peer-to-peer platform binding implementations preferably support this identifier format. In one embodiment, there may be one or more reserved peer-to-peer platform identifiers, including, but not limited to, the null identifier, the world peer group identifier, and the net peer group identifier.

UUIDs

A peer group may theoretically be as large as the entire connected universe. Naming anything uniquely is a challenge in such a large namespace. In one embodiment, the peer-to-peer platform may support and/or provide sophisticated naming and binding services. In one embodiment, the peer-to-peer platform may use a universal unique identifier (UUID), for example, a 64- or 128-bit datum, to refer to an entity or resource (e.g. a peer, peer group, service, application, pipe, advertisement, endpoint, content, etc.). For example, UUIDs may be embedded in advertisements for internal use.

UUIDs provide unique identifiers for resources in the peer-to-peer environment, and, in one embodiment, may identify the resource independently of the resource's location on the network. A UUID may be bound to other information, such as a network address of the corresponding resource and/or a resource name of the resource. Thus, UUIDs help to provide peers, services and other peer-to-peer environment entities with access to resources in the peer-to-peer environment independent of the resources' locations.

In one embodiment, UUIDs may be used to guarantee that each resource or entity has a unique UUID within a local runtime environment and serves as a canonical way of referring to an entity, but because a global state is not assumed, it may not be possible to provide a guarantee of uniqueness across an entire community that may consist of millions of peers. This may not be a problem because a UUID may be used within the peer-to-peer platform as an internal identifier. This may become significant only after the UUID is securely bound to other information such as a name and a network address.

The UUID is an abstract data structure, and thus virtually any canonical method may be used for representing UUIDs for use in peer-to-peer environments. In one embodiment, different peer groups may implement different canonical representations of UUIDs in the same peer-to-peer environment. In one embodiment, Uniform Resource Name (URN) format may be used for the representation of UUIDs. In one embodiment, Uniform Resource Identifier (URI) format may be used. In one embodiment, Uniform Resource Locator (URL) format may be used. In one embodiment, custom and/or proprietary methods of representing UUIDs may be used. For example, one peer group may use URN format for UUIDs, and another peer group may use a proprietary alphanumeric naming scheme.

In one embodiment, the UUIDs may be used in providing flexible configuration and seamless relocation of peer nodes on a peer-to-peer network, and may assist in locating and accessing content including services nearest to a peer node when the peer node is moved. For example, a businessperson based in New York may participate in a peer-to-peer network based on the peer-to-peer protocols using a notebook computer or other portable computing device connected to a LAN as a peer node. The businessperson may access an instance of an email and/or other services locally hosted by other peer nodes in a peer group on the LAN. If the businessperson travels to Paris, for example, and takes the notebook computer, the notebook computer may be connected to a different LAN at the Paris location and participate in the peer-to-peer network. Because the peer node has a unique identifier in the peer-to-peer network (e.g. a UUID) rather than just a static network address (the unique identifier may be bound to the static network address), the peer node may seamlessly access instances of an email service and other services locally hosted on the LAN, or alternatively hosted on a peer node at the peer node's original location or elsewhere, using the UUID to establish its identity. The peer node may rejoin the peer group in New York to access one or more instances of services and other content hosted on the peer group, and may also join a peer group at the Paris location to access one or more other instances of services and content.

Thus, the peer-to-peer protocols and UUIDs may provide the ability for peer nodes to move to different peer groups and/or peer regions and access services and other content independent of network addresses and without requiring reconfiguration of the peer node. For example, when the exemplary peer node moves to Paris, connects to the network (at a different network address) and accesses an instance of an email service (either locally or remotely hosted, for example in the New York peer group), the email service may identify the peer node by its unique identifier and route the peer's email to the peer node at the new network address without requiring reconfiguration of the peer node. Thus, peer nodes may be relocated and access services and other content that are locally hosted or services and other content hosted in their original peer group if the services and other content are not required to be locally hosted.

Peers

Network nodes (peers) of various kinds may join the peer-to-peer networking platform by implementing one or more of the platform's protocols. A peer may be any networked device (e.g. sensor, phone, PDA, PC, server, supercomputer, etc.) that implements one or more of the core peer-to-peer platform protocols. Each peer operates independently and asynchronously of any other peer, providing a degree of reliability and scalability not typically found in current distributed systems. Some peers may have more dependencies with other peers due to special relationships (e.g. gateways or routers). In one embodiment, a peer does not need to understand all of the protocols of the peer-to-peer platform. The peer can still perform at a reduced level if it does not support one or more of the protocols.

Peers may publish and provide network resources (e.g. CPU, storage and routing resources) that may be used by other peers. Peers may provide network services that may be used by other peers. Peers typically interact with a small number of other peers (network neighbors or buddy peers). Peers that provide the same set of services tend to be interchangeable. Thus, it may not matter which peers a peer interacts with. Generally, assumptions should not be made about peer reliability or connectivity, as a peer may appear or leave the network at any time. Peers may have persistent storage. A peer may optionally cache information.

Peers may have multiple network interfaces. In one embodiment, a peer may not need to publish all of its interfaces for use with the peer-to-peer protocols. Each published interface may be advertised as a peer endpoint. In one embodiment, a peer endpoint is an identifier (e.g. a URN or URI) that uniquely identifies a peer network interface. Peer endpoints may be used by peers to establish direct point-to-point connections between peers. Peers may not have direct point-to-point network connection between themselves, either due to lack of physical network connections, or network configuration (NATs, firewalls, proxies, etc.), and thus a peer may have to use one or more intermediary peers to route a message from an endpoint to another peer endpoint.

The term rendezvous peer may be used to designate a peer that is designated to be a rendezvous point for discovering information about other peers, peer groups, services and pipes. In one embodiment, rendezvous peers may cache information that may be useful to peers including new peers. Rendezvous peers may provide an efficient mechanism for peers that are far away to find (e.g. discover) each other. Rendezvous peers may make peer discovery more practical and efficient. In one embodiment, a peer group is not required to have a rendezvous peer. In one embodiment, any or even all members of a peer group may become rendezvous peers in a peer group. In one embodiment, each peer group may have different policies to authorize a peer to become a rendezvous peer.

The term router peer may be used to describe a peer that crosses one or more regions and is designated to be a router between the regions. Router peers may be used to route messages between different network protocols (e.g. TCP/IP, IrDA) or to peers that are behind firewalls. In one embodiment, any or all peer members may become routers. In one embodiment, peer groups may have different policies to authorize a peer to become a router peer for other peers.

In one embodiment, every peer in the peer-to-peer network may have a unique peer identifier (e.g. UUID). Other peer-to-peer network resources may also have unique identifiers, including peer groups, services, applications, pipes, endpoints, content and resource advertisements. In one embodiment, the peer identifier may identify a peer group in which the peer is a member peer. In one embodiment, a peer may have a different peer identifier for each group in which it is a member peer. A peer identifier that also identifies a peer group in which the peer is a member peer may be used to differentiate peers that seek access to a service or content on a peer within the peer group. For example, a peer may provide implementations of a service in two or more different peer groups in which it is a member peer. The peer may advertise a different peer identifier within each peer group, and may differentiate between messages received from peers in the different peer groups by examining their respective peer identifiers to identify the particular peer group in which the peers that sent the messages are member peers to determine which service implementation to provide to the requesting peers.

Peers may be identified by their unique identifier (UUID) rather than by a fixed address. When a peer boots, it attempts to contact other peers. In one embodiment, contacted peers may include variable-sized caches that map nearby peers' UUID to their current addresses. This allows embodiments of the peer-to-peer platform to be run over a dialup connection, for example.

The peer identifiers may be included in resource advertisements of resources associated with the peers. For example, the peer identifiers may be included in peer advertisements, peer group advertisements, service advertisements, pipe advertisements and endpoint advertisements, among others. In one embodiment, a peer identifier may be bound to a network address (e.g. IP address, URI, URN or URL) of the peer. If the peer changes network addresses (e.g. is moved to a new network location), the peer identifier may be unbound from the network address and bound to the new network address. Thus, the peer identifier provides a dynamic identification and addressing mechanism for peers in the peer-to-peer network, rather than a static mechanism, allowing peers to change network locations and still be identifiable (e.g. in peer groups the peer is a member peer of) using the same peer identifier.

In one embodiment, the peer identifier may include information identifying a particular peer group the peer is a member peer of. In one embodiment, a peer may be assigned a different, unique peer identifier for each peer group the peer is a member peer of. In one embodiment, peer identifiers may be included in messages received from other peers. If the receiving peer is a member in more than one peer group, the receiving peer may use the peer identifiers received in the messages to identify particular implementations of resources (e.g. services, pipes, endpoints and content) that are available for access by the sending peers.

The resource identifiers may be included in resource advertisements for the resources. At least a portion of the resource identifiers may be bound to a network address (e.g. IP address, URI, URN or URL) corresponding to the resource. At least a portion of the resource identifiers may also specify a particular peer and/or peer group that hosts the resource. Resources may include, but are not limited to, peers, peer groups, services, applications, advertisements, content, pipes and pipe endpoints.

In one embodiment, a peer may be assigned a unique string as a name. Any naming scheme may be used. In one embodiment, names are not unique unless a coordinated naming service is used to guarantee name uniqueness. A naming service is typically a centralized service that guarantees the uniqueness of name and can be used to register name mapping. Examples of naming services are DNS and LDAP. In one embodiment, the use of a naming service may be optional.

Peer Groups

Peers may spontaneously discover each other on the network to form transient or persistent relationships called peer groups. Peer groups are collections of peers that may share some common interest or interests. Peer groups may also be statically predefined. In one embodiment, a peer group may provide one or more peer group services. In one embodiment the peer-to-peer platform may defines a core set of peer group services. The peer-to-peer platform protocols may specify the wire format for these core peer group services. Additional peer group services may be developed for delivering specific services. For example, a lookup service could be implemented to find active (running on some peer) and inactive (not yet running) service instances Some embodiments of the peer-to-peer platform may describe how to create and discover peer groups, but may not dictate when, where, or why to create a peer group, the type of the group, or the membership of the group. A peer group may provide a common membership definition. Each peer group may establish its own membership policy in a range from open (any peer can join) up to highly secure and protected (a peer may join only if it possesses sufficient credentials).

In one embodiment, peers wishing to join a peer group may first locate a current member, and then request to join the peer group. The peer-to-peer platform may define how to discover peer groups, e.g. using a peer discovery protocol. The application to join may be rejected or accepted by the collective set of current members in accordance with the peer group's membership policy. In one embodiment, a peer group core membership service may be used to enforce a vote among one or more group members. Alternatively, one or more group representative member peers may be elected or appointed to accept or reject new membership applications.

In one embodiment, the peer-to-peer platform is not concerned with what sequence of events a peer or a peer group comes into existence. Moreover, in one embodiment, the peer-to-peer platform does not limit how many groups a peer can belong to. In one embodiment, nested and/or overlapping peer groups may be formed. In one embodiment, there may be a special group, called the World Peer Group, which may include all peer-to-peer platform peers. In one embodiment, the world peer group may provide the minimum seed for every peer to potentially find each other and form new groups. In one embodiment, the world peer group has an open membership policy (e.g. has a null membership authenticator service). Some peers inside the world peer group may not be able to discover or communicate with each other—e.g., they may be separated by a network partition. In one embodiment, participation in the World Peer Group is by default.

The peer-to-peer platform may use the concept of a peer group as an implicit scope of all messages originated from within the group. Peer groups may serve to subdivide the network into abstract regions providing an implicit scoping mechanism. Peer groups may provide a limited scoping environment to ensure scalability. Peer groups may be formed and self organized based upon the mutual interest of peers. In one embodiment, no particular rules are imposed on the way peer groups are formed, but peers with the same interests may tend to join the same peer groups.

In one embodiment, a scope may be realized with the formation of a corresponding peer group. Peer group boundaries may define the search scope when searching for a group's content. For example, a peer in San Francisco looking to buy a used car is normally not interested in cars available outside of the Bay Area. In this case, the peer may want to multicast a message to a subset of the current worldwide peer group, and a subgroup may be formed especially for this purpose. In one embodiment, the multicast may be done without the formation of a new peer group. In one embodiment, all messages may carry a special scope field, which may indicate the scope for which the message is intended. Any peer who receives this message may propagate the message based on the scope indicator. In one embodiment, using this approach, a sending peer may be bootstrapped with some well-defined scopes, and may have the ability to discover additional scopes.

Peer groups may also be formed based upon the proximity of the member peers. Proximity-based peer groups may serve to subdivide the network into abstract regions. Regions may serve as a placeholder for general communication and security configurations that deal with existing networking infrastructure, communication scopes and security requirements. Peer groups may provide a scoping mechanism to reduce traffic overload.

Peer groups may provide a secure cooperative environment. Peer group boundaries permit member peers to access and publish protected contents. Peer groups form virtual secure regions which boundaries limit access to the peer group resources. Secure services may be provided to peers within a secured peer group. Their boundaries may or may not reflect any underlying physical network boundaries such as those imposed by routers and firewalls. The concept of a region may virtualize the notion of routers and firewalls, subdividing the network into secure regions in a self-organizing fashion without respect to actual physical network boundaries.

Peer groups may also create a monitoring environment. Peer groups may permit peers to monitor a set of peers for any special purpose (heartbeat, traffic introspection, accountability, etc.). Peer groups may also provide a controlled and self-administered environment. Peer groups may provide a self-organized structure that is self-managed and that may be locally managed.

In one embodiment, peer groups using the peer-to-peer platform may provide capabilities to peers including one or more of, but not limited to, finding nearby peers, finding named peers anywhere on the network, finding named peer groups anywhere on the network, joining and resigning from a peer group, establishing pipes between peer group members, and finding and exchanging shared content.

Content

Peers may be grouped into peer groups to share content. A content is published and shared among the peer members of a peer group. In one embodiment, content may be shared among group members, but not between groups. In this embodiment, no single item of content may belong to more than one group. If the same content is published in two different peer groups, two different contents may be created. In one embodiment, a content item may be published to make the item's existence known and available to group members using advertisements.

An instance of content is a copy of a content. Each content copy may be replicated on different peers in the peer group. In one embodiment, each copy may have the same content identifier as well as a similar value. Replicating contents within a peer group may help any single item of content be more available. For example, if an item has two instances residing on two different peers, only one of the peers needs to be alive and respond to the content request. In one embodiment, the peer-to-peer platform protocols do not specify how or when contents are replicated. In one embodiment, whether and how to copy an item of content may be a policy decision that may be encapsulated in higher-level applications and services, for example a content management service.

A content may be any computer content (e.g. code, data, applications, active content such as services, or other collection of computer-representable resources). Examples of content include, but are not limited to, a text file, a structured document (e.g. a PDF or a XML file), a Java ".jar" or loadable library, code or even an executable process (checkpointed state). No size limitation is assumed. Each content instance may reside on a different peer in the peer group. The instances may differ in their encoding type. HTML, XML and WML are examples of encoding types. Each instance may have the same content identifier as well as a similar set of elements and attributes, and may even exist on the same peer. An encoding metadata element may be used to differentiate instances of content. Making new instances of content on different peers may help any single item of content be more available. For example, if an item has two instances residing on two different peers, only one of the peers needs to be alive and respond to the content request.

Items of content that represent a network service may be referred to as active content. These items may have additional core elements beyond the basic elements used for identification and advertisement. In one embodiment, active content items may be recognized by Multi-Purpose Internet Mail Extensions (MIME) content type and subtype. In one embodiment, all peer-to-peer platform active contents may have the same type. In one embodiment, the subtype of an active content may be defined by network service providers and may be used to imply the additional core elements belonging to active content documents. In one embodiment, the peer-to-peer platform may give latitude to service providers in this regard, yielding many service implementation possibilities.

Figure 3:
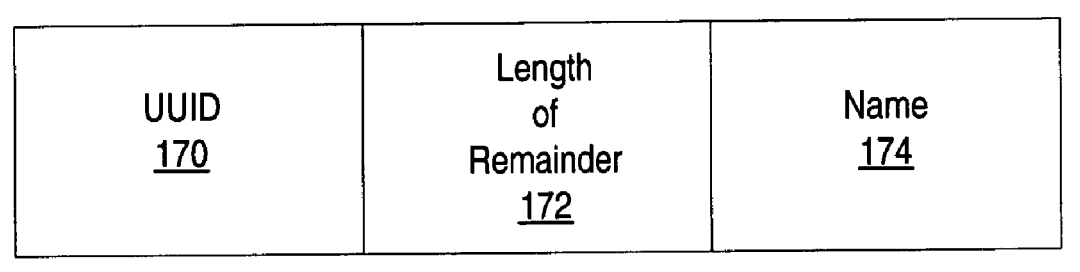

In one embodiment, each item of content may have a unique canonical name. FIG. 3 illustrates an exemplary canonical content name (which may be referred to as a content identifier or content identifier) according to one embodiment. The unique identifier may include a peer group universal unique identifier (UUID) 170, and may include another name 174 that may be computed, parsed, and maintained by peer group members. In one embodiment, the UUID may be a 128-bit field. In one embodiment, the name may be a byte array. In one embodiment, the particular name implementation within a peer group is not mandated by the peer-to-peer platform. The name may be, for example, a hash code, a URI, a URN, or a name generated by any suitable means of uniquely identifying content within a peer group. In one embodiment, a length of remainder field 172 may specify the length of the name field 174 for this content in this particular implementation.

In one embodiment, once a content item has been published to the peer-to-peer network, it may not be assumed that that the content can be later retrieved from the network. The content may be only available from peers that are not currently reachable or not currently part of the network. In one embodiment, once a content item has been published to the peer-to-peer network, it may not be assumed that the content can be deleted. Replication/republication of content by peers on the network may be unrestricted and the content may propagate to peers that are not reachable from the publishing peer.

Pipes

Pipes may provide the primary channels for communication among peers and are a mechanism for establishing communication between peers. Pipes may be used as communication channels for sending and receiving messages between services or applications over peer endpoints. Peer endpoints correspond to the available peer network interfaces that can be used to send and receive data from another peer. Pipes may connect peers that have a direct physical link and peers that do not have a direct physical link. In the latter case, one or more intermediary peer endpoints may be used to route messages between the two pipe endpoints. A pipe instance is, logically speaking, a resource within a peer group. The actual implementation of a pipe instance is typically through a pipe service. In one embodiment, at each endpoint, software to send, or receive, as well as to manage optional associated pipe message queues is assumed, but not mandated.

In one embodiment, pipes are a mechanism for interacting with services on the peer-to-peer network. Rather than assuming a specific naming system such as DNS or a specific network addressing system such as IP, the peer-to-peer platform may abstract these concepts via several mechanisms. Pipes provide a virtual abstraction of the network service using a pipe identifier that is bound to a peer identifier via a pipe advertisement, which in turn is bound to an endpoint address via a peer advertisement and an endpoint advertisement. Pipes can thus be moved from one peer to another providing flexibility in the way a service is deployed and consumed. The location of a machine (node) on the network is abstracted via the concept of the peer that binds to an endpoint. This provides support for dynamic movement of endpoint addresses for a specific peer.

In one embodiment, pipes are implemented as a service on a peer. In one embodiment, in order for a peer to send a message to another peer's pipe, both peers must be part of the same peer group. This allows groups of peers to potentially implement different kinds of pipes, allowing for a flexible approach to communication.

In one embodiment, to connect to a pipe, a peer may send a discovery request for a pipe advertisement containing specific keywords. The peer may then receive the requested pipe advertisement. The peer may then send a pipe resolver request for a peer matching the pipe identifier and may then receive the peer advertisement, for example from a pipe service that handles the request. The peer may then send data down the pipe, for example using a URL addressing scheme.

In one embodiment, pipes in the peer-to-peer platform may be asynchronous, unidirectional, stateless and unreliable to provide the lowest overhead. In one embodiment, pipes may be unidirectional, and thus there may be input pipes and output pipes. Asynchronous pipes may enable developers to build large-scale interconnected distributed services and applications. In one embodiment, pipes may be indiscriminate, and may thus support binary code, data strings, Java technology-based objects, and/or applets, among others. In one embodiment, the peer-to-peer platform may not define how the internals of a pipe work. Any number of unicast and multicast protocols and algorithms, and combinations thereof, may be used. In one embodiment, one pipe may be chained together with each section of the chain using a different transport protocol.

The pipe endpoints may be referred to as input pipes (receiving end) and output pipes (sending end). Pipes may provide the illusion of a "virtual" in and out mailbox that is independent of any single peer location and network topology (e.g. multi-hops route). Services and applications may communicate through pipes without knowing on which physical peer a pipe endpoint is bound. When a message is sent into a pipe, the message is sent to all peer endpoints currently connected (listening) to the pipe. The set of currently connected pipe endpoints (input pipes) may be obtained using the pipe binding protocol.

Unlike conventional mechanisms, peer-to-peer platform pipes may have ends that may be moved around and bound to different peers at different times, or not connected at all. In one embodiment, pipes may be virtual, in that a pipe's endpoint may be bound to one or more peer endpoints. In one embodiment, pipe endpoints may be non-localized to a physical peer, and may be dynamically bound at creation time or runtime via the pipe binding protocol. The pipe binding process may include discovering and connecting the two or more endpoints of a pipe.

Using pipes, developers may build highly available services where pipe connections may be established independently of a peer location. This dynamic binding of pipes helps to provide redundant implementation of services over a P2P network. A peer may logically "pick up" a pipe at any point in time. For example, a peer that wants to use a spell checker service man connect to a peer group's spell checker pipe that is implemented as a redundant peer group service. The peer may be serviced as long as there is at least one single instance of a spell checker service still running somewhere within the peer group. Thus, using pipes as described herein, a collection of peers together may provide a high level of fault tolerance, where a new peer at a different location may replace a crashed peer, with the new peer taking over the existing pipe to keep the communication going.

In one embodiment, enhanced pipes with additional properties such as reliability, security, and quality of service may be supported. In embodiments where the peer-to-peer platform runs on top of transports that have such properties, an implementation may optimize and utilize the transports. For example, when two peers communicate with each other and both have TCP/IP support, then an implementation may use the bi-directional capabilities of TCP/IP to create bi-directional pipes. Other data transfer methods that may be implemented by pipes as provided at the service layer to provide different quality of service include, but are not limited to: synchronous request-response (the endpoint sends a message, and receives a correlated answer), streaming (efficient control-flow data transfer), bulk transfer (bulk reliable data transfer of binary data), and secure (secure reliable data streams).

Figure 4:
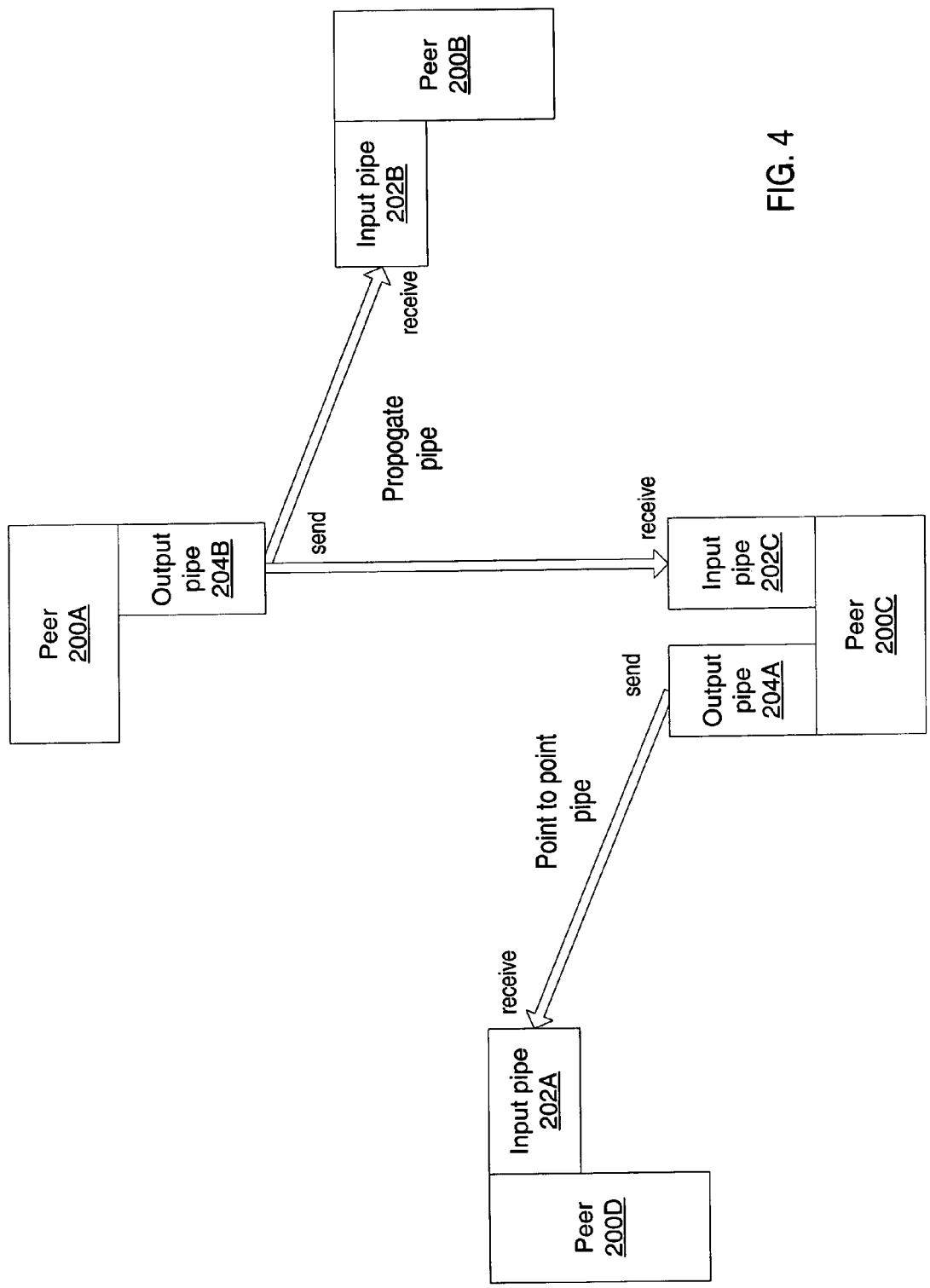
FIG. 4 illustrates a point-to-point pipe connection between peers according to one embodiment.

Pipes may offer several modes of communication. FIG. 4 illustrates a point-to-point pipe connection between peers 200C and 200D according to one embodiment. In one embodiment, a point-to-point pipe connects exactly two peer endpoints together, an input pipe 202A that receives messages sent from an output pipe 204A. The pipe appears as an output pipe to the sender and as an input pipe to the receiver, with traffic going in one direction only—from the sender to the receiver. In one embodiment, no reply or acknowledgement operation is supported. In one embodiment, additional information in the message payload (for example, a unique identifier) may be required to thread message sequences. The message payload may also contain a pipe advertisement that can be used to open a pipe to reply to the sender (send/response).

FIG. 4 also illustrates a propagate pipe with peer 200A as a propagation source and peers 200B and 200C with listening input pipes according to one embodiment. A propagate pipe may connect two or more peer endpoints together, from one output pipe 204B to one or more input pipes (e.g. 202B and 202C). The result is that any message sent into the output pipe is sent to all input pipes. Messages flow into the input pipes from the output pipe (propagation source). A propagate message may be sent to all listening input pipes. This process may create multiple copies of the message to be sent. On transports that provide multicast (e.g. TCP/IP), when the propagate scope maps to underlying physical subnets in a one-to-one fashion, transport multicast be may used as an implementation for propagate. Propagate may be implemented using point-to-point communication on transports that do not provide multicast such as HTTP.

Messages

In one embodiment, the peer-to-peer platform may use asynchronous messages as a basis for providing Internet-scalable peer-to-peer communication. The information transmitted using pipes may be packaged as messages. Messages define an envelope to transfer any kinds of data. A message may contain an arbitrary number of named subsections that may hold any form of data. In one embodiment, the messages may be in a markup language. In one embodiment, the markup language is XML. Each peer's messaging layer may deliver an ordered sequence of bytes from the peer to another peer. The messaging layer may send information as a sequence of bytes in one atomic message unit. In one embodiment, messages may be sent between peer endpoints. In one embodiment, an endpoint may be defined as a logical destination (e.g. embodied as a URN) on any networking transport capable of sending and receiving Datagram-style messages. Endpoints are typically mapped into physical addresses by the messaging layer at runtime.

In one embodiment, a message is a set of named and typed contents called elements. Thus, a message may be a set of name/value pairs. The content may be of arbitrary types. Core services may send advertisements as message element content.

As a message passes down a protocol stack (applications, services, endpoint and transports), each level may add one or more named elements to the message. As a message is passed back up the stack on the receiving peer, the protocol handlers may remove those elements. In one embodiment, a message is an ordered sequence of message elements. In one embodiment, the most recently added element appears at the end of the message.

In one embodiment, a message element may include one or more of, but is not limited to, a namespace, a name (which may be optional), a type (which may be optional), a signature or digest (which may be optional), and content. In one embodiment, every message element may be assigned to a namespace. Namespaces may be used to organize elements used by different message users and transports within the same message. In one embodiment, two namespaces names are considered equivalent if their representation is byte-for-byte identical.

In one embodiment, one or more message element namespaces may be pre-defined and reserved for user applications and services; peer-to-peer platform protocols and/or services may not use or modify elements in these reserved namespace. In one embodiment, one or more namespaces may be reserved for internal use by the peer-to-peer platform protocols and services. In this embodiment, applications preferably do not create, manipulate or assume the interpretation of any of the content of elements in these namespaces. In some bindings, applications may be forbidden from accessing or creating elements in these namespaces. In one embodiment, use of namespaces by services and applications may be optional. In one embodiment, namespaces may not require formal registration as the protocols used need only be agreed upon by the participants.

In one embodiment, message elements may have an optional name. Elements in the same message may have the same name.

In one embodiment, a type may be specified as a MIME type. The type may be used by the applications and services that process the element. In one embodiment, there may be no restriction on the set of MIME types that can be used by applications and services. In one embodiment, the type of the element may be examined by a peer-to-peer platform transport to determine how to format the message element to ensure the most efficient transfer. In one embodiment, if a type is not specified for an element, an application stream may be assumed.

In one embodiment, the contents of the element data may be opaque to except to the applications and services which use these elements.

In one embodiment, a message may be a Datagram that may include an envelope and a stack of protocol headers with bodies and an optional trailer. The envelope may include, but is not limited to, a header, a message digest, (optionally) the source endpoint, and the destination endpoint. In one embodiment, each protocol header may include, but is not limited to, a tag naming the protocol in use and a body length. Each protocol body may be a variable length amount of bytes that is protocol tag dependent. Each protocol body may include, but is not limited to, one or more credentials used to identify the sender to the receiver. In one embodiment, such a message format may support multiple transport standards. In one embodiment, an optional trailer may include traces and accounting information.

The messaging layer may use the transport specified by the URN to send and receive messages. In one embodiment, both reliable connection-based transports such as TCP/IP and unreliable connectionless transports like UDP/IP may be supported. Other existing message transports such as IrDA, and emerging transports like Bluetooth may be supported using the peer endpoint addressing scheme. In one embodiment, peer-to-peer platform messages may be useable on top of asynchronous, unreliable, and unidirectional transport. In one embodiment, the peer-to-peer platform protocols may use a low-level message transport layer (e.g. XML) as a basis for providing Internet-scalable peer-to-peer communication. In one embodiment, the peer-to-peer platform may not assume that the networking transport is IP-based.

The message digest in the envelope may be used to guarantee the data integrity of messages. Messages may also be encrypted and signed for confidentiality and refutability. In one embodiment, each protocol body may include one or more credentials used to identify the sender to the receiver. A credential is a key that, when presented in a message body, may be used to identify a sender and to verify that sender's right to send the message to the specified endpoint. In one embodiment, the credential may be an opaque token that may be presented each time a message is sent. In one embodiment, the sending address placed in the message envelope may be crosschecked with the sender's identity in the credential. Credentials may be stored in the message body on a per-protocol <tag> basis. In one embodiment, the exact format and content of the credentials are not specified by the peer-to-peer platform. For example, a credential may be a signature that provides proof of message integrity and/or origin. As another example, a message body may be encrypted, with the credential providing further information on how to decrypt the content. In one embodiment, each credential's implementation may be specified as a plug-in configuration, which may allow multiple authentication configurations to coexist on the same network.

When an unreliable networking transport is used, each message may be delivered more than once to the same destination or may not arrive at the destination. Two or more messages may arrive in a different order than sent. In one embodiment, high-level communication services layered upon the core protocols may perform message re-ordering, duplicate message removal, and processing acknowledgement messages that indicate some previously sent message actually arrived at a peer. Regardless of transport, messages may be unicast (point to point) between two peers or may be propagated (like a multicast) to a peer group. In one embodiment, no multicast support in the underlying transport is required. In one embodiment, peers receiving a corrupted or compromised message may discard the message. Messages may be corrupted or intentionally altered in transmission on the network.

In one embodiment, the peer-to-peer platform may not mandate how messages are propagated. For example, when a peer sends out a peer discovery message, the peer discovery protocol may not dictate if the message should be confined to the local area network only, or if it must be propagated to every corner of the world.

Figure 5:
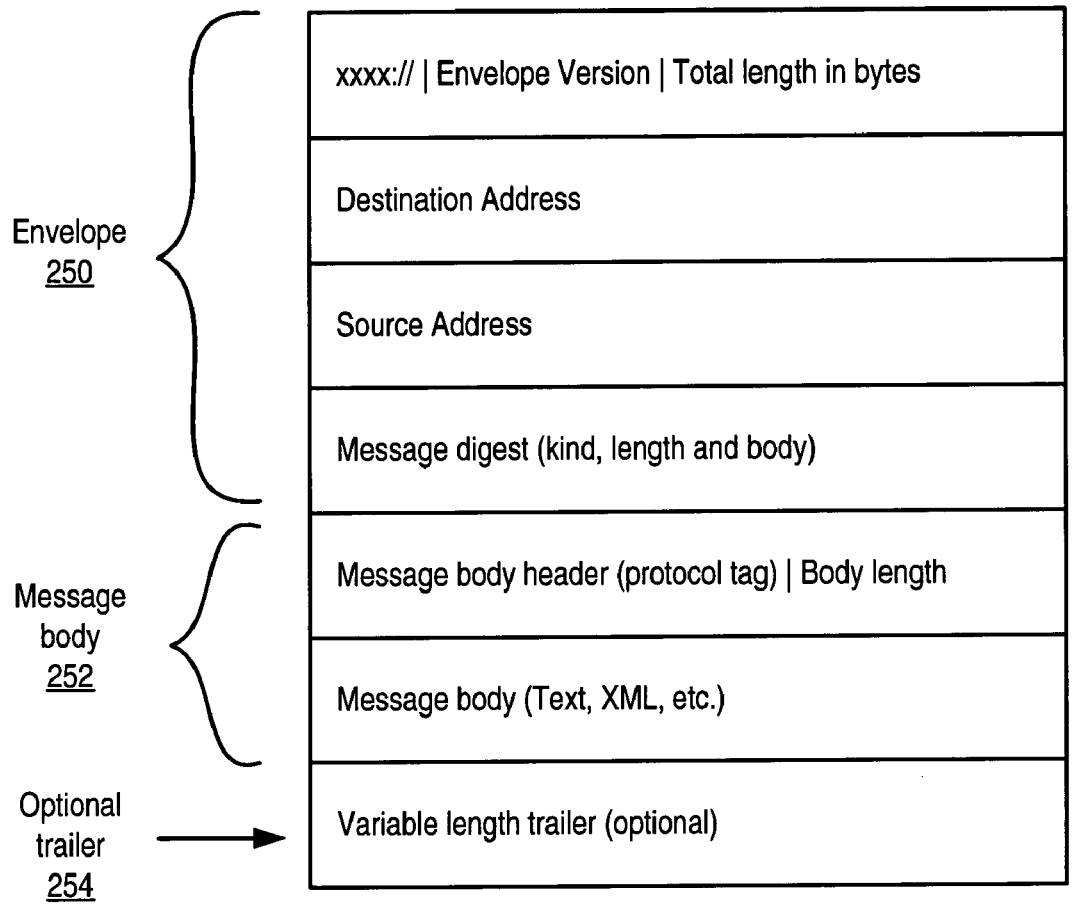
FIG. 5 illustrates a peer-to-peer platform message format according to one embodiment.

In one embodiment, the peer-to-peer platform messages 252 may be defined with the envelope 250 as illustrated in FIG. 5. In one embodiment, the messages are defined in a markup language. In one embodiment, the markup language is XML. The following is an exemplary message in XML:

<SampleMessage>
  <SampleMessageVersion> version number "1.0"</SampleMessageVersion>
  <SampleMessageDest> destination peer identifier </SampleMessageDest>
  <SampleMessageSrc> source peer identifier </SampleMessageSrc>
  <SampleMessageDigest> digest </SampleMessageDigest>
  <SampleMessageTagName> tag </SampleMessageTagName>
  <SampleMessageTagData> body </SampleMessageTagData>
  ...
  <SampleMessageTagName> tag </SampleMessageTagName>
  <SampleMessageTagData> body </SampleMessageTagData>
  <SampleMessageTrailer> String</SampleMessageTrailer>
</SampleMessage>

The version number may be a string. The destination and source peer identifier may be represented as peer-to-peer platform identifiers (UUIDs). In one embodiment, the digest is either an MD5 or SHA1 hash or a digital signature. The digest may serve as a placeholder for either. A message may have as many tag parts as needed. In one embodiment, the tag name may be a string and the body may be a byte array containing a string without XML escape characters ("<", ">") or a base64 encoded string.

In one embodiment, the message format may support binary data and/or multi-part messages with MIME-types. The message format may allow for arbitrary message header fields, including optional header fields. The message format may allow for data verification of message content and the cryptographic signing of messages. The message format may provide an arbitrary number of named subsections that may contain any form of data of any (reasonable) size. The message format may be "email-safe" such that its contents may be extracted reliably after standard textual transformations committed my E-mail client and server software.

Software Modules

In a peer-to-peer network, one embodiment of a peer-to-peer platform may use a mechanism for abstract identity and definition of software modules (e.g. services, applications, etc.) to provide information about the programming interface and functionality of the software modules independently of protocols and behaviors that may be used to implement the software modules. Further, software modules in a peer-to-peer network may provide one or more implementations of a given functionality, using various protocols and behaviors, while retaining a common programming interface. The software modules may also provide one or more different network-compatible implementations for different execution environments.

Embodiments may use identifiers (e.g., UUIDs) and advertisements as described herein to describe and identify software modules, such as services and applications, in a hierarchical manner. In one embodiment, a software module may be described in a module class advertisement and given a module class identifier. If that software module is used for different purposes in the same context, the software module may be further identified by an extension to its module class identifier referred to as a role identifier. Each independent embodiment of the software module that provides an independent set of network protocols and behaviors may be assigned a module specification identifier.

In one embodiment, all implementations of all embodiments of a given module class for a given execution environment may have the same programming interface. Therefore, software modules interacting locally may express their dependencies via their respective class identifiers (including the role extension), regardless of the particular execution environment and embodiment that was selected when configuring that environment.

In one embodiment, a software module may be assigned a module class identifier. Each independent embodiment of the software module that provides an independent set of network protocols and behaviors may be described by a module specification advertisement and assigned a module specification identifier. In one embodiment, a module specification identifier may be an extension of the identifier of the module class of which the module specification is an embodiment. In one embodiment, each implementation of each module specification may be described by a module implementation advertisement that may include one or more of, but is not limited to, the following information: a module specification identifier, an execution environment description, and a reference to a software environment (e.g. a software package which implements the module specification for the execution environment).

Figure 31:
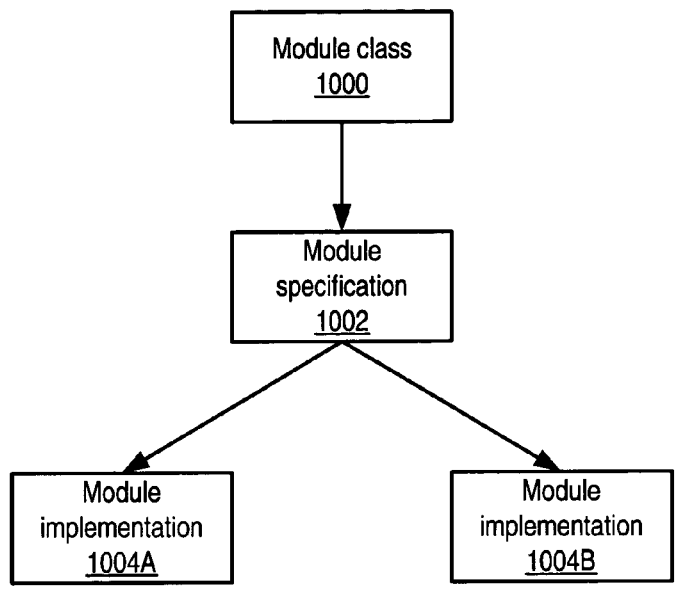
FIG. 31 illustrates a tiered architecture for abstracting software modules according to one embodiment.
Figure 32:
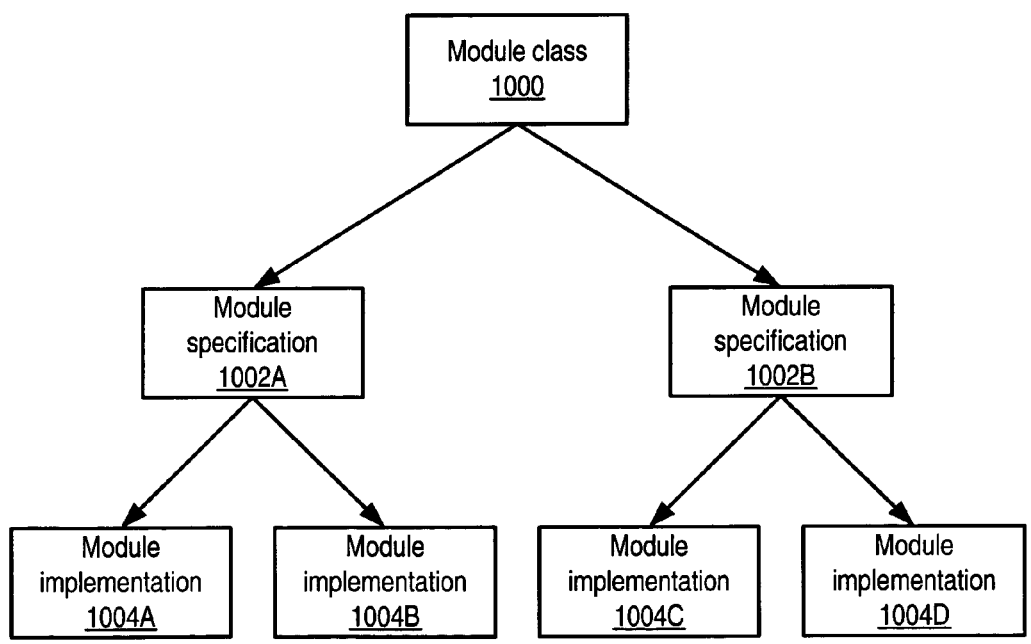
FIG. 32 illustrates a tiered architecture for abstracting software modules according to another embodiment.

To abstract software modules in peer-to-peer networking environments, embodiments may use a tiered architecture to define modules (e.g. services, advertisements, etc.) in a peer-to-peer environment. FIG. 31 illustrates this tiered architecture according to one embodiment. A first level of the tier may include one or more module classes 1000. In one embodiment as illustrated in FIG. 31, each module class 1000 may have one module specification 1002. A module specification 1002 may have one or more module implementations 1004. FIG. 32 illustrates the tiered architecture according to another embodiment. In this embodiment, each module class 1000 may have one or more module specifications 1002. Each module specification 1002 may have one or more module implementations 1004.

In one embodiment, the module class 1000 may include and/or define one or more of, but is not limited to, the "role" a module plays (e.g., in a peer group), how the module appears to other modules (e.g., services and applications), plus the module's API in each supported binding. In one embodiment, the module specification 1002 may include and/or define one or more of, but is not limited to, the module's behavior as it appears from the outside (e.g. from other modules), including the module's wire protocol and the module's compatibility with other instances of the same module, for example on other peers. In one embodiment, the module implementation(s) 1004 may include one or more implementations of each module specification 1002, with each module implementation being specific for one or more of various execution environments, bindings and other constraints. Each of these aspects of a module may be published separately in advertisements.

To access a software module, a peer (or other entity such as another software module (e.g. service, application, etc.)) may use a discovery process such as that described herein for the peer-to-peer platform to discover a module implementation advertisement corresponding to the execution environment of the peer. In one embodiment, the discovery process may search for and discover peer specification advertisements that meet the specification requirements of the peer, and use the one or more discovered peer specification advertisements to locate a particular peer implementation advertisement for a module implementation suitable for use in the peer's execution environment.

The layers of advertisements (module class, module specification, and module implementation) may be used to abstract the software modules (e.g. services) and platforms, to locate specifications for desired software modules, to locate implementations of the software modules, and to load and run the software modules.

Embodiments may provide a mechanism to identify a particular software module (e.g. a service) and its behavior. In one embodiment, a software module such as a service may be described with a module specification identifier. The module specification advertisement describes the software module, e.g. the behavior of the software module. In one embodiment, no matter what platform a user (or other entity such as another software module) is on, the user or other entity may locate (e.g. by a discovery process) a particular implementation of the software module for the particular platform and be able to use the software module. The module implementation advertisements may describe implementations of the software module (which may be identified by a module specification identifier, included in the module implementation advertisements and the module specification advertisement) for different platforms, e.g. Windows, Unix and Solaris platforms.

As an example, a user or other entity may be able to locate and use a particular implementation of a printing service for use with the platform the user or other entity is on. In one embodiment, the user or other entity may first search for and locate a specification for the software module, and once that is located the user or other entity may look for a particular implementation of the software module usable on the user or other entity's platform, load the implementation of the software module according to the advertisements for use on the platform, and run the software module.

The layers of advertisements may also serve to separate the specification from the implementation. This may reduce the size of the module implementation advertisements, as the advertisements do not need to include the full specification for the software module but instead may refer back to the specification advertisement via the module specification identifier. This may allow software modules to be initially located by specification for a particular class of functionality, rather than having to search through many implementation advertisements of software modules to find a desired implementation of a specification, preferably making the discovery process simpler.

In one embodiment, after locating a desired module implementation advertisement, using a PURI (Package Uniform Resource Identifier, described below) of the module implementation advertisement, on a Java platform, a URI or URL to the actual code of the software module may be specified. On other platforms such as Unix and Linux, a file location may be specified by URL, URI, or other mechanisms. The code may be downloaded, referenced on disk, or referenced by the URI or other mechanism. The SURI (Specification URI, described below) of the module specification advertisement may function similarly to retrieve a document containing the module specification Services Peers may cooperate and communicate to publish, discover and invoke network services. A service denotes a set of functions that a provider offers. In one embodiment, a peer-to-peer platform peer can offer a service by itself or in cooperation with other peers. In one embodiment, a peer may publicize a service by publishing a service advertisement for the service. Other peers may then discover the service using the peer discovery protocol (through the advertisement) and make use of it. A peer may publish as many services as it can provide.

In one embodiment, services may either be pre-installed into a peer or loaded from the network. The process of finding, downloading and installing a service from the network may include performing a search on the network for the service, retrieving the service, and then installing the service. Once a service is installed and activated, pipes may be used to communicate with the service. In one embodiment, peer-to-peer platform-enabled services may publish pipe advertisements as their main invocation mechanism. The service advertisement may specify one or more pipe advertisements that may be used by a peer to create output pipes to invoke the service. The service advertisement may also include a list of predetermined messages that may be sent by a peer to interact with the service. The service advertisement may describe all messages that a client may send or receive.

Several methods may be provided by various embodiments to publish a service. Services may be published before creating a new peer group by adding the service advertisement to the peer group advertisement. Services may also be published by adding the services in a separate peer service advertisement. The discovery service may also allow new advertisements to be added at runtime. The new advertisement will belong to a predefined peer group. Other methods of publishing services may be provided. Note that service advertisements may be placed in the peer group advertisement of any group. Since all peers belong to the global peer group, a peer may publish the service in the global peer group advertisement to make it available to any peer.

In one embodiment, services advertised in a peer group advertisement may be instantiated for a peer when the peer joins the group. In one embodiment, all the services are instantiated. In another embodiment, none, one, or more of the advertised services may be instantiated when the peer joins the peer group. Service advertisements in the peer group advertisement may include resolver, discovery, membership, peer information and pipe service advertisements. In one embodiment, services advertised in a peer group advertisement are loaded on the peer when the peer boots. In one embodiment, this automated loading is not mandatory but is part of the Java Binding. One embodiment may provide a mechanism to force a service in a peer group advertisement to be instantiated by a peer.

In one embodiment, when a peer boots, any services advertised in the peer advertisement are loaded. The peer advertisement corresponds to the platform advertisement. These services may include the minimal set of services to bootstrap the creation of new peers: discovery service, membership service, resolver service, peer information service and pipe service.

In one embodiment, when a peer switches from one peer group to another, the first group's services remain active. In one embodiment, a peer may call a stop method on the service application interface to stop an instance of a local service. A peer that is a member of one peer group that refers to a service may join a second peer group that also refers to the service while still a member of the first. Whether the service is instantiated once or twice may depend on the service implementation. Some service implementations may use a static instantiation that is done once. In this case, all groups share the same instance. Other service implementations are local to a peer group and are not aware of the state of any other peer groups on the same node.

In one embodiment, services may use a "time to live" indicator that defines when the service was created, and may also define the lifetime of the service. After its lifetime has expired, the stale service may be purged.

A service may be well-defined and widely available so that a peer can use it directly. Other services may require special code to access the service. For example, the way to interface with the service provider may be encoded in a piece of software. In this example, it may be desirable for the peer to be able to locate an implementation that is suitable for the peer's specific runtime environment. In one embodiment, if multiple implementations of the same service are available, then peers hosted on Java runtimes can use Java programming language implementations while native peers to use native code implementations. In one embodiment, service implementations may be pre-installed into a peer node or loaded from the network. In one embodiment, once a service is installed and activated, pipes may be used to communicate with the service.

In one embodiment, each service may have a unique identifier. In one embodiment, a service may have a name that may include a canonical name string that may indicate the type and/or purpose of the service. A service may also provide optional information (e.g. a set of descriptive keywords) that further describes the service. The unique identifier, name and optional information may be stored within a service advertisement. The advertisement may also include other information needed to configure and instantiate a service.

In one embodiment, the peer-to-peer platform may recognize two levels of services, peer services and peer group services. A service that executes only on a single peer may be referred to as a peer service. A peer service is accessible only on the peer that is publishing the service. If that peer happens to fail, then service also fails. This level of service reliability may be acceptable for an embedded device, for example, providing a calendar and email client to a single user. Multiple instances of the service may be run on different peers, but each instance publishes its own advertisement. A service that is composed of a collection of cooperating instances (potentially cooperating with each other) of the service running on multiple peers in a peer group may be referred to as a peer group service. A peer group service may employ fault tolerance algorithms to provide the service at a higher level of availability than that a peer service can offer. If any one peer fails, the collective peer group service may not be affected, because the service may still be available from at least one other peer member. Peer group services may be published as part of the peer group advertisement.

In one embodiment, the peer-to-peer platform may include a set of default peer group services such as peer discovery, as well as a set of configurable services such as routing. In one embodiment, a peer-to-peer platform peer may not be required to have one or all of these services. For example, a cell phone peer may be pre-configured with enough information to contact a fixed server provided by the telecom operator. This may be enough to bootstrap the cell phone peer without requiring it to independently carry with it additional services.

In one embodiment, although the concept of a service is orthogonal to that of a peer and a peer group, a peer group formed using the peer-to-peer platform may require a minimum set of services needed to support the operation of the group. Some services may be well known and may be referred to as peer-to-peer platform core services. Embodiments of the peer-to-peer platform may define a set of core peer group services that may be used to form and support peer groups. In one embodiment, the core peer group services may provide the minimum services required to form a peer group (e.g. membership and discovery services). In one embodiment, the peer-to-peer platform core services may be 100% decentralized and thus may enable pure peer-to-peer network computing. In one embodiment, it is not required that all core services be implemented by every peer group.

In one embodiment, the peer-to-peer platform may define peer group core services including, but not limited to, a discovery service, a membership service, an access service, a pipe service, a resolver service and a monitoring service. A discovery service may be used to search for peer group resources such as peers, peer groups, and pipes. The search criteria may include a resource name. Discovery and discovery services are described more fully later in this document.

In one embodiment, most peer groups will have at least a membership service. Current peer group members may use the membership service during the login process to reject or accept a new peer group membership application. The membership service may be a "null" authenticator service that imposes no real membership policy. Peers wishing to join a peer group first locate a current member, and then request to join. The application to join may be either rejected or accepted by the collective set of current members. The membership service may enforce a vote of peers or alternatively elect a designated group representative to accept or reject new membership applications.

An access service may be used to validate, distribute, and authenticate a group member's credentials. The access service may define the type of credential used in the message-based protocols used within the peer group. The access service may be used to validate requests made by one peer to another. The peer receiving the request provides the requesting peer's credentials and information about the request being made to the access service to determine if the access is permitted. In one embodiment, not all actions within the peer group need to be checked with the access service, only those actions which only some peers are permitted to use.

A pipe service may be used to establish and manage pipe connections between the different peer group members. A resolver service may be used to send query string to peers to find information about a peer, a peer group, a service or a pipe. A monitoring service is used to allow one peer to monitor other members of the same peer group.

In on embodiment, not all the above services are required to be implemented by a peer group. Each service may implement one or more of the peer-to-peer platform protocols. In one embodiment, a service may implement at least one protocol for simplicity and modularity reasons, but some services may not implement any protocols.

Other services may be user-defined and provide application dependent services such as content searching and indexing. A user-defined service may provide additional APIs. User-defined services may be implemented that may offer the ability to mix-in centralization as a means of increasing performance. In one embodiment, the peer-to-peer platform core services may provide a reference implementation for user-defined services. Examples of user defined services may include, but are not limited to:

- Efficient long-distance peer lookup and rendezvous using a peer naming and discovery service.
- Simple, low-cost information search and indexing using a content sharing service.
- Interoperability with existing centralized networking infrastructure and security authorities in corporate, public, private, or university networks using administration services.
- A resolver service may be implemented to find active (running on some peer) and inactive (not yet running) service instances.
- An FTP service that allows file transfers among peers over pipes using FTP.

Network Services

Embodiments of the mechanism for abstract identity and definition of software modules in peer-to-peer networking environments may be used in implementing network services. A network service may be considered as one type of software module that may be abstracted using the mechanism. Software modules may also include applications, among other types.

In one embodiment, peers may cooperate and communicate to publish, discover and invoke network services. In one embodiment, peers may discover network services via the peer discovery protocol of the exemplary peer-to-peer platform described herein. In one embodiment, network services may include peer services and peer group services. A peer service may be accessible only on the peer that is publishing the service. If that peer happens to fail, then the service also fails. Multiple instances of the service may be run on different peers, but each instance publishes its own advertisement. A peer group service is composed of a collection of instances (potentially cooperating with each other) of the service running on multiple members of the peer group. If any one peer fails, the collective peer group service may not be affected, because the service may still be available from another peer member. Peer group services may be published as part of the peer group advertisement.

In one embodiment, services may be pre-installed into a peer or loaded from the network. The peer may follow a process of finding, downloading and installing a service from the network. To run a service, a peer may have to locate an implementation of the service (i.e. a module implementation) suitable for the peer's runtime environment. Multiple implementations of the same service may allow, for example, Java peers to use Java code implementations, and native peers to use native code implementations.

In one embodiment, the peer-to-peer platform may be designed to interoperate and be compatible with various Web service standards including one or more of, but not limited to, WSDL, uPnP, RMI, etc. The peer-to-peer platform protocols may define a generic framework to publish and discover advertisements that may describe services. In one embodiment, peers may publish and discover advertisements via the peer discovery protocol. In one embodiment, an advertisement for a service may include necessary information to either invoke or instantiate the service being described. In one embodiment, one or more peer-to-peer platform protocols may define module advertisements to describe services.

In one embodiment, peer-to-peer platform-enabled services are services that are published using module specification advertisements. In one embodiment, a module specification advertisement may specify a pipe advertisement that may be used by a peer to create output pipes to invoke the service. In one embodiment, a module specification advertisement may include a list of pre-determined messages that may be sent by a peer to interact with the service. In one embodiment, a module specification advertisement may include references to one or more other services that may be used as an authenticator for the service and/or as a local proxy for the service. In one embodiment, each service may be uniquely identified by its module specification identifier.

In one embodiment, a service may have several aspects including, but not limited to:

- The "role" the service plays in the group; how the service appears to other services and applications, plus the service's API in each supported binding. This may be referred to as the service class (i.e. the module class).
- The service's apparent behavior from the outside, including, but not limited to, wire protocol, and compatibility with the same service on other peers. In other words, a central definition of a service, or the service's specification. This may be referred to as the service specification (i.e. the module specification).
- One or more implementations of the specification for various execution environments, bindings and other constraints. These may be referred to as the service implementations (i.e. module implementations).

Each of these aspects of a service may be published separately, e.g. by the module advertisements described above. In one embodiment, there may be more specifications than classes and more implementations than specifications. In many cases, only the implementation is needed, for example, when instantiating a group that uses the service(s). The layered arrangement of class/specification(s)/implementation(s) may help save storage space by not requiring that information be duplicated in all implementation advertisements, and may help to prevent the downloading of unneeded data. If this information was duplicated in all implementation advertisements, not only would it occupy more storage space than needed, but it also may cause the downloading of unneeded data.

Service specifications may be assigned a unique identifier at the time the advertisement is published. Service implementations may use this identifier to denote which service specification they implement. Service classes may be assigned a unique identifier when the class's advertisement is first published.

In one embodiment, service specifications may use identical implementations; therefore, service specification advertisements may include a "free form" parameter section that includes one or more parameters that may be used to control behavior. In one embodiment, service implementations may use identical code; therefore, service implementation advertisements may include a "free form" parameter section that includes one or more implementation-dependent parameters.

In one embodiment, services may refer to each other (such as when obtaining the interface of another service from the group) by their class identifier.

In one embodiment, the same service specification may be used to perform more than one role in a group. For example, consider two instances of the same data base service with two completely different data set and purposes. To support this, it service class identifiers may be extended with a "role" suffix. In this embodiment, service class identifiers without a role suffix may accept a null role suffix as a valid role suffix. Thus, service class identifiers may be "roled," and if "roleing" is never needed, only a short service class identifier may be needed.

In one embodiment, service specification identifiers may built from the class identifier of the class that the service specification implements. In one embodiment, only the base class UUID may be included so that service specification identifiers are unchanged by the addition of roles. This may be used, for example, to verify that a service specification does have the interface implied by the corresponding service class, regardless of the role for which it is used.

In one embodiment, service implementation advertisements may list compatibility requirements which may make them eligible to be loaded by a given group running in a given peer-to-peer platform implementation.

In one embodiment, groups, applications and endpoints may have similar constraints as services. For a group, the group specification may list the service specifications that this group supports. There may be one or more implementations, depending on various execution constraints. Endpoints and applications may function similarly or identically to services (i.e. groups, applications and endpoints may be considered "modules" as are services). Therefore, the mechanisms described above for services may also be used for groups, applications and endpoints.

In one embodiment, a peer group specification advertisement may include indications of services, endpoints and initial applications of the peer group.

Similarly to how service implementations are correlated to service specifications by a service specification identifier, a peer group implementation may be correlated to a group specification by a unique identifier. This identifier may be referred to as a peer group identifier. A peer group specification may be a relatively large document. In one embodiment, since most of the peer group specification may only be needed if the group is to be instantiated, for publicizing a group, a peer group specification advertisements including only a name, an identifier, and one or more keywords may be used to publish a peer group. In one embodiment, to reduce the size of peer group specification advertisements, inheritance may be used between group definitions. Since most groups have a lot in common, a peer group specification advertisement may refer to another advertisement which may be common and therefore cached. The above approaches to reducing the size of peer group specification advertisements may be complementary.

In one embodiment, groups may load plug-in services according to the group's implementation. In one embodiment, service descriptions may not be required in a group advertisement. However, even if services are not implemented via plug-ins, the existence of services may be a property of the group that is visible "on the wire." Therefore, peer group specification advertisements may list references to service specifications (e.g. the service specification identifier). In one embodiment, it may be the responsibility of a group's implementation to realize the services listed in the peer group specification advertisement by loading a supported implementation for each service, by implementing the service internally, or optionally using one or more other mechanisms. In one embodiment, the service realization mechanism(s) used is group implementation dependent.

In one embodiment, module (e.g. service) specification advertisements may not need to be downloaded in order to instantiate a group unless one of the module (e.g. service) implementations needs parameters from the module (e.g. service) specification. In one embodiment, module (e.g. service) specifications may be used by users when creating an implementation of the module (e.g. service).

In one embodiment, groups may need to uniquely identify each of their services, for example, to improve the robustness of demultiplexing service-addressed messages. Since each service in a group belongs to a service class, and no more than one service of each class may exist in a group, the combination of the group identifier and the service class identifier uniquely identify that service for service addressing purposes.

In one embodiment, services may bind to and use each other. In obtaining an interface to one of the other services, a service may use the other service's class identifier to designate this other service. Services "know" each other by their role; and therefore they designate each other by their class identifiers. For example, an implementation of a discovery service may know that it needs a "Resolver."

In one embodiment, for each service, a group advertisement may list service specification identifiers for services of the group, since each service specification identifier includes a corresponding service class identifier. In one embodiment, to support roles, a group advertisement may optionally list an additional service class identifier for each service. This identifier may differ from that embedded in the specification identifier includes in that the former may have a role suffix and not the latter. In one embodiment, no two services may be assigned the same role in a given group.

In one embodiment, peer groups may have a variety of specifications, but may use a small number of implementations for the peer group API itself. The specification of the peer group functionality is the peer group specification advertisement, with its unique features and identifier. In one embodiment, to avoid publishing identical peer group implementation advertisements (except for the service specification identifier of the group) for each group, roles may be used. Similar to services, groups may come in a small family of APIs and behavior of the peer group class, and any number of roles for which they are used (e.g. in the case of a group, various communities of users). Therefore, the "Role" model described for services may be extended to groups. There may be more than one class of group. Further, there may be Roles in these group classes. In one embodiment, the role identifier may include the base class plus role suffix.

In one embodiment, a peer group specification advertisement may have two identifiers: the specification identifier that corresponds to the particular group service specification that is being used and the full class identifier (in one embodiment, including a role extension) that may be different for every group. In one embodiment, a service specification advertisement may include a class identifier in addition to a specification identifier, thereby specializing it for a given role (e.g. by changing parameters). In one embodiment, service specifications may be looked-up by their specification identifier, and service specifications may not be specialized for a role. In one embodiment, peer group specification advertisements may be looked-up by specification identifier and role identifier. In one embodiment, not specifying a role identifier when looking up a group may result in an error, but may be used for browsing purposes.

In one embodiment, specifying a group may require one or more of, but may not be limited to:

Identifiers:
  A peer group identifier: Identifies the community built around that group. May be turned into a full class identifier when they become different from base class identifiers.
  A peer group specification identifier: Equivalent to a service specification identifier. Identifies the behavior of the Peer Group class (in the programming sense) being used, not the community build around it.

Advertisements (may be optional or required):
  Service class advertisement. In one embodiment, may be required.
  Peer group specification advertisement: Name, identifier, the list of all services, etc. May be inherited from another group. In one embodiment, may be required. Peer group implementation advertisement: one implementation of the code that drives the group. In one embodiment, may be cached and reused. In one embodiment, may be required.
  Peer Group Advertisement: an abbreviated publicizing of the group. In one embodiment, may be optional.

In one embodiment, describing a service may require one or more of, but may not be limited to:

Identifiers:
  Service class identifier: denotes functionality and an expected API per supported binding (e.g., pipe, resolver, discovery, etc.). In one embodiment, if there is no role suffix (role==base class), this may be fully embedded in a service specification identifier and therefore may need to be repeated in the group advertisement.
  Service specification identifier: denotes additional on-the-wire behavior in providing a service defined by its class (e.g., platform's pipe, Intermittent Pipe, Reliable Pipe, etc.)

Advertisements:
  Service class advertisement: describes a role and may describe a per-platform set of APIs docs.
  Service specification advertisement: describes a protocol and behavior. In one embodiment, may be specialized for a role.
  Service implementation advertisement: describes an implementation for a given platform. In one embodiment, may be cached and reused.

In one embodiment, group identifiers may be constructed so that they are upward compatible with full class identifiers.

In one embodiment, there is one peer advertisement for each group instantiated on a peer. In one embodiment, a peer advertisement may describe only what is relevant to this group on this peer, in addition to describing the group. A peer advertisement may include one or more of, but is not limited to, one or more parameters that are particular to one given peer for each service, a peer identifier, name and keywords. In one embodiment, a peer advertisement may include only what needs to be published outside the peer, e.g. endpoint addresses, etc. In one embodiment, items that affect only the local behavior or that are not specified as being explicitly published (e.g. debug) may be left out of the peer advertisement and may go into an optional configuration document passed to the peer group object as an extra parameter. In one embodiment, in both the configuration document and the peer advertisement, variables may be related to services by the service class identifier; each setting may be a <Setting> element, tagged with a service class identifier. If there is no identifier, it means that the setting applies to all services of this group.

The following is an example of a layout to list a service, and is not intended to be limiting:
  <Service>ServiceSpecID1</Service>

The following is another example of a layout to list a service, and is not intended to be limiting:
  <Service>
  <ServiceSpecID>ServiceSpecID1<ServiceSpecID>
  <ServiceClassID>ServiceClassID1</ServiceClassID>
  <SomeOtherAttribute>whatever</SomeOtherAttribute>
  </Service>

Similar layouts may be used for other modules such as endpoints, applications and/or groups.

In one embodiment, peer groups may be defined by service specification advertisements with the group identifier equivalent to the role identifier. In this embodiment, the peer group advertisement may be an abbreviated version of the service specification. In another embodiment, services may be listed in the implementation advertisement for the group. In this embodiment, the implementation advertisement may refer to the peer group class used, with the parameter field listing the services. The group identifier may exist only in the peer group advertisement, which is the root definition of the group. Using this embodiment, there may be no need to obtain the specification advertisement of the group in order to instantiate it. This group advertisement includes the specification identifier of the group that is matched by that specification identifier in associated implementation advertisements, so that an implementation of the group may be acquired directly from the peer group advertisement without having to lookup the specification.

In one embodiment, the implementation advertisement of a service may be included in-line in the implementation advertisement of a group that uses it, rather than including the service's specification identifier.

As used herein, the term "module" includes the notion of any random code not part of the core system. In general, a module is a generic, loadable "thing" that has ini( ) start( ) and stop( ) methods or their equivalents. Applications and services may be considered subclasses of modules. A "Service" is a subclass of module that has "get interface" and "get implementation advertisement" methods, making it suitable for registration with a group. In one embodiment, modules may also include code that has a known API and identity (its class identifier) and which can be looked-up with group lookup service.

In one embodiment, the peer configuration document has the format of a peer advertisement. In one embodiment, the peer group API may include one or more methods that assist in loading modules, e.g. a "load module" method. In one embodiment, loading a peer group may be similar to loading any other module; one or more additional methods may be included to perform one or more tasks particular to loading a peer group.

In one embodiment, the definition of a group or other module (that is, the class that implements it for which binding, and with which parameters) is immutable. The information about the group or other module's instantiation on a peer (e.g. everything that may be different on each peer, such as endpoint addresses, rendezvous status, etc) may been separated into a different advertisement: the peer advertisement.

In one embodiment, there may be one or more parameters that are private to a peer and essentially the result of a choice by the user or defaults that depend on the particular peer that instantiates that module or group (e.g. local network interfaces, well-known rendezvous, etc.). These may be similar to the content of a peer advertisement, but may not be published (or alternatively, if published, it is by the decision of the module and copied by that module to the peer advertisement). The document that includes these unpublished parameters may be a peer advertisement that may be passed as an argument to the module's init routine. In one embodiment, providing the peer advertisement as an argument may be optional.

The following is an exemplary initialization routine for modules and is not intended to be limiting:

Init (group, assignedID, implAdv, configAdv);

where:
- Group: The group that provides the peer-to-peer platform API to this module: If the module is a group, this is its parent group. If this module is a service, group is the group of which this service is a part. If the module is an application, group is the group within which this application runs.
- assignedID: Assigned identifier. A unique identifier assigned to this module by its group. If this module is a group, the assigned identifier is its group identifier. If this module is a service, then this is the full class identifier of that service in that group. In one embodiment, the full class identifier listed in the group's implementation advertisement may be used. In one embodiment, if this module is a main application of a peer group, then its assigned identifier may be a full class identifier of the base class application. In one embodiment, the role part may be assigned randomly in order to be unique. Otherwise, in one embodiment, it may be anything, including null. In one embodiment, a service may find its configuration parameters indexed under its assigned identifier in the configuration advertisement, and may update its published parameters under its assigned identifier in the peer advertisement.
- implAdv: The implementation advertisement from which this module was loaded. In one embodiment, if this module is a subclass of a standard (base) peer group class, then the <Parm> section of this advertisement may include a complete list of the services that this group includes. If the module is an application, the module may have been loaded directly from its class, bypassing the implementation advertisement lookup. As a result, there may not be an implementation advertisement available, in which case "null" may be passed for this argument. In one embodiment, the standard peer group may pass an implementation advertisement to the main application(s).
- configAdv: The configuration advertisement for this module. As for assigned identifier and implementation advertisement, this may be null if the module is an application. In one embodiment, the standard peer group may pass its configuration advertisement through to the main application(s).

One embodiment may include an initialization routine for modules in order to avoid resorting to reflection when loading and initializing modules. In one embodiment, modules may only include a default constructor, and the initialization routine may serve as a substitute to having a constructor with parameters. The initialization routine, followed by a start application routine gets the module running. In one embodiment, a "stop application" routine may shut down that module. In one embodiment, after calling the stop application routine, the module may be unreferenced and garbage collected. To resume running the module, the module may be loaded from scratch again.

One embodiment may include a "start application" routine in addition to an initialization routine in order to be able to operate on the module once its is fully constructed but before it starts running. What "starts running" means may be defined by each module in relation to the effects of whichever methods the particular module provides that affect its behavior.

In one embodiment, services may be registered with the peer group upon returning from the init routine. In this embodiment, services may be ready to have their public methods invoked upon returning from the initialization routine. In one embodiment, the services may not be obligated to provide full functionality. In one embodiment, public methods may fail gracefully if they cannot perform fully. In this embodiment, services may expect all other services of the group to be available from the group's registry upon their start application method being invoked, and to have the public methods of these services either fully work or fail nicely. In one embodiment, both the initialization and the start application methods of a module may be required to "return." In other embodiments, either one or both of these methods may not be required to return.

Advertisements

In one embodiment, the peer-to-peer protocols may use advertisements to describe and publish the existence of peer resources. An advertisement may be defined as a structured, language neutral metadata structure that names, describes, and publishes the existence of a peer-to-peer platform resource. Network resources such as peers, peer groups, pipes, and modules such as services may be represented by advertisements. Advertisements may be used to describe one or more of, but not limited to, peers, peer groups, pipes, content, rendezvous, and modules such as services and other types of network resources. Advertisement types provided by the peer-to-peer platform may include one or more of, but are not limited to, peer advertisements, peer group advertisements, module class advertisements, module specification advertisements, module implementation advertisements, pipe advertisements, and rendezvous advertisements. Advertisements may be exchanged as documents in peer-to-peer protocol messages. One or more of the peer-to-peer platform protocols may use advertisements to provide information to entities interested in the peer-to-peer resources represented by the advertisements. Peer-to-peer platform protocols may be used to pass advertisements between peers.

In one embodiment, advertisements may include a series of hierarchically arranged elements. The elements may appear in arbitrary order within the advertisement. Each element may include data or additional elements. An element may also have attributes. In one embodiment, attributes are name-value string pairs. An attribute may be used, for example, to store meta-data that helps to describe the data within the element.

In one embodiment, peer-to-peer platform advertisements may be represented in the eXtensible Markup Language (XML). Other embodiments may use other encodings such as HTM or WML. In one embodiment, advertisements may be specified using a schema definition language such as the XML Schema Definition Language. In one embodiment, XML advertisements may be translated into other encodings such as HTML and WML to allow peers that do not support XML to access advertised resources.

In one embodiment, advertisements may be used in the peer-to-peer platform as language-neutral metadata structures. In one embodiment, each software platform binding may describe how advertisements are converted to and from native data structures such as Java objects or 'C' structures. Each protocol specification may describe one or more request and response message pairs. In one embodiment, advertisements may be the most common document exchanged in messages.

Information exchanged between peers may include advertisement documents. In one embodiment, the peer-to-peer platform may advertise documents to represent all of the peer-to-peer platform resources managed by the core platform, such as peers, peer groups, pipes and services. In one embodiment, the peer-to-peer platform may define a set of core advertisements. The peer-to-peer platform may define core advertisement types including, but not limited to, one or more of peer advertisements, peer group advertisements, pipe advertisements, service advertisements, content advertisements, and endpoint advertisements. In one embodiment, user-defined advertisement subtypes (for example, using XML schemas) may be formed from these basic types. Subtypes of the core advertisements may be used to add an unlimited amount of extra, richer metadata to a peer-to-peer network. In one embodiment, the peer-to-peer platform protocols, configurations and core software services operate only on the core advertisements.

In one embodiment, an advertisement is a markup language structured document that names, describes, and publishes the existence of a peer-to-peer platform resource. In one embodiment, peer-to-peer platform advertisements may be represented in the Extensible Markup Language (XML) and are therefore software platform neutral. XML provides a powerful means of representing data and metadata throughout a distributed system. XML provides universal (software-platform neutral) data because XML is language agnostic, self-describing, strongly-typed and ensures correct syntax. XML advertisements may be strongly typed and validated using XML schemas. XML also allows advertisements to be translated into other encodings such as HTML and WML. This feature allows peers that do not support XML to access advertised resources. In one embodiment, each document may be converted to and from a platform specific representation such as a Java object. In one embodiment, peers supporting the various protocols requiring that advertisements be exchanged in messages may accept only valid XML documents that descend from the base XML advertisement types.

Advertisements represented in a markup language such as XML, like any markup language document, may be composed of a series of hierarchically arranged elements. Each element may include its data and/or additional elements. An element may also have attributes. Attributes are name-value string pairs. An attribute may be used to store metadata, which may be used to describe the data within the element.

Figure 29A:
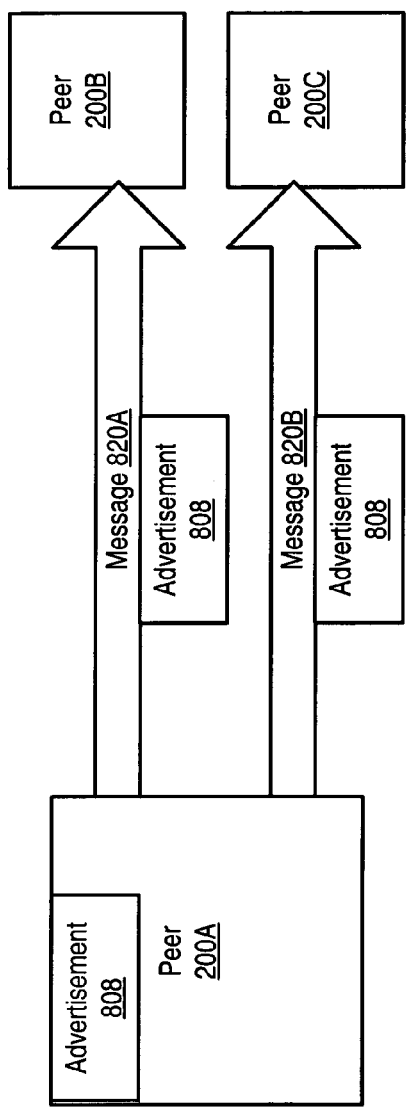
FIG. 29A illustrates a peer in a peer-to-peer network publishing an advertisement according to one embodiment.

FIG. 29A illustrates a peer in a peer-to-peer network publishing an advertisement according to one embodiment. Peer 200A may include or may have access to resources that it may publish. Resources may include, but are not limited to, peers, peer groups, software modules (e.g. services, applications, etc.), content, pipes and pipe endpoints. A resource advertisement may include an identifier and a security credential. The identifier and security credential may be compared to confirm that they indicate the same resource when another peer accesses the resource. In one embodiment, a public key may be associated with the advertised resource. In one embodiment, the security credential may be a public key signature.

Peer 200A may generate resource advertisement 808 which may describe how other peers may access the resource. Resource advertisements may be formatted according to platform-independent markup language schemas defining elements of each type of advertisement (e.g., XML). Peer 200A may allow other peers access to the resource by publishing advertisement 808. In one embodiment, publishing may include sending advertisements to other peers. In FIG. 29A, peer 200A may send advertisement 808 to peers 200B and 200C in messages 820A and 820B. Messages 820A and 820B may be formatted according to a peer-to-peer platform protocol. Another peer may discover advertisement 808 by sending a discovery query message that may include criteria that the resource corresponding to advertisement 808A may match to one or both of peer 200B and peer 200C, and one or both of peer 200B and peer 200C sending a response message that may contain advertisement 808 to the other peer.

Figure 29B:
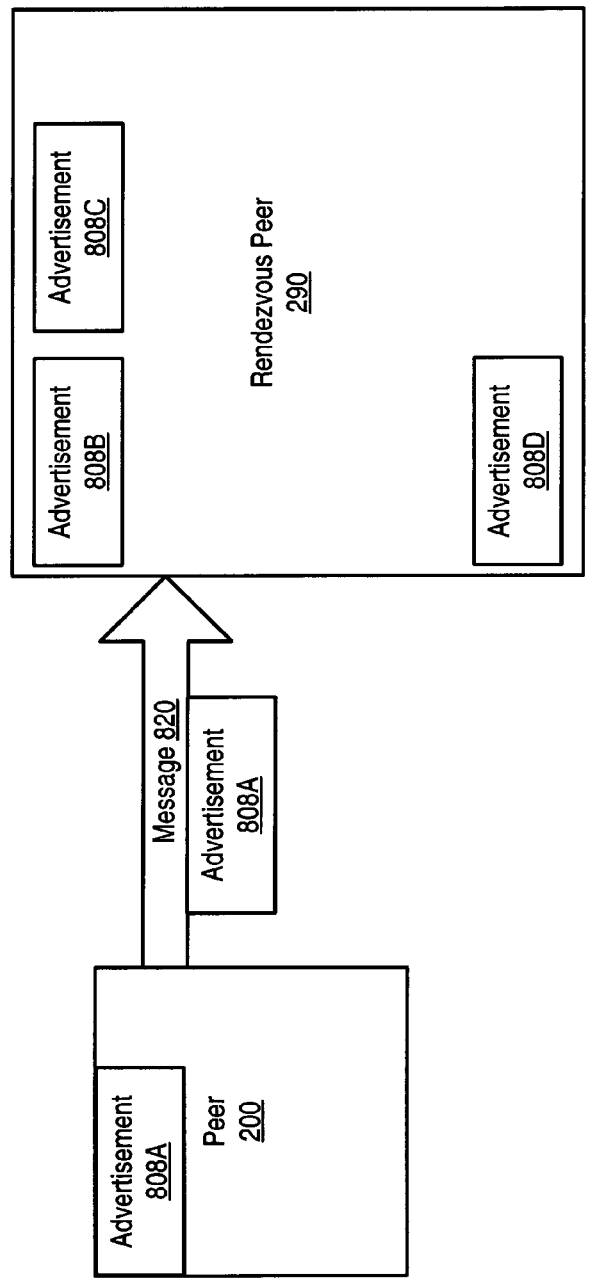
FIG. 29B illustrates a peer in a peer-to-peer network publishing an advertisement to a rendezvous peer according to one embodiment.

FIG. 29B illustrates a peer in a peer-to-peer network publishing an advertisement to a rendezvous peer according to one embodiment. Peer 200A may publish advertisement 808A by sending it to rendezvous peer 200B in message 820. Rendezvous peer 200B may cache advertisements for other peers to discover. In one embodiment, advertisement 808A may include a time-to-live indicator (TTL). The TTL may indicate a length of time during which the resource advertisement is valid. When the TTL expires, peers may no longer have access to the resource advertisement. Another peer may discover advertisement 808A by sending a discovery query message that may include criteria that the resource corresponding to advertisement 808A may match to peer 200B, and peer 200B sending a response message that may contain advertisement 808 to the other peer.

Figure 30:
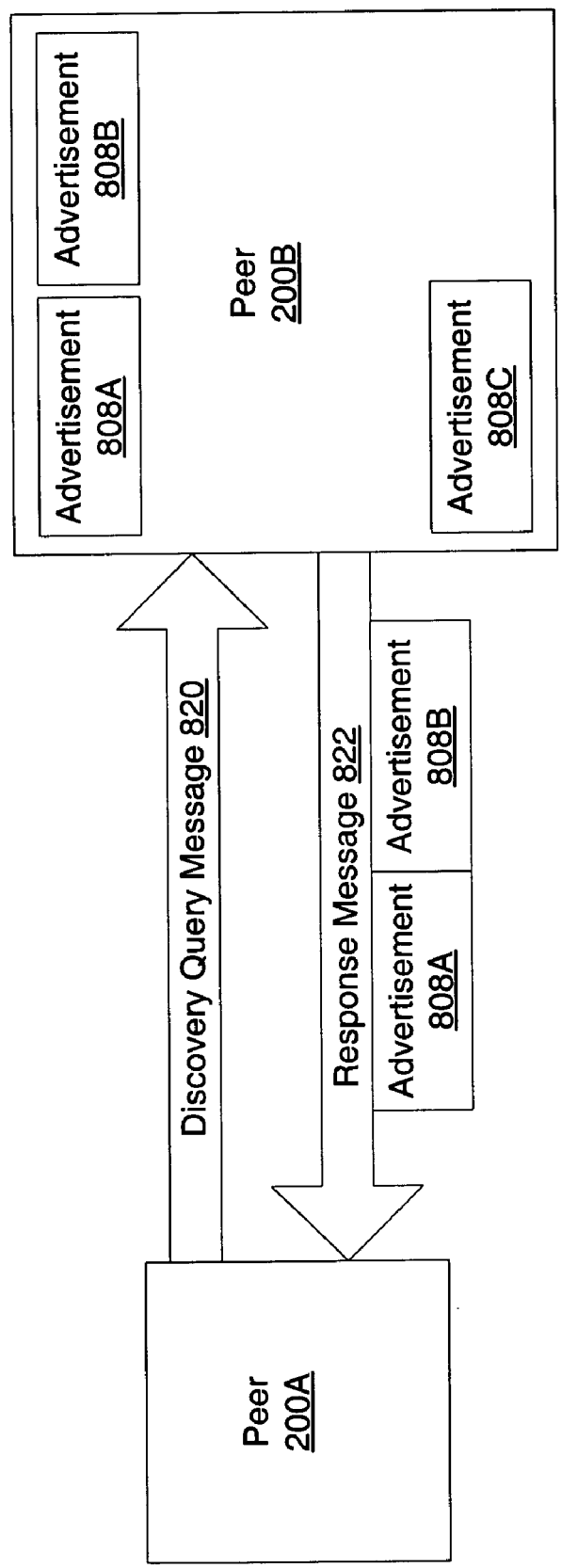
FIG. 30 illustrates discovering advertisements according to one embodiment.

FIG. 30 illustrates discovering advertisements according to one embodiment. Peer 200A may broadcast discovery query message 820. Discovery query message 820 may be formatted in accordance with a peer-to-peer platform discovery protocol. Discovery query message 820 may include criteria specifying a particular type of resource in which the peer is interested. When the discovery query message 820 reaches a peer 200B that has advertisements 808A and 808B for resources matching the criteria in the discovery query message, peer 200B may respond by sending peer 200A a response message 822 that may include the advertisements 808A and 808B. Peer 200A may also receive one or more response messages from one or more other peers. Each of these response messages may include advertisements for resources for resources also matching the criteria in the discovery query message. After receiving the resource advertisements, peer 200A may access the corresponding resource. In one embodiment, each resource advertisement may include information describing how to access the particular resource corresponding to the resource advertisement.

Figure 33:
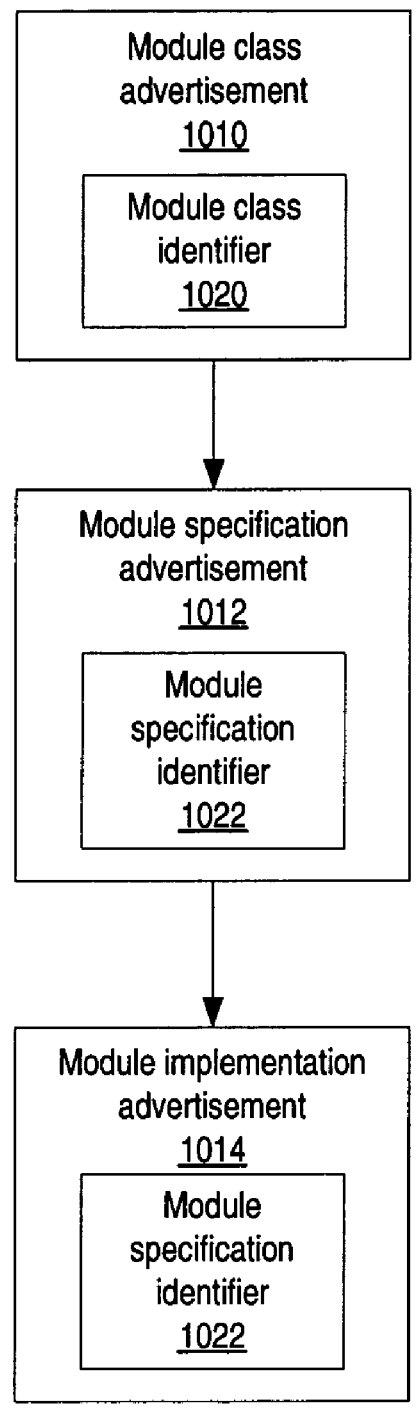
FIG. 33 illustrates a module class advertisement, a module specification advertisement, and a module implementation advertisement for a software module according to one embodiment.

One embodiment may include module class advertisements, module specification advertisements, and module implementation advertisements that may be used, for example, in describing and identifying abstract software modules in peer-to-peer networking environments. FIG. 33 illustrates a module class advertisement 1010, a module specification advertisement 1012, and a module implementation advertisement 1014 for a software module according to one embodiment.

In one embodiment, a module class advertisement 1010 may be used to describe a class of software modules. A module class advertisement 1010 may describe an expected local behavior and an expected API for each peer-to-peer platform binding that supports the class of software modules. A module class advertisement 1010 may provide a description of what a particular module class identifier 1020 stands for. Module class identifiers 1020 may be used by a software module or other code on the peer-to-peer platform to designate software modules upon which the software module or other code depends. In one embodiment, a module class advertisement 1010 may not provide a completely formal description of the module's behavior and API. In one embodiment, a module class advertisement 1010 may be used to create modules with a similar functionality.

The following illustrates an exemplary module class advertisement 1010 schema that may be used in embodiments and is not intended to be limiting:

<xs:element name="MCA" type="xxxx:MCA"/>
<xs:complexType name="MCA">
<xs:sequence>

```
<xs:element name="MCID" type="xxxx:identifier"/>
<xs:element name="Name" type="xs:string" minOccurs="0"/>
<xs:element name="Desc" type="xs:anyType" minOccurs="0"/>
</xs:sequence>
</xs:complexType>
``` where the elements may include one or more of, but are not limited to:

MOD—Module class identifier 1020 that uniquely identifies the module class. Each module class may have a unique identifier. In one embodiment, this is a required element.

Name—A name associated with the module class. In one embodiment, the name is not required to be unique unless the name is obtained from a centralized naming service that guarantee name uniqueness. In one embodiment, this is an optional element.

Desc—Description. A string that may be used to describe and search for a module class. In one embodiment, this is an optional element.

In one embodiment, a module specification advertisement 1012 may be used to describe the specification of a software module. A module specification advertisement 1012 may describe an expected on-wire behavior and protocol. A module specification advertisement 1012 may provide a description of what a particular module specification identifier 1022 stands for. A module specification identifier 1022 may be used by a software module or other code on the peer-to-peer platform to designate a particular network-compatible family of implementations of a given module class. In one embodiment, module specification identifiers 1022 may also be used by a peer group implementation to designate the components that provide the various services that the peer group supports. In one embodiment of the peer-to-peer platform, one or more core peer group services (e.g. discovery, membership, resolver, etc.) may be implemented as software modules.

A module specification advertisement 1012 may also describe how to invoke and use a software module. In one embodiment, a software module may be accessed through an API (application programming interface) of the module by locating an implementation of the software module, loading the module, and starting the module. In one embodiment, a software module may be accessed via a pipe (e.g. a peer-to-peer platform pipe as described below) accessed using a pipe advertisement included in the software module's module specification advertisement 1012. In one embodiment, a software module may be accessed through a proxy module accessed using a module specification identifier 1022 of the proxy module included in the software module's module specification advertisement 1012.

The following illustrates an exemplary module specification advertisement 1012 schema that may be used in embodiments and is not intended to be limiting:

```
<xs:element name="MSA" type="xxxx:MSA"/>
<xs:complexType name="MSA">
<xs:sequence>
<xs:element name="MSID" type="xxx:IDENTIFIER"/>
<xs:element name="Vers" type="xs:string"/>
<xs:element name="Name" type="xs:string" minOccurs="0"/>
<xs:element name="Desc" type="xs:anyType" minOccurs="0"/>
<xs:element name="Crtr" type="xs:string" minOccurs="0"/>
<xs:element name="SURI" type="xs:anyURI" minOccurs="0"/>
<xs:element name="Parm" type="xs:anyType" minOccurs="0"/>
<xs:element ref="xxxx:PipeAdvertisement" minOccurs="0"/>
<xs:element name="Proxy" type="xs:anyURI" minOccurs="0"/>
<xs:element name="Auth" type="xxxx:IDENTIFIER" minOccurs="0"/>
</xs:sequence>
</xs:complexType>
``` where the elements may include one or more of, but are not limited to:

MSID—module specification identifier 1022. May uniquely identify the specification. Each module specification may have a unique module specification identifier 1022. In one embodiment, this is a required element.

Vers—The version of the specification that this advertisement advertises. In one embodiment, this is a required element.

Name—Name that may be associated with a module specification. The name may not be required to be unique. In one embodiment, the name may be obtained from a centralized naming service that guarantee name uniqueness, and therefore in this embodiment the name may be unique. In one embodiment, this is an optional element.

Desc—Description. A string that may be used to describe and search for a module specification. In one embodiment, this is an optional element.

CRTR—Creator. This element designates the creator of this module specification. In one embodiment, this is an optional element.

SURI—Specification URI (unique resource identifier). This element is a URI that permits the retrieval of a document containing the module specification that this advertisement advertises. In one embodiment, this is an optional element.

Parm—May include one or more arbitrary parameters that may be interpreted by each implementation.

xxxx:PipeAdvertisement—Identifies pipe advertisement which this module binds to an input pipe, and which thus may be used to establish a pipe to a nearby running implementation of this module specification. In one embodiment, this element name may be identical to the pipe advertisement document type since the entire element is an embedded pipe advertisement document. In one embodiment, this is an optional element.

Proxy—Proxy Specification identifier. Module specification identifier 1022 of a proxy module that may be used in order to communicate with modules of this specification. Note that the process may be recursive. The proxy module may be usable via pipes, or optionally through a subsequent proxy module, and may require a subsequent authenticator. In one embodiment, this is an optional element.

Auth—Authenticator specification identifier. Module specification identifier 1022 of an authenticator module that may be required in order to communicate with modules of this specification. Note that the process may be recursive. The authenticator module may be usable via pipes, or optionally through a subsequent proxy module, and may require a subsequent authenticator. In one embodiment, this is an optional element.

In one embodiment, a module implementation advertisement 1024 may be used to describe one of the implementations of a module specification. Implementations of a given specification may be searched by the module specification identifier 1022. An implementation may be selected by the type of environment in which it may be used (its compatibility statement) as well as by its name, description or the content of its parameters section.

A module implementation advertisement 1024 may provide a mechanism to retrieve data that may be required in order to execute the module implementation being described. In one embodiment, this information may be encapsulated in the Code and PURI (Package Uniform Resource Identifier) elements. The interpretation of these elements may be subject to the module's compatibility. For example, a standard peer group implementation of a Java reference implementation may expect the <Code> element to specify a fully qualified Java class name that designates a subclass such as net.xxxx.platform.Module and PURI to be the URI (Uniform Resource Identifier) of a downloadable package (e.g. a .jar file). Other execution environments may expect the code to be inline within the <Code> element or even offer several options.

The following illustrates an exemplary module implementation advertisement 1024 schema that may be used in embodiments and is not intended to be limiting:

```
<xs:element name="MIA" type="xxxx:MIA"/>
<xs:complexType name="MIA">
  <xs:sequence>
    <xs:element name="MSID" type="xxxx:IDENTIFIER"/>
    <xs:element name="Comp" type="xs:anyType"/>
    <xs:element name="Code" type="xs:anyType"/>
    <xs:element name="PURI" type="xs:anyURI" minOccurs="0"/>
    <xs:element name="Prov" type="xs:string" minOccurs="0"/>
    <xs:element name="Desc" type="xs:anyType" minOccurs="0"/>
    <xs:element name="Parm" type="xs:anyType" minOccurs="0"/>
  </xs:sequence>
</xs:complexType>
``` where the elements may include one or more of, but are not limited to:

MSID—module specification identifier 1022. May uniquely identify the module specification being implemented. In one embodiment, this is a required element.

Comp—Compatibility. An arbitrary element that may describe the environment in which this module implementation may be executed. Each framework capable of loading and executing the module may have its own requirements on the contents of this element. In one embodiment, this is a required element.

Code—This arbitrary element may include anything that is needed in addition to the package in order to load and execute the code of this module implementation. In one embodiment, for Java module implementations, this element may include a fully qualified class name containing the module's entry points. In one embodiment, this element may include the entire code.

PURI—Package URI (uniform resource identifier). This element is a URI that permits the retrieval of a package containing the code of this module implementation. In one embodiment, this is an optional element.

Prov—Provider. The provider of this module implementation.

Desc—Description. A string that may be used to describe and search for a module specification. In one embodiment, this is an optional element.

Parm—Parameter. May include one or more arbitrary parameters that may be interpreted by the module implementation's code.

The following are descriptions of embodiments of peer advertisements and peer group advertisements that may be used in embodiments of the system and method for describing and identifying abstract software modules in peer-to-peer networking environments.

In one embodiment, a peer advertisement may be used to describe a peer. A peer advertisement may also describe resources the peer may provide to a peer group. One use of a peer advertisement is to hold specific information about the peer, including one or more of, but not limited to, the peer's name, peer identifier, peer group identifier, descriptive information, and registered services. A peer advertisement may also include endpoint addresses and/or any run-time attributes that individual peer services want to publish (such as being a rendezvous peer for a group). FIG. 6 illustrates the content of a peer advertisement according to one embodiment.

The following illustrates an exemplary peer advertisement schema that may be used in embodiments and is not intended to be limiting:

```
<xs:element name="PA" type="xxxx:PA"/>.
<xs:complexType name="PA">
  <xs:sequence>
    <xs:element name="PID" type="IDENTIFIER"/>
    <xs:element name="GID" type="IDENTIFIER"/>
    <xs:element name="Name" type="xs:string" minOccurs="0"/>
    <xs:element name="Description" type="xs:anyType" minOccurs="0"/>
    <xs:element name="Svc" type="xxxx:serviceParams" minOccurs="0" maxOccurs="unbounded"/>
  <xs:sequence>
</xs:complexType>
``` where the elements may include one or more of, but are not limited to:

PID—Peer identifier that may uniquely identify the peer. Each peer may have a unique identifier. In one embodiment, this is a required element.

GID—The peer group identifier. This element may identify canonically which peer group this peer belongs to.

Name—A string that may be associated with the peer. In one embodiment, the name may not be required to be unique. In one embodiment, the name may be obtained from a centralized naming service that guarantees name uniqueness. In one embodiment, this is an optional element.

Description—A string that may be used to index and search for a peer. In one embodiment, the string is not guaranteed to be unique. Two peers may have the same keywords. In one embodiment, this is an optional element.

Svc—A service element. In one embodiment, any number of service elements may be included. In one embodiment, each of the service elements may describe the association between a group service which may be denoted by its module class identifier (the value of an MCID (module class identifier) element), and arbitrary parameters encapsulated in a Parm (parameter) element. For example, all accessible endpoint addresses may be published in association with the Endpoint Service Module Class Identifier. The TLS Root certificate may be published under the Peer group Module Class Identifier (There may be a module class identifier for a Peer Group as well). The flag that denotes that this peer is a rendezvous for this group may be published under the Rendezvous Service module class identifier. In one embodiment, each service may be responsible for what is published under its module class identifier. The Service section may also optionally include an element (e.g., "is Off") that may be used to indicate if this service is enabled or disabled. This element may be used to convey a configuration choice made by the owner of the peer.

The following is another exemplary embodiment of a peer advertisement in XML, and is not intended to be limiting:

```
<PeerAdvertisement>
<Name> name of the peer</Name>
<Keywords>search keywords </Keywords>
<Pid> Peer identifier </Pid>
<Services>
    <Service advertisement>
    . . .
    </Service advertisement>
</Services>
<Endpoints>
    <endpoint advertisement>
    . . .
    </endpoint advertisement>
</Endpoint>
<InitialApp>
    <Service advertisement>
    . . .
    </Service advertisement>
</InitialApp>
</PeerAdvertisement>
```

This embodiment of a peer advertisement may include, but is not limited to, the following fields:

Name: an optional string that can be associated with a peer. In one embodiment, the name is not required to be unique unless the name is obtained from a centralized naming service that guarantees name uniqueness.

Keywords: an optional string that may be used to index and search for a peer. In one embodiment, the string is not guarantee to be unique. Two peers may have the same keywords. The keywords string may contain spaces.

Peer identifier: uniquely identifies the peer. In one embodiment, this may be a required element. Each peer has a unique identifier.

Service: a service advertisement element for each service published on the peer.

Services started on a peer may publish themselves to the peer. In one embodiment, not all services running on the peer need to publish themselves.

Endpoint: an endpoint URI (e.g. tcp://129.144.36.190:9701 or http://129.144.36.190:9702) for each endpoint available on the peer.

InitialApp: Optional application/service started when the peer is booted. A service advertisement is used to describe the service.

In one embodiment, a peer group advertisement may be used to describe, for a peer group, the group specific information (name, peer group identifier, etc.), the membership process, and the available peer group services. The peer group advertisement defines the core set of services to be used by that peer group. In one embodiment, it may not enforce that each peer must run each service locally. Rather it defines the set of services that are made available to the peer group. In one embodiment, a peer group advertisement may be used to describe peer group-specific resources including one or more of, but not limited to, name, group identifier, description, specification, and service parameters.

In one embodiment, the initial creator of the peer group may define what advertisements go into the peer group advertisement at creation time. Other peers may get a copy of the peer group advertisement when they discover advertisements via the discovery service. In one embodiment, peer group advertisements are immutable objects and new services may not be added due to java binding. Other embodiments may allow new services to be added. In one embodiment, a peer group may provide a registration service that allows the dynamic registration of services.

FIG. 7 illustrates the content of a peer group advertisement according to one embodiment. The following is an example of one embodiment of a peer group advertisement in XML, and is not intended to be limiting:

```
<peer group advertisement>
<Name> name of the peer group</Name>
<Keywords>search keywords </Keywords>
<Gid> Peer group identifier </Gid
<Services>
    <Service advertisement>
    . . .
    </Service advertisement>
</Services>
<InitialApp>
    <Service advertisement>
    . . .
    </Service advertisement>
</InitialApp>
</peer group advertisement>
```

This embodiment of a peer group advertisement may include, but is not limited to, the following fields:

Name: an optional name that may be associated with a peer group. In one embodiment, the name is not required to be unique unless the name is obtained from a centralized naming service that guarantee name uniqueness.

Keywords: an optional string that may be used to index and search for a peer group. In one embodiment, the string is not guarantee to be unique. Two peer groups may have the same keywords.

Peer group Id: uniquely identifies the peer group. In one embodiment, this is a required element. Each peer group has a unique id.

Service: a service advertisement element for each peer group service available in the peer group. In one embodiment, not all peer group services need to be instantiated when a peer joins a peer group. In one embodiment, at least a membership service should be available, so the membership service may implement a null authenticator membership.

InitialApp: optional application/service started when a peer is joining a peer group. A service advertisement may be used to describe the service. The initial application may be started when a peer is joining a group. Alternatively, it may be left to the joining peer to decide to either start or not start the peer group initial application.

The following illustrates another exemplary peer group advertisement schema that may be used in embodiments and is not intended to be limiting:

```
<xs:element name="PGA" type="xxxx:PGA"/>
<xs:complexType name="PGA">
<xs:sequence>
    <xs:element name="GID" type="xxxx:IDENTIFIERV>
```

```
<xs:element name="MSID" type="xxxx:IDENTI-
    FIER"/>
<xs:element name="Name" type="xs:string" minOc-
    curs="0"/>
<xs:element name="Desc" type="xs:anyType" minOc-
    curs="0"/>
<xs:element name="Svc" type="xxxx:serviceParam"
    minOccurs="0" maxOccurs="unbounded"/>
</xs:sequence>
</xs:complexType>
``` where the elements may include one or more of, but are not limited to:

GID—This element provides the peer group identifier. The peer group identifier is the canonical way of referring to a group and uniquely identifies the peer group.

MSID—Peer group specification identifier. This designates the module that provides the peer group mechanism for the group. The specification identifier may include an abstraction of that mechanism. This abstraction may be optionally described by a module specification advertisement, and one or more implementations may exist, which may each be described by a module implementation advertisement. In one embodiment, these advertisements may all be searched by peer group specification identifier. In one embodiment, this is a required element.

Name—A name that may be associated with the peer group. In one embodiment, the name is not required to be unique. In one embodiment, the name may be obtained from a centralized naming service that guarantee name uniqueness. In one embodiment, this is an optional element.

Desc—This element provides descriptive information that may be used to index and search for a peer group. In one embodiment, the content of this element may not be unique. For example, two peer groups may have the same keywords.

Svc—Service. In one embodiment, any number of service elements may be included. Each service element may describe the association between a group service denoted by its module class identifier (the value of an MCD element), and one or more arbitrary parameters encapsulated in a Parm element. This optional parameter may only be meaningful to some services. It may be used to configure a service specifically in relation with its use by this group. For example, a simple membership service may find an encrypted password list there. In one embodiment, this is an optional element.

Once a peer joins a group, that peer may receive (depending again upon membership configuration) a full membership-level peer group advertisement. The full membership advertisement, for example, might include the configuration (required of all members) to vote for new member approval.

In one embodiment, a pipe advertisement may be used to describe an instance of a pipe communication channel. A pipe advertisement may be used by a pipe service to create associated input and output pipe endpoints. In one embodiment, a pipe advertisement document may be published and obtained using either the core discovery service or by embedding it within other advertisements such as the peer or peer group advertisement. Each pipe advertisement may include an optional symbolic name that names the pipe and a pipe type to indicate the type of the pipe (point-to-point, propagate, secure, etc). FIG. 8 illustrates the content of a pipe advertisement according to one embodiment. The following is an example of one embodiment of a pipe advertisement in XML, and is not intended to be limiting:

```
<PipeAdvertisement>
    <Name> name of the pipe</Name>
    <Identifier> Pipe identifier </Identifier>
    <Type> Pipe Type </Type>
</PipeAdvertisement>
```

Embodiments of a pipe advertisement may include, but are not limited to, the following fields:

Name: an optional name that may be associated with a pipe. In one embodiment, the name is not required to be unique unless the name is obtained from a centralized naming service that guarantee name uniqueness.

Pipe identifier: uniquely identifies the pipe. In one embodiment, this is a required element. Each pipe has a unique identifier.

Type: This is an optional pipe type that may be provided to specify the quality of services implemented by the pipe. Pipe types may include, but are not limited to:

Unicast: messages may not arrive at the destination, may be delivered more than once to the same destination, may arrive in different order. Unicast, unsecure, and unreliable. This type of pipe may be used to send one-to-one messages.

Unicast secure: messages may not arrive at the destination, may be delivered more than once to the same destination, may arrive in different order, but are encrypted (e.g. using TLS). Unicast, secure (e.g. using TLS). This pipe type may be similar or equivalent to the unicast pipe type, except that the data is protected using a virtual TLS connection between the endpoints.

Propagate: a propagate (one-to-many) pipe. Diffusion pipes. This pipe type is used to send one-to-many messages. Any peer that has enabled an input pipe on a propagate-type pipe may receive messages that are sent on the pipe.

In one embodiment, a service advertisement may be used to describe a peer-to-peer platform-enabled service. In one embodiment, service advertisements may describe how to activate and/or use the service. In one embodiment, a peer-to-peer platform-enabled service is a service that uses pipes as primary invocation mechanism. To invoke the service, a peer may a message to the associated service pipe. In one embodiment, the core peer group services that each peer group may implement in order to respond to the messages described for the peer-to-peer platform protocols are peer-to-peer platform-enabled services and thus may be published using service advertisements. The service advertisement document may be published and obtained using the peer information protocol for peer services, or alternatively using the peer group discovery protocol for peer group services.

In one embodiment, a pipe advertisement and access method fields may provide a placeholder for any kind of service invocation schema that defines the valid set of XML messages accepted by the service and the associated message flow. Thus, the peer-to-peer platform protocols may be agnostic of service invocation and interoperate with any existing framework. A service advertisement access method field may refer to a WSDL (e.g. www.w3.org/TR/wsdl), ebXML (e.g. www.ebxml.org), UPnP (e.g. www.upnp.org) or a client-proxy schema, among others. For example, a WSDL access method may define messages that are abstract descriptions of the data being exchanged and the collections of operations supported by the service using a WSDL schema. In one embodiment, a service advertisement may include multiple access method tags, as there may be multiple ways to invoke a service. Thus, the peer may ultimately decide which invocation mechanism to use. For example, small devices may want to use a small-footprint mechanism or a service framework they already have the code for, and larger devices may decide to download a client-proxy code.

In one embodiment, the access method for services is a schema of valid XML messages accepted by the service. In one embodiment, a service advertisement may contain a URL or URI tag to point to a jar file, DLL, or loadable library. A peer may use this to download the code to run the service, for example if the peer joins the peer group and does not have the required code to run the service.

One embodiment may provide cross-platform activation of services. A peer may be implemented on a first computing platform. The may discover an advertisement for service that includes platform-independent activation instructions for a service implemented on a second computing platform, different from the first computing platform. The peer may carry out the instructions to activate the service even though their computing platforms are different. For example, a peer implemented on a Macintosh OSX computing platform may activate a search engine for used cars implemented on an Intel Windows computing platform.

FIG. 9 illustrates the content of a service advertisement according to one embodiment. The following is an example of one embodiment of a service advertisement in XML, and is not intended to be limiting:

<ServiceAdvertisement>
<Name> name of the Service</Name>
<Version> Version identifier </Version>
<Keywords> search keywords </Keywords>
<Id> Service identifier </Id>
<Pipe> Pipe endpoint to access the service </Pipe>
<Params> service configuration parameters </Params>
<URI> service provider location</URI>
<Provider> Service Provider</Provider>
<AccessMethods>
</AccessMethods>
</ServiceAdvertisement>

Embodiments of a service advertisement may include, but are not limited to, the following fields:

Name: an optional name that may be associated with a service. In one embodiment, the name is not required to be unique unless the name is obtained from a centralized naming service that guarantees name uniqueness.

Keywords: an optional string that may be used to index and search for a service. In one embodiment, the string is not guaranteed to be unique. Two services may have the same keywords.

Service Id: uniquely identifies a service. In one embodiment, each service has a unique id. In one embodiment, this element may be required.

Version: specifies the service version number. In one embodiment, this element may be required.

Provider: gives information about the provider of the service. This will typically be a vendor name. In one embodiment, this element may be required.

Pipe: an optional element that specifies a pipe advertisement to be used to create an output pipe to connect to the service. In one embodiment, services are not required to use pipes.

Params: a list of configuration parameters available to the peer when invoking the service. In one embodiment, the parameter field is optional. Parameters may be defined as a list of strings.

URI: This is an optional parameter that may be used to specify the location of where the code for the service may be found.

Access Methods: In one embodiment, at least one access method is required to specify how to invoke the service. Multiple access method tags may be used when multiple access methods are available. The access method tag allows any kind of service invocation representation to be specified. For example the access method may be a placeholder for a WSDL or uPnP document that describes a web service access method.

In one embodiment, a content advertisement may be used to describe a content document stored somewhere in a peer group. In one embodiment, there are no restrictions on the type of contents that can be represented. A content may be a file, a byte array, code or process state, for example. In one embodiment, each item of content may have a unique identifier also known as its canonical name. The unique identifier may include a peer group universal unique identifier (UUID), and also may include another name that may be computed, parsed, and maintained by peer group members. In one embodiment, the content's name implementation within the peer group is not mandated by the peer-to-peer platform. The name may be a hash code, a URI, or a name generated by any suitable means of uniquely identifying content within a peer group. The entire canonical content name may be referred to as a content identifier or content identifier. FIG. 3 illustrates an exemplary content identifier according to one embodiment.

FIG. 10 illustrates a content advertisement according to one embodiment. In one embodiment, a size element may be provided for all content items and gives the total size of the content. In one embodiment, the size is in bytes. In one embodiment, the size is a long (unsigned 64-bits). A content advertisement may also include a MIME (Multi-Purpose Internet Mail Extensions) type that describes the MIME type (encoding may be deduced from the type) of the in-line or referenced data. A content advertisement may also include a RefID element. If the advertised content is another advertisement (based upon its type), the RefID is the content identifier of the referenced content. If the advertised content is not another advertisement, the RefID element may be omitted.

The following is an example of one embodiment of a content advertisement in XML, and is not intended to be limiting:

<ContentAdvertisement>
<Mimetype> name of the pipe</Mimetype>
<Size> Pipe identifier </Size>
<Encoding> Pipe Type </Encoding>
<identifier> Content identifier</identifier>
<RefID> Content identifier </RefID>
<Document> document </Document>
</ContentAdvertisement>

Embodiments of a content advertisement may include, but are not limited to, the following fields:

identifier: in one embodiment, all contents have a unique id.

Size: the total size of the content. In one embodiment, a long (unsigned 64-bits) represented as a string. "−1" indicates that the size is unknown.

Mimetype: the mime type of the content. The type may be unknown.

Encoding: specifies the encoding used.

RefID: if the advertised content is about another content, the RefID specifies the content identifier of the referenced content.

In one embodiment, an endpoint advertisement may be used to describe peer transport protocols. In one embodiment, a peer may support one or more transport protocols. In one embodiment, peers may have multiple network interfaces. Typically, there will be one peer endpoint for each configured network interface and/or protocol (e.g. TCP/IP, HTTP). An endpoint advertisement may be included as a tag field in a peer advertisement to describe the endpoints available on the member peer. In one embodiment, an endpoint advertisement document may be published and obtained using either the core discovery service or by embedding it within other advertisements such as the peer advertisement. Each endpoint advertisement may include transport binding information about each network interface or transport protocol. Endpoints may be represented with a virtual endpoint address that may include all necessary information to create a physical communication channel on the specific endpoint transport. For example, "tcp://123.124.20.20:1002" or "http://134.125.23.10:6002" are string representing endpoint addresses. FIG. 11 illustrates the content of an endpoint advertisement according to one embodiment. The following is an example of one embodiment of an endpoint advertisement in XML, and is not intended to be limiting:

<EndpointAdvertisement>
<Name> name of the endpoint</Name>
<Keywords> search string </Keywords>
<Address> endpoint logical address </Address>
</EndpointAdvertisement>

Embodiments of an endpoint advertisement may include, but are not limited to, the following fields:

Name: an optional name that may be associated with an endpoint. In one embodiment, the name is not required to be unique unless the name is obtained from a centralized naming service that guarantee name uniqueness.

Keywords: an optional string that may be used to index and search for an endpoint. In one embodiment, the string is not guarantee to be unique. Two endpoints may have the same keywords.

Peer-to-Peer Platform Protocols

The peer-to-peer platform protocols may be used to provide and support ad hoc, pervasive, and multi-hop peer-to-peer (P2P) network computing. Using the protocols, peers can cooperate to form self-organized and self-configured peer groups independently of their positions in the network (e.g., edges, firewalls, network address translators, public vs. private address spaces, etc.), and without the need of a centralized management infrastructure. The peer-to-peer platform protocols may have very low overhead, make few assumptions about the underlying network transport and limited requirements of the peer environment, and may be used to deploy a wide variety of peer-to-peer applications and services in a highly unreliable and changing network environment.

In one embodiment, the peer-to-peer platform protocols may standardize the manner in which peers self-organize into peer groups, publish and discover peer resources, communicate, and monitor each other. The peer-to-peer platform protocols may allow the establishment of a virtual network overlay on top of physical networks, allowing peers to directly interact and organize independently of their network location and connectivity. Embodiments of the peer-to-peer platform protocols may be implemented on unidirectional links and asymmetric transports.

In one embodiment, the peer-to-peer platform may include core protocols including one or more of, but not limited to, a peer membership protocol, a peer discovery protocol, a peer resolver protocol, a peer information protocol, a pipe binding protocol, an endpoint routing protocol, and a rendezvous protocol. In one embodiment, a peer membership protocol may allow a peer to join or leave peer groups, and to manage membership configurations, rights and responsibilities. In one embodiment, a peer discovery protocol may be used to publish and discover resource advertisements. In one embodiment, a peer resolver protocol may be used to send a generic query to one or more peers, and receive a response (or multiple responses) to the query. In one embodiment, a peer information protocol may be used by a peer to obtain status information about another peers. In one embodiment, a pipe binding protocol may be used by a peer to establish a virtual communication channel or pipe between one or more peers. In one embodiment, an endpoint routing protocol may be used by a peer to discover a route (sequence of hops) to send a message to another peer, potentially traversing firewalls and NATs. In one embodiment, a rendezvous protocol may be used for propagating messages within a peer group.

The core peer-to-peer platform protocols may be implemented using a common messaging layer. This messaging layer binds the protocols to various network transports. In one embodiment, the peer-to-peer platform protocols may be specified as a set of markup language (e.g. XML) messages exchanged between peers. Each software platform binding describes how a message is converted to and from a native data structures such as a Java object or 'C' structure. In one embodiment, the use of markup language messages to define protocols allows many different kinds of peers to participate in a protocol. Each peer is free to implement the protocol in a manner best suited to its abilities and role. Peer-to-peer platform messages are described previously in this document.

In one embodiment, each of the protocols is independent of the others. In one embodiment, a peer may not be required to implement all of the networking protocols. A peer may implement only the protocol that it requires. For example, a device may have all the advertisements it uses pre-stored in memory, so that peer does not need to implement the peer discovery protocol. As another example, a peer may use a pre-configured set of peer routers to route all its messages, hence the peer does not need to implement the peer endpoint protocol. Instead, the peer sends messages to the routers to be forwarded. As yet another example, a peer may not need to obtain or wish to provide status information to other peers, hence the peer does not to implement the peer information protocol. The same can be said about all of the other protocols. In one embodiment, a peer may implement only a portion (client-side or server-side only, for example) of a protocol.

Peers may use the peer-to-peer platform protocols to advertise their resources and to discover network resources (services, pipes, etc.) available from other peers. Peers may form and join peer groups to create special relationships. The peer-to-peer platform protocols may allow peers to communicate without needing to understand or manage the potentially complex and dynamic network topologies that are becoming common. Peers may cooperate to route messages allowing for full peer connectivity. The peer-to-peer platform protocols allow peers to dynamically route messages across multiple network hops to any destination in the network (potentially traversing firewalls). Each message may include either a complete or a partial ordered list of gateway peers through which the message might be routed. If route information is incorrect, an intermediate peer may assist in dynamically finding a new route. In one embodiment, a peer-to-peer platform protocol message that is routed through multiple hops may not be assumed to be reliably delivered, even if only reliable transports such as TCP/IP are used through all hops. A congested peer may drop messages at any time rather than routing them.

The peer-to-peer platform protocols may be implemented on a variety of networks including, but not limited to, the Internet, corporate intranets, dynamic proximity networks, home networking environments, LANs and WANs. The peer-to-peer platform protocols may allow the peer-to-peer platform to be easily implemented on unidirectional links and asymmetric transports. In particular, many forms of wireless networking do not provide equal capability for devices to send and receive. The peer-to-peer platform permits any unidirectional link to be used when necessary, improving overall performance and network connectivity in the system. Thus, the peer-to-peer platform protocols may be easy to implement on any transport. Implementations on reliable and bi-directional transports such as TCP/IP or HTTP may provide efficient bi-directional communications. Even on bi-directional transports, communication ability between any pair of peers may at times not work equally well in both directions. That is, communications between two peers will in many cases be able to operate bi-directionally, but at times the connection between two peers may be only unidirectional, allowing one peer to successfully send messages to the other while no communication is possible in the reverse direction. The peer-to-peer platform unidirectional and asymmetric transport also plays well in multi-hop network environments where the message latency may be difficult to predict. Furthermore, peers in a P2P network tend to have nondeterministic behaviors and thus may appear or leave the network very frequently.

In one embodiment, the peer-to-peer platform protocols do not require a broadcast or multicast capability of the underlying network transport. Messages intended for receipt by multiple peers (propagation) may be implemented using point-to-point communications. In one embodiment, the peer-to-peer platform protocols may not require periodic messages of any kind at any level to be sent within the network, and thus may not require periodic polling, link status sensing, or neighbor detection messages, and may not rely on these functions from any underlying network transport in the network. This entirely on-demand behavior of the protocols and lack of periodic activity may allow the number of overhead messages generated by the peer-to-peer platform to scale all the way down to near or at zero, when all peers are stationary with respect to each other and all routes needed for current communication have already been discovered.

In one embodiment, the peer-to-peer platform protocols are defined as idempotent protocol exchanges. The same messages may be sent/received more than once during the course of a protocol exchange. In one embodiment, no protocol states are required to be maintained at both ends. Due to the unpredictability of P2P networks, assumptions may not be made about the time required for a message to reach a destination peer, and thus in one embodiment the peer-to-peer platform protocols may not impose timing requirements for message receipt.

The peer-to-peer platform protocols may take advantage of additional optimizations, such as the easy ability to reverse a source route to obtain a route back to the origin of the original route.

Figure 12:
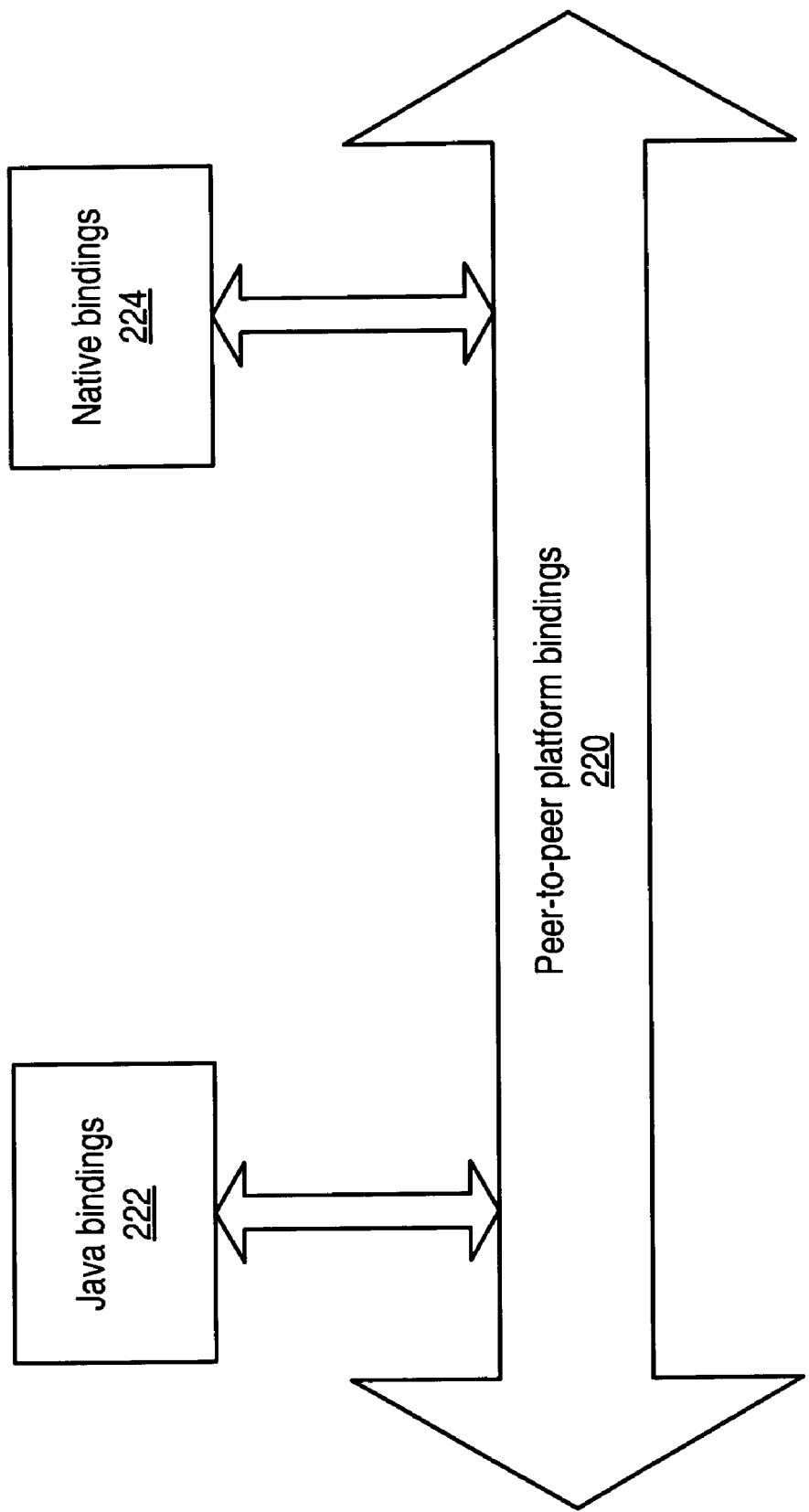
FIG. 12 illustrates protocols and bindings in a peer-to-peer platform according to one embodiment.

FIG. 12 illustrates protocols and bindings in a peer-to-peer platform according to one embodiment. When the peer-to-peer platform protocols are implemented using a particular programming language and over a particular transport protocol, the implementation is an instance of a peer-to-peer platform binding 220, where the peer-to-peer platform protocols are bound to the language and the transport layer. In one embodiment, protocol and peer software implementation issues may be defined in documents specific to the binding. A binding document describes how the protocols are bound to an underlying network transport (such as TCP/IP or UDP/IP) or to a software platform such as Java 222 or a native software platform 224 such as UNIX.

The following describes the transport binding of the peer-to-peer platform protocols over TCP/IP including the message wire format of peer-to-peer platform endpoint messages over a TCP/IP socket connection according to one embodiment. Each TCP/IP message may include a header and a body. In one embodiment, the format of the header is:

Type Source IP address Source Port Size Option Unused

The type may include information used to either unicast or multicast the request. The type may indicate whether this is a propagate message, a unicast message, an ACK or a NACK. The port may allow each peer to decide to bind its transport service to a specific port number. The TCP binding may not require that a specific port be used. The size may indicate the body size (not including the header). The option may be used to specify the kind of socket connections (uni- or bi-directional) in use. The TCP/IP binding does not require the maintenance of any states. The normal operation is for one peer to send a TCP/IP packet to another one, and to close the socket after the packet is sent. This is the minimum functionality required to implement unidirectional pipes. In one embodiment, if the receiving end decides to keep the connection active (socket "keep alive"), it may return an indicator to the sender to tell the sending end that it is keeping the connection alive. The sending end may reuse the same socket to send a new packet.

The following describes the transport binding of the peer-to-peer platform protocols over HTTP including the wire message format for the HTTP binding of the peer-to-peer platform protocols. An HTTP request format message may include a header and a body using an HTML format. For example:

<HTML>
<Code> Header </Code>
<Msg> Body </Msg>
</HTML>

The header allows the receiving end to determine which message type is received. Message types may include request succeeded, request failed, empty (no body) and response (the body is not empty and contains data). The body may be represented as a string in the HTML request document. Connection states that may be used include, but are not limited to:

Peer Connection: Before a message can be sent to a HTTP server peer, the HTTP client may be required to send a request for connection to the other peer. The request for connection message may use the empty header type. The message may be sent using a GET request to the following server URL: http://ip-name:port/reg/client-peerid/. ip-name specifies the IP of the server peer and the port is the corresponding server port number (8080 for example). The server replies with an empty message containing either a request succeeded or request failed header type. The peer connection message may be used to create a client session on the receiving peer. The receiving peer may decide to reject the connection and refuse the client connection. This corresponds to a client registration.

Message Sending: To send a message to another peer server, the client sends a message of the response type with a message body part. The server replies with an ok or failed message. The message is sent to the following URL using the PUT method: http://ip-name:port/snd/.

The server replies with a message including a request succeeded or request failed header type.

Message Retrieving: To retrieve messages from a peer server, the client may send a GET request message with the empty header tag to the following URL: http://ip-name:port/rec/client-peerid/. The server replies with may respond with a message failed message or with a Content message including the messages retrieved.

Peer Discovery Protocol

In one embodiment, the peer-to-peer platform may include a peer discovery protocol that may allow a peer to find advertisements on other peers. The peer discovery protocol may be used to discover any published peer resources including other peers, peer groups, pipes, software modules (e.g. services and applications) and any other resource that has an advertisement in the peer-to-peer network. This protocol may be used to find members of any kind of peer group, presumably to request membership. In one embodiment, the peer discovery protocol is the default discovery protocol for all peer groups, including the world peer group. The discovery protocol may be used as a default discovery protocol that allows all peer-to-peer platform peers to understand each other at a very basic level.

The peer discovery protocol may provide, at the lowest level, the minimum building blocks for propagating discovery requests between peers. Thus, the peer discovery protocol may provide the essential discovery infrastructure for building high-level discovery services. In many situations, discovery information is better known by a high-level service, because the service may have a better knowledge of the topology (firewall traversal), and the connectivity between peers. The peer discovery protocol may provide a basic mechanism to discover advertisements while providing hooks so high-level services and applications can participate in the discovery process. Services may be able to give hints to improve discovery (i.e. decide which advertisements are the most valuable to cache).

In one embodiment, the peer discovery protocol may be based on web crawling and the use of rendezvous peers. Rendezvous peers are peers that offer to cache advertisements to help others peers discover resources, and propagate requests they cannot answer to other known rendezvous peers. Rendezvous peers and their use in the discovery process are discussed later in this document.

In one embodiment, custom discovery services may choose to leverage the peer discovery protocol. In one embodiment, if a peer group does not have its own discovery service, the peer discovery protocol may be used as the method for probing peers for advertisements. Rendezvous peers may keep a list of known peers and peer groups. This list may or may not be exhaustive or timely. A custom discovery service (if it knew that the region's rendezvous did keep a timely exhaustive list), for example, may discover all peers in the region by sending a single message to the rendezvous peer.

In one embodiment, peer discovery may be done with, or alternatively without, specifying a name for the peer to be located and/or the group to which peers belong. When no name is specified, all discovered advertisements of the requested type may be returned. If a probing peer provides the name of the peer to be located, a simple translation may be requested that returns that peer's advertisement. Once a peer is discovered, ping, status, and capability messages may be sent to its "main" endpoint(s) using a peer information protocol. Peers may export more than one endpoint. In one embodiment, each peer designates at least one primary endpoint to handle the low-level housekeeping protocols such as the peer discovery protocol and the peer information protocol.

In one embodiment, the peer discovery protocol may be used to probe network peer groups looking for peers that belong to specified peer groups. This process may be referred to as screening. Peers may be screened for membership by presenting each candidate member with a peer group name (string matched with the peer group advertisement canonical name). In one embodiment, peers claiming to belong to this group may respond, while other peers do not respond. The peer discovery protocol may be used to discover any type of core advertisement including, but not limited to: peer advertisements, peer group advertisements, pipe advertisements and service advertisements.

Peer groups need customizable and adaptable discovery policies. In one embodiment, the peer-to-peer platform may be policy-agnostic, and may only provide the basics for discovery. The basics may include one or more core discovery protocols including, but not limited to, a propagate protocol (broadcast within a scope range (subnet or peer group members)), a rendezvous protocol (unicast to a trusted discovery peer) and an invite protocol (reverse discovering).

A discovery policy may be implemented in a discovery service based on the core discovery protocol. In one embodiment, a discovery service in the core peer-to-peer platform may be used to discover abstractions and/or entities in the peer-to-peer network including, but not limited to, peers, peer groups, peer group policies (group defined services) and pipe endpoints.

In some embodiments of a peer-to-peer platform, the discovery service may rely on trusted peers (discovery proxies). The discovery service may leverage local neighbors (local propagate). The discovery service may use rendezvous peers (indexes). The discovery service may leave traces in discovery proxies (cache). The discovery service may use net crawling as a last resort (propagate between trusted discovery proxies). In one embodiment, a discovery service may not discover some entities in the peer-to-peer network including, but not limited to, content (large scale; in one embodiment, a content management service may be used for content discovery), metadata (maintain relationship between data), users, and applications.

Embodiments of a peer-to-peer platform discovery service may leverage surrounding peers and peer groups, provide meetings points for far away peers and groups, use an asynchronous protocol and provide reverse discovery. In one embodiment, the discovery service may be used to find new neighbor peers and provide the ability for a peer to learn about other peer's abilities. Embodiments of a discovery service in the peer-to-peer platform may provide extensibility, spontaneous configuration, adaptive connectivity, a dynamic (i.e. no fixed) network topology, and the ability to reach the "edge of the Internet" (firewall, and NAT).

Some embodiments of a discovery method in the peer-to-peer platform may not require centralized naming (e.g. no DNS). In one embodiment, a discovery service may provide predefined meeting points that may be used in platform bootstrapping. In one embodiment, the discovery service may support a dynamic environment (peers may come and go). In one embodiment, the discovery service may support an unreliable environment (peers may fail). In one embodiment, the discovery service may help to adapt to a changing environment through viral behavior. In one embodiment, the discovery service may be used to improve performance as a system ages (increase locality). In one embodiment, the discovery service may be used in support of security (change of physical location). In one embodiment, a discovery service may be used that provides administrationless discovery (zero-admin).

Embodiments of the peer-to-peer platform discovery service may allow a peer to learn about other peers that discover it. In one embodiment, the peer-to-peer platform discovery service may provide application-managed rendezvous. In one embodiment of the peer-to-peer platform, a peer discovery protocol may support a discovery query message and a discovery response message to be used in the peer discovery process.

Peer groups need customizable and adaptable discovery policies. One approach to implementing a discovery policy is to start simple and build more complex policies.

Embodiments of the peer-to-peer platform discovery service may support discovery methods including, but not limited to:
Propagate Discovery
  Unicast to predefined rendezvous
  Leverage transport dependent multicast (e.g. IP)
Unicast Discovery
  Unicast to known rendezvous for forward propagation
  May be used for reverse Discovery In one embodiment, the peer-to-peer platform may not mandate exactly how discovery is done. Discovery may be completely decentralized, completely centralized, or a hybrid of the two. Embodiments of the peer-to-peer platform may support discovery mechanisms including, but not limited to:
  LAN-based discovery. This is done via a local broadcast over the subset.
  Discovery through invitation. If a peer receives an invitation (either in-band or out-of-band), the peer information contained in the invitation may be used to discover a (perhaps remote) peer.
  Cascaded discovery. If a peer discovers a second peer, the first peer may, with the permission of the second peer, view the horizon of the second peer to discover new peers, groups, and services.
  Discovery via rendezvous points. A rendezvous point is a special peer that keeps information about the peers it knows about. A peer that can communicate via a rendezvous peer, for example via a peer-to-peer protocol pipe, may learn of the existence of other peers. Rendezvous points may be helpful to an isolated peer by quickly seeding it with lots of information. In one embodiment, a web site or its equivalent may provide information of well-known peer-to-peer protocol rendezvous points.

In one embodiment, a peer-to-peer platform web of trust may be used. In a web of trust, a peer group creator may select initial discovery proxies, and may delegate to new peer members. Any peer, when trusted, can become a discovery proxy. Discovery proxies may propagate requests between each other for net-crawling discovery. New peers may be untrusted or low-trust peers, and may be typically difficult to find and have limited discovery range (this may help protect against misbehaviors and denial of service attacks). Trusted members are easier to discover. Peers may increase their discovery range as they become more trusted (discovery credential). Some peers may not need to discover beyond their initial net peer group range.

In one embodiment, a peer may go through a proximity network, which also may be referred to as a subnet or region, to try to find (discover) surrounding peers. The Internet includes the concept of subnets that are physically defined by physical routers that define regions in which computer systems are connected to one another. Within one of these regions, the peer-to-peer protocol uses multicast or other propagate mechanism to find peers. In one embodiment, a propagate discovery mechanism may be provided where one peer can propagate a discovery request through a local subnet. Peers that are in the subnet may respond to the discovery request. The propagate discovery mechanism may provide primarily close range discovery. In one embodiment, only peers that are in the same physical subnet (region) may respond. "Propagate" is at the conceptual level. Multicast is implemented by TCP/IP to provide propagate capabilities. Other transports may use other methods to implement propagate. For example, Bluetooth provides a different implementation of propagate which is not multicast.

The core discovery protocol may provide a format for a local peer to send a propagate message (a request to find information about other peers or peer groups in its local region or subnet) and a format for a response message. A propagate may ask who is there (what peers are in the subnet). One or more peers may decide to respond. Other peers on the subnet may choose not to respond if they do not want to be discovered by the requesting peer. The response message may indicate that a peer is there and that the requesting peer may communicate with it if it wants more information. In one embodiment, the core peer-to-peer platform may define the format of the discovery requests and responses as part of the peer discovery protocol. In one embodiment, the messages may be XML messages.

One embodiment of a peer-to-peer platform may provide a bootstrapping process for peers. In one embodiment, a new peer may not know any peers or peer groups when bootstrapped. When bootstrapping, the peer may issue a peer discovery propagate message. The new peer is looking for one or more peers in the subnet. The new peer needs to reach some level of connectivity in order to support higher-level operations. From discovered peers, the new peer may acquire information needed to allow the new peer to go further in its bootstrapping process. For example, the new peer may send messages to another peer requesting information on services that the other peer may be aware of that the new peer needs for bootstrapping.

When the new peer discovers another peer or peers, it may attempt to discover peer groups. This process may be similar to the peer discovery process described above. The new peer may send (e.g. propagate) another discovery message that is configured to discover peer groups. Peers in the proximity network (region) that are aware of a peer group or peer groups may respond to the peer group discovery message, and may return information on the peer group(s) (e.g. peer group advertisements) of which they are aware. The new peer may use this information to determine a peer group or peer groups that it may be interested in joining.

In one embodiment, a peer group may be configured so that only a subset of peers within a group may have the capabilities to respond to peer group discovery messages and to provide information about the peer group to inquiring peers.

Peer and peer group discovery may both be implemented by the peer discovery protocol. Peer and peer group discover are more or less at the same level in the P2P platform. In one embodiment, peer discovery may use a message that indicates the discovery is looking for peers, and peer group discovery may use a similar message that indicates the discovery is looking for peer groups.

In one embodiment, the peer discovery protocol may be required to be implemented in a peer platform, and thus all peers will have the service running. When one peer sends (e.g. propagates) a request, then a receiving peer must send a response, unless it is configured to not respond to at least some requests from at least some peers based upon configuration parameters. In another embodiment, peers may be implemented without the peer discovery protocol. In other words, in this embodiment, peers are not required to implement the peer discovery platform. For example, on some smart devices, peer information and/or peer group information may be preconfigured into the device, and so bootstrapping may be performed on these devices without having to initiate a peer discovery.

Embodiments of the peer-to-peer platform may implement a discovery mechanism that is more suited for long-range discovery than the propagate method described above. In one embodiment, rendezvous peers may be used in discovery. A rendezvous peer may be described as a meeting point where peers and/or peer groups may register to be discovered, and may also discover other peers and/or peer groups, and retrieve information on discovered peers and/or peer groups. In one embodiment, a peer (any peer) in a peer group may decide to become or may be appointed or elected as a rendezvous peer in the group. The rendezvous peer may be advertised as a meeting point, and may be predefined on peers so that, for example, the peers, when starting up, may know to go to the rendezvous peer to find information about the peer-to-peer network. Rendezvous peers may act as information brokers or centralized discovery points so that peers can find information in an easy and efficient manner. As a peer group grows, a peer may become a rendezvous peer in the group. In one embodiment, a network of rendezvous peers may be constructed that may help to provide long-range discovery capabilities. A rendezvous peer may be aware of at least some of the other rendezvous peers in the network, and a discovery message from a peer may be forwarded from a first rendezvous peer to a second, and so on, to discover peers and/or peer groups that are "distant" on the network from the requesting peer.

Rendezvous peers may offer to cache advertisements to help others peers discover resources, and may propagate (forward) requests they cannot answer to other known rendezvous peers. In one embodiment, a rendezvous peer implements at least one of these two functions. The services provided by a rendezvous peer may be different than message routing. Message routing is performed at a lower level involving multi-hops connections to send a message between any peers in the network. In one embodiment, the forwarding of a request between two rendezvous peers may involve routing to propagate a request between two rendezvous, but this is transparent to the rendezvous service and done underneath.

In one embodiment, rendezvous peers may forward requests between each other. A rendezvous may be typically connected to a few other rendezvous peers. There may be as many rendezvous peers as peers in a peer group. Not every peer may be a rendezvous (e.g. if a peer has no caching capabilities or is isolated behind a firewall). In one embodiment, only rendezvous peers may forward a discovery request to another rendezvous peer. This restriction may serve to limit and control the exponential growth of request propagations within the network. Rendezvous peers may thus provide a simple throttle mechanism to control the propagation of requests. In one embodiment, sophisticated rendezvous peers may be deployed to filter and distribute requests for the best usage of network resources.

In one embodiment, a peer may be pre-configured with a pre-defined set of rendezvous peers. These bootstrapping rendezvous may help the peer discover enough network resources (peers, rendezvous, services) as it needs to support itself. In one embodiment, the pre-configured rendezvous are optional. A peer may be able to bootstrap by finding rendezvous or enough network resources in its proximity environment. If a peer does not know the information, it may ask the surrounding peers (hop of 1) if they know the answer. One or more peers may already have the answer. If no surrounding peers know the answer, the peer may ask its rendezvous peers to find advertisements. Peers are recognized as rendezvous peers in their peer advertisements. When a peer discovers a new peer, it can determine if this peer is a rendezvous. A peer may not be required to use all the rendezvous peers that it has discovered.

Rendezvous peers may forward requests between themselves. The discovery process continues until one rendezvous peer has the answer or the request dies. There is typically a Time To Live (TTL) associated with the request, so it is not infinitely propagated. As an example, suppose a peer A is attempting to discover a resource R on the network. Peer A issues a discovery request specifying the type (peer, peer group, pipe, service) of advertisements it is looking for. To initiate the Discovery, peer A sends a discovery request message as a single propagate packet to all its available endpoints. The packet may contain the requested peer advertisement, so the receiving peer can respond to the requester. Each discovery request identifies the initiator, and a unique request identification specified by the initiator of the request. When another peer receives the discovery request (assume peer B in this example), if it has the requested R advertisement, it will return to peer A the advertisement for R in a discovery response message. If Peer A does not get response from its surrounding peers (hop of 1), Peer A may send the request to its known rendezvous peers. If the rendezvous peers do not have the advertisement, they can propagate the request to all other rendezvous peers they know. When a rendezvous receives a respond to a request, the rendezvous may cache the R advertisement for future usage, before sending it to the requestor.

In one embodiment, the peer rendezvous capabilities may be embedded in the core discovery protocol of the peer-to-peer platform. Rendezvous peers may be protocol-based, and may broker more information than name servers that typically only broker names of entities. In one embodiment, a rendezvous peer may maintain indexes for entities in the peer-to-peer platform including peers, peer groups, and advertisements. Indexes may be dynamic indexes which may grow as the peer group community grows and more peers join. As a group joins, some peers may decide to become rendezvous peers to help peers connect with other peers in the group.

The rendezvous peer is at the peer level. A rendezvous peer is not a "service". A rendezvous peer may be used as part of an infrastructure to construct services such as a DNS or other centralizing and index services. In one embodiment, services may interact with a rendezvous peer to obtain and/or manipulate information stored on the rendezvous peer to perform some task to make the system act more efficiently.

In a network of peers, some peers may elect themselves, through the discovery protocol, to become rendezvous peers. A rendezvous peer may act as a broker or discovery message router to route discovery messages to the right place. In other words, a rendezvous may act to route discovery requests to the right rendezvous peers. For example, a rendezvous peer may receive a message requesting information about peers that are interested in baseball. The rendezvous peer may know of another rendezvous peer that specializes in information about baseball. The first rendezvous peer may forward or route the message to the second rendezvous peer. In one embodiment, rendezvous peers may maintain connections to other rendezvous peers in order to provide discovery and routing functionality.

Rendezvous peers may support long-range discovery. For example, a first peer is at a remote location from a second peer. For one of these peers to find the other with a mechanism such as web crawling may be time consuming, since there maybe a lot of "hops" between the two peers. Rendezvous peers may provide a shortcut for one of the peers to discover the other. The rendezvous peer, thus, may serve to make the discovery process, in particular long-range discover, more efficient.

A peer-to-peer network may be dynamic. Peers and peer groups can come and go. Dynamic identifiers (addresses) may be used. Thus, routes between peers need to be dynamic. Rendezvous peers may provide a method for route discovery between peers that allows routing in the peer-to-peer network to be dynamic. In this method, the rendezvous peers may perform route discovery for peers when the peers send discovery messages to the rendezvous peers or when a peer is attempting to connect to another peer or peer group that is not in the local region of the peer. This method may be transparent to the requesting peer.

In one embodiment, the rendezvous peers may be able to cache advertisements. An advertisement may be defined as metadata or descriptions of a resource. An advertisement may include information necessary for an entity to connect to or use the resource, for example a service advertisement may include information for connecting to and using the service. Advertisements may be published to allow other entities to discover them. The rendezvous peer may provide the ability for services and applications to store and cache temporary, e.g. via a lease mechanism, advertisements. This may used, for example, when one service needs to connect to another service, and needs the pipe endpoint or communication channel that may be used to connect to the service. The pipe endpoint may be included in a service advertisement published on a rendezvous peer. Thus, in one embodiment, the rendezvous peer provides the ability for peers, peer groups, services and applications to advertise pipe endpoints and to discover pipe endpoints of services and applications.

Figure 13:
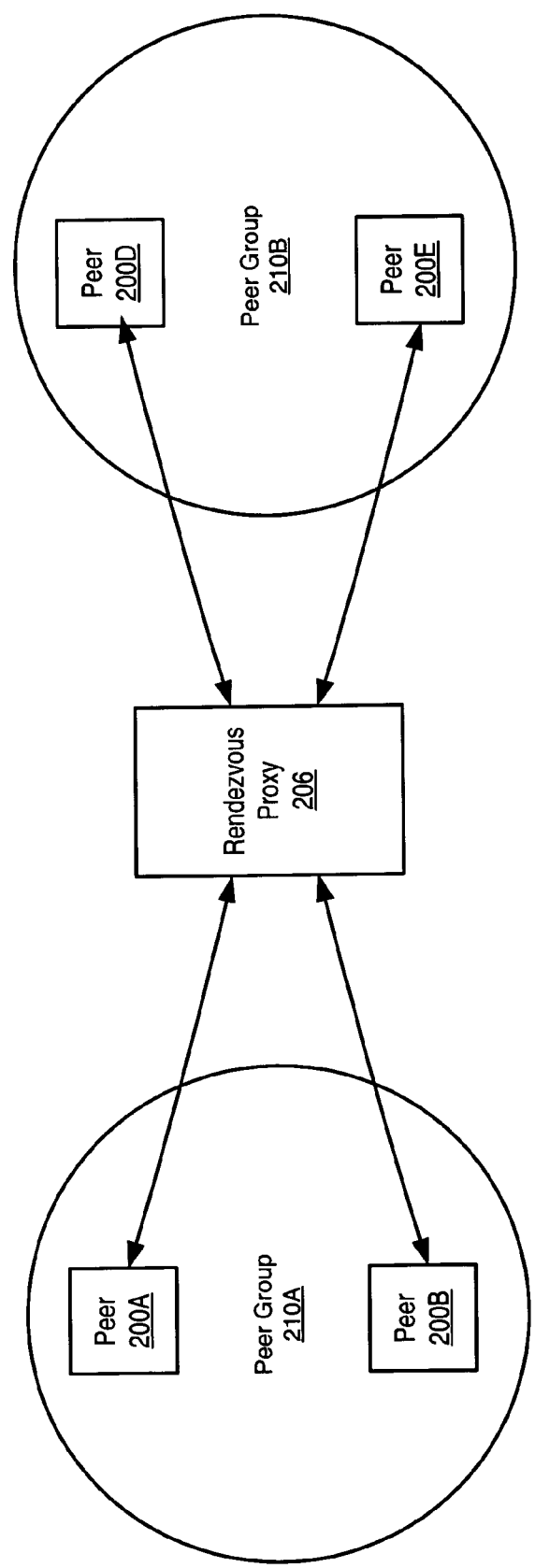
FIG. 13 illustrates discovery through a rendezvous proxy according to one embodiment.

In one embodiment, the rendezvous protocol may use an index cache (e.g. on a peer serving as a rendezvous proxy). FIG. 13 illustrates discovery through a rendezvous peer according to one embodiment. Rendezvous proxy 206 may cache peer 200 and peer group 210 information for peer groups 210A and 210B. Peers 200 in each peer group 210 may then discover each other through rendezvous proxy 206. Rendezvous proxy 206 may itself be a peer and may be a member in one or more peer groups 210. In one embodiment, access to rendezvous proxies 206 may be restricted to peers with rendezvous access privileges. In this embodiment, non-trusted peers (peers without access privileges) may access rendezvous proxies 206 through trusted peers 200 within their peer group 210, or alternatively through other local peers in other peer groups. In one embodiment, the rendezvous protocol may be used across subnets (configurable at the peer group level). In one embodiment, the rendezvous protocol may be used across/through firewalls (e.g. gateways).

Figure 14:
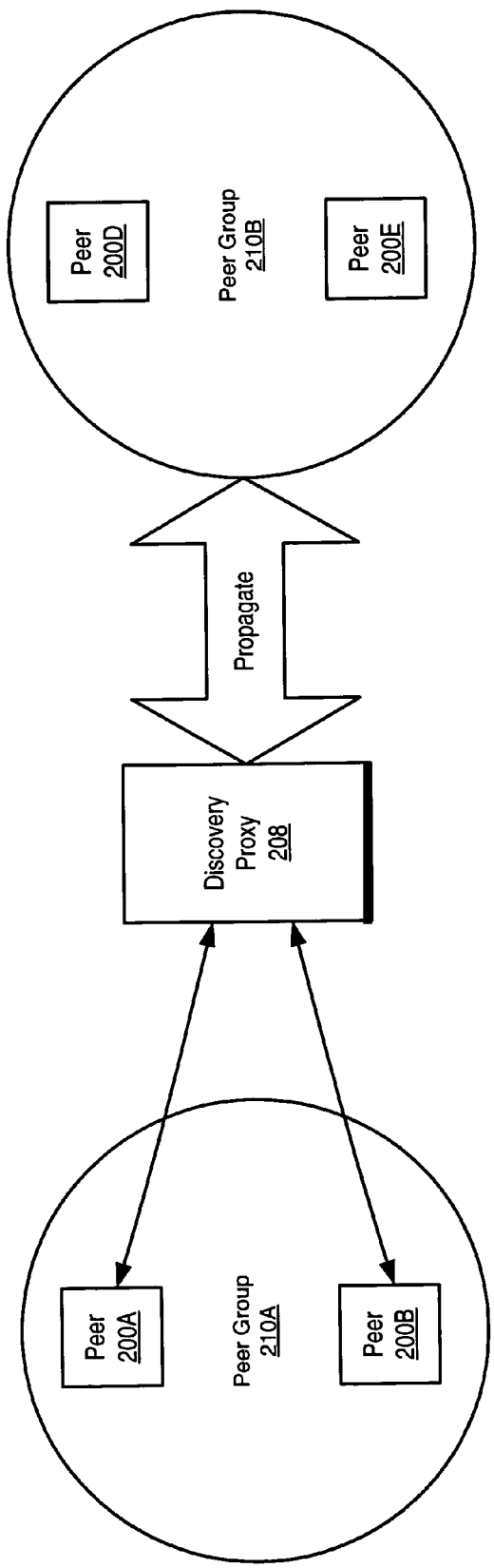
FIG. 14 illustrates discovery through propagate proxies according to one embodiment.

In one embodiment, the peer-to-peer platform may include a propagate policy for use in discovery. FIG. 14 illustrates discovery through propagate proxies according to one embodiment. In one embodiment, discovery proxy 208 may control propagation of discovery messages. In FIG. 14, discovery proxy 208 may receive discovery messages from peers 200 in peer group 210A and propagate the messages to peers in other groups such as peer group 210B. In one embodiment, access to discovery proxies 208 may be restricted to peers with discovery proxy access privileges. In this embodiment, non-trusted peers (peers without access privileges) may access discovery proxies through trusted peers 200 within their peer group 210, or alternatively through other local peers in other peer groups. In one embodiment, propagation may be controlled using TTL (time to live). In another embodiment, propagation may be controlled using message counts. In one embodiment, the propagate policy may be used for subnet TCP/multicast (platform configurable). In one embodiment, the propagate policy may support HTTP gateways (platform configurable). In one embodiment, the propagate policy may be used through firewalls (e.g. need peer activation behind firewalls).

In one embodiment, the peer-to-peer platform may include an invite policy. In one embodiment, the invite policy may support the adding of new peers and peer groups (e.g. publish advertisements).

In one embodiment, the peer-to-peer platform may allow the persistent local peer caching of discovery information. In this embodiment, a peer may be allowed to cache advertisements discovered via the peer discovery protocol for later usage. Caching may not be required by the peer-to-peer platform, but caching may be a useful optimization. The caching of advertisements by a peer may help avoid performing a new discovery each time the peer is accessing a network resource. In a highly transient environment, performing the discovery may be necessary. In a static environment, caching may be more efficient.

In one embodiment, the peer-to-peer platform may support trusted discovery peers. In one embodiment, the peer-to-peer platform may use discovery credentials. In one embodiment, the peer-to-peer platform may allow credential delegation. In one embodiment, the peer-to-peer platform may support propagate proxies. In one embodiment, a propagate proxy may support TTL/message counts. TTL stands for Time To Live (how long the request lives in the system). In one embodiment, a propagate proxy may support net crawling. In one embodiment, a propagate proxy may provide "smart above" routing.

In one embodiment, a peer may not initiate a new discovery request until the minimum allowable interval between discoveries is reached. This limitation on the maximum rate of discoveries may be similar to the mechanism required by Internet nodes to limit the rate at which ARP requests are sent for any single target IP address. The maximum rate may be defined by each specific implementation transport bindings and exported to the application.

Figure 15:
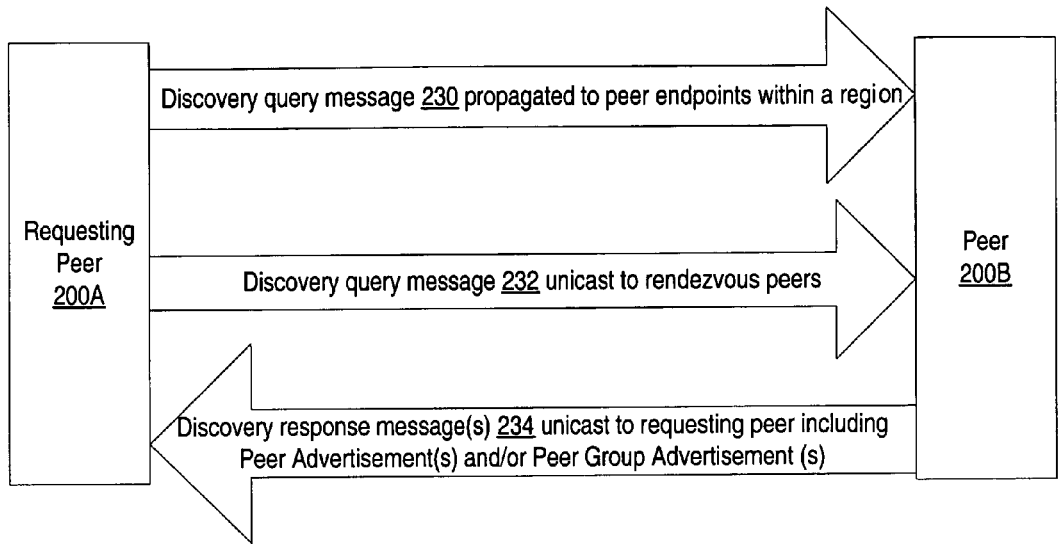
FIG. 15 illustrates using messages to discover advertisements according to one embodiment.

FIG. 15 illustrates using messages to discover advertisements according to one embodiment. A message or messages may be used to get all known, reachable advertisements within a region on the network. In one embodiment, this list may not be guaranteed to be exhaustive, and may be empty. Named peers may also be located using the peer discovery protocol. A message may include a peer group credential of the probing (requesting) peer that may identify the probing peer to the message recipient. The destination address may be any peer within a region (a propagate message 230) or alternatively a rendezvous peer (a unicast message 232). The response message 234 may return one or more advertisements (e.g. peer advertisements and/or peer group advertisements) that may include "main" endpoint addresses which may be converted to a string in the standard peer endpoint format (e.g. URI or URL) and also may include a network transport name.

In one embodiment, the peer discovery protocol may not guarantee peers that receive a query will respond to the query, nor does it mandate that the number of advertisements requested will be honored. In this embodiment, a best effort is made at matching the query to results in the respondent's cache. In one embodiment, the peer discovery protocol does not guarantee that a response to a discovery query request will be made. In one embodiment, responding to a discovery query request is optional. A peer may not be required to respond to a discovery query request.

In one embodiment, the peer discovery protocol does not require a reliable transport. Multiple discovery query requests may be sent. None, one, multiple pr redundant responses may be received. In one embodiment, the peer discovery protocol may utilize the resolver protocol to route queries and responses. The tasks of propagating and re-propagating a query to the next set of peers may be delegated to the resolver service.

In one embodiment, a peer may receive a discovery response that is not a response to any discovery query initiated by the peer. This mechanism may provide the ability to remote publish a resource. In one embodiment, the peer discovery protocol may provides a mechanism for services to query the network for peer-to-peer resources and receive responses. In one embodiment, the peer discovery protocol may be used to take care of some or all messaging aspects, caching, and expiring advertisements.

In one embodiment, a discovery query message may be used to send a discovery request to find advertisements (e.g. for peers or peer groups). The discovery query may be sent as a query string (attribute, value) form. A null query string may be sent to match any results. A threshold value may be included to indicate the maximum number of matches requested by a peer. The following is an example of one embodiment of a discovery query message in XML, and is not intended to be limiting:

<DiscoveryQuery>
   <Credential> Credential </Credential>
   <QueryID> query id</QueryID>
   <Type> request type (e.g. PEER, PEER GROUP, PIPE, SERVICE, CONTENT)</Type>
   <Threshold> requested number of responses </Threshold>
   <PeerAdv> peer advertisement of requestor </PeerAdv>
   <Attribute> attribute </Attribute>
   <Value> value </Value>
   </DiscoveryQuery>

Embodiments of a discovery query message may include one or more of, but are not limited to, the following fields:

Credential: The credential of the sender.
QueryID: Query identifier.
Type: specifies which advertisements are returned.
Threshold: specifies the maximum number of advertisements that each responding peer should provide. The total number of results received may depend on the number of peers that respond and the advertisements they have. In one embodiment, if <Type> indicates peer advertisements and <Threshold> is a particular value (e.g. 0) then the query is to collect peer advertisements of respondents. Therefore, any peer should respond to such a query, even though no results are to be included.
PeerAdv: if present, peer advertisement of the requestor.
Attribute: specifies the query attribute.
Value: specifies the query value.

In one embodiment, the value is only present if the attribute is present. Both the attribute and value may be omitted. In one embodiment, both attribute and value must either both be present or absent. In one embodiment, if attribute and value are absent, then each respondent may supply a random set of advertisements of the appropriate type up to <Threshold> count.

In one embodiment, only advertisements including an element with a name matching <Attribute> and that also includes a value matching <Value> are eligible to be found. In one embodiment, <Value> may begin and/or end with an indicator such as a special character (e.g. "*"). This indicates that <Value> will match all values that end with or beginning with, or contain the rest of the string. If <Value> includes only the indicator (e.g. "*"), the result may be unspecified. Some implementations may choose not match any advertisement for a <Value> including only the indicator.

In one embodiment, a discovery response message may be used to send a discovery response message to answer a discovery query message. The following is an example of one embodiment of a discovery response message in XML, and is not intended to be limiting:

<DiscoveryResponse>
   <Credential> Credential </Credential>
   <QueryId> query id</QueryId>
   <Type> request type (e.g. PEER, GROUP, PIPE, SERVICE, CONTENT)</Type>
   <PeerAdv> peer advertisement of the respondent </PeerAdv>
   <Attribute> Attribute </Attribute>
   <Value> value </Value>
   <Count> count </Count>
   <Responses>
     (peer, peer group, pipe, service or content advertisement response)
   </Responses>
   <...>
   <Responses>
     (peer, peer group, pipe, service or content advertisement response)
   </Responses>
   </DiscoveryResponse>

Embodiments of a discovery response message may include one or more of, but are not limited to, the following fields:

Credential: The credential of the sender.
QueryID: Query identifier.
Type: The type of the advertisements returned in the <Response> element(s).
Count: If present, the number of <Response> element(s) included in this response message.
PeerAdv: If present, the advertisement of the respondent. May include an expiration attribute that indicates the associated relative expiration time in milliseconds.
Attribute: specifies the query attribute.
Value: specifies the query value.
Responses: advertisement responses. The advertisements may be, for example, peer, peer group, pipe, content or software module (e.g. service) advertisements. In one embodiment, each may include an Expiration attribute that indicates an associated relative expiration time in milliseconds.

In one embodiment, the value tag is only present if the Attribute tag field is present. Both the Attribute and Value tag may be omitted.

In one embodiment, if an advertisement document (e.g. an XML document) is embedded into another document (e.g. XML document), the document separators must be dealt with. For XML documents, his may be done using the standard XML escaping rules. For example, '<' becomes '&lt;' '>' becomes '&gt;' and '&' becomes '&amp'.

Reverse Discovery

Reverse discovery means that, in a peer-to-peer network, when a first entity (e.g. a peer) discovers a second entity (e.g. another peer), the second entity may also discover the first entity from the discovery initiated by the first entity. This may also be referred to as "mutual discovery". In most traditional systems, discovery is typically one-directional. In the peer-to-peer world, reverse discovery is important because, by definition, all "peers" are equal (i.e. it is typically not a hierarchical system). In one embodiment, there may be different levels of discovery for peers. For example, a peer may be configured to remain anonymous when discovering other peers or to always support reverse discovery. In one embodiment, a peer initiating a discovery may also be configured to deny discovery to another peer if the other peer is configured or chooses to remain anonymous. In one embodiment, a peer may also be configured to or may choose to deny discovery by other peers that wish to remain anonymous.

Invitations

One embodiment of the discovery protocol may also provide methods by which a peer can "advertise" itself, for example when joining a peer-to-peer network. For example, a peer may send an email message, by telephone, by "traditional" mail, or by other methods to other peers it discovers or is preconfigured to know about to advertise its presence and willingness to be contacted by other peers. This is done outside of the discovery method, and may be performed by any external medium. A peer who receives an invitation from a peer may have a capability to add or enter the new peer to a list or database of peers that it knows about. When the peer later restarts, these peers may be among the preconfigured peers that the peer knows about. In one embodiment, a peer may have a "notify" or "invitation" interface to allow a user to initiate invitations. In one embodiment, the peer-to-peer platform may provide import and export capabilities for invitations. In one embodiment, the invitations may be implemented as documents external to the peer-to-peer system that may be exported from one peer and imported into another peer. In one embodiment, the invitations may be in a format that enables the exporting and importing. In one embodiment, the invitations may be in XML format. In one embodiment, an interface may be provided to allow the manual entering of invitation information. Importing the invitation may create a peer-to-peer platform document that may then be used by the peer. The format of exported documents may depend on the platform on which the peer is implemented.

Rendezvous Protocol

One embodiment may include a rendezvous protocol that may be responsible for propagating messages within a peer group. While different peer groups may have different means to propagate messages, the rendezvous protocol defines a protocol that enables peers to connect to services (propagate messages to other peers and receive propagated messages from other peers) and to control the propagation of messages (TTL, loopback detection, etc.).

One embodiment may include a rendezvous advertisement that may be used to describe a peer that acts as a rendezvous peer for a given peer group. Rendezvous advertisements may be published and retrieved, so that peers that are looking for rendezvous peers can find them. In one embodiment, a rendezvous advertisement may include a name element that may be associated with the rendezvous peer. This may be the peer name. In one embodiment, the name element is optional. In one embodiment, a rendezvous advertisement may include a rendezvous group identifier element that includes the peer-to-peer platform identifier of the peer group for which the peer is a rendezvous. In one embodiment, this element is required. In one embodiment, a rendezvous advertisement may include a rendezvous peer identifier element that may include the peer-to-peer platform identifier of the rendezvous peer. In one embodiment, this element is required.

Rendezvous peers may be used to re-propagate messages they have received. A peer may dynamically become a rendezvous peer and/or may dynamically connect to a rendezvous peer. In one embodiment, the connection between a peer and a rendezvous peer may be achieved by an explicit connection, associated to a lease. In one embodiment, this connection may be performed by sending messages using the endpoint protocol. Each rendezvous protocol may be listening on an endpoint address with a service name and service parameter (e.g. peer group identifier).

In one embodiment, one or more queries and responses may be defined by the rendezvous protocol in order to establish connections. A lease request may be sent by a peer that desires to connect to a given rendezvous. In one embodiment, the lease request may not include an indication of the amount of the lease; the rendezvous will give whatever amount it determines is appropriate. In one embodiment, a rendezvous that grants a lease may return a lease granted message. This message is sent by a rendezvous that is granted a lease to a given client. The amount of time the lease is granted may be included in the message. In one embodiment, a lease may be canceled by either party at any time if necessary or desired. A lease cancel request may be sent by a client to a rendezvous in order to cancel an existing lease. The rendezvous may reply with a lease cancelled message.

In one embodiment, the peer resolver protocol resides on top of the rendezvous protocol. In this embodiment, the peer resolver protocol is not used to send these messages. In one embodiment, the rendezvous protocol may reside on top of the endpoint routing protocol, which may be used to send rendezvous protocol messages.

In one embodiment, the rendezvous protocol is responsible for controlling the propagation of messages. In one embodiment, the rendezvous protocol may propagate a message unless of the following conditions is detected:

Loop: if a propagated message has already been processed on a peer, it is discarded.

TTL: propagated messages are associated with a Time To Live (TTL). Each time a propagated message is received on a peer, its TTL is decreased by one. When the TM of a message drops to zero, the message is discarded.

Duplicate: each propagated message is associated with a unique identifier. When a propagated message has been duplicated, and has already been received on a peer, duplicates are discarded.

In one embodiment, propagation control may be performed by embedding a message element within each propagated message that may include one or more of, but is not limited to, the following elements: a message identifier, a destination name, a destination parameter, a TTL, and a path.

In one embodiment, when a peer wants to connect to a Rendezvous Peer, it sends a lease request message with a connect message element which includes its peer advertisement. When a rendezvous peer grants a lease, it sends a lease granted message to the source of the lease request. In one embodiment, a lease granted message may include one or more of, but is not limited to, the following elements:

A connected lease element that includes (e.g. in a String representation) the time in milliseconds the lease is granted for. In one embodiment, this is a required element.

A connected peer element that includes the peer identifier of the rendezvous peer that has granted the lease. In one embodiment, this is a required element.

A rendezvous advertisement reply element that includes the peer advertisement of the rendezvous peer that grants the lease. In one embodiment, this is an optional element.

In one embodiment, when a peer desires to cancel a lease, it sends a lease cancel request with a disconnect message element that includes the peer advertisement of the peer which is requesting to cancel the lease.

Peer Resolver Protocol

In one embodiment, the peer resolver protocol may be used to disseminate generic queries to one or multiple handlers within a peer group and identify matching responses. Each query may be addressed to a specific handler name. In one embodiment, this handler name may define the particular semantics of the query and its responses, but is not associated with any specific peer. A given query may be received by any number of peers in the peer group, possibly all, and processed according to the handler name if such a handler name is defined on that peer. In one embodiment, the peer resolver protocol may provide a generic query/response infrastructure for building high-level resolver services. In many situations, a higher-level service may have a better knowledge of the group topology. In one embodiment, the peer resolver protocol may use a rendezvous service to disseminate a query to multiple peers or unicast messages to send queries to specified peers.

In one embodiment, the peer resolver protocol may allow a peer to send simple, generic search queries to one or more peer services. In one embodiment, only those peers that have access to data repositories and that offer advanced search capabilities typically implement this protocol. Each service may register a handler in the peer group resolver service to process resolver query requests. Resolver queries may be demultiplexed to each service. Each service may respond to a peer via a resolver response message. It is important to point the differences between the peer discovery protocol and the peer resolver protocol. The peer discovery protocol is used to search for advertisements to bootstrap a peer, and discover new network resources. The peer resolver protocol is a generic service that services query protocols. The peer resolver protocol may be used by a service on a peer to interact with a service on another peer.

The peer resolver protocol may enable each peer to send and receive generic queries to find or search for peer, peer group, pipe or service specific information such as the state of a service or the state of a pipe endpoint. In one embodiment, each resolver query may have a unique service handler name to specify the receiving service, and a query string to be resolved by the service. In one embodiment, the peer resolver protocol may provide a generic mechanism for peers to send queries and receive responses. In one embodiment, the peer resolver protocol may remove the burden for registered message handlers by each service and set message tags to ensure uniqueness of tags. In one embodiment, the peer resolver protocol may be used to take care of some or all messaging aspects, caching queries and responses and forwarding queries, based on the invoker's decision. In one embodiment, the peer resolver protocol may ensure that messages are sent to correct addresses and peer groups. In one embodiment, the peer resolver protocol may perform authentication and verification of credentials and the dropping of rogue or incorrect messages.

Figure 16:
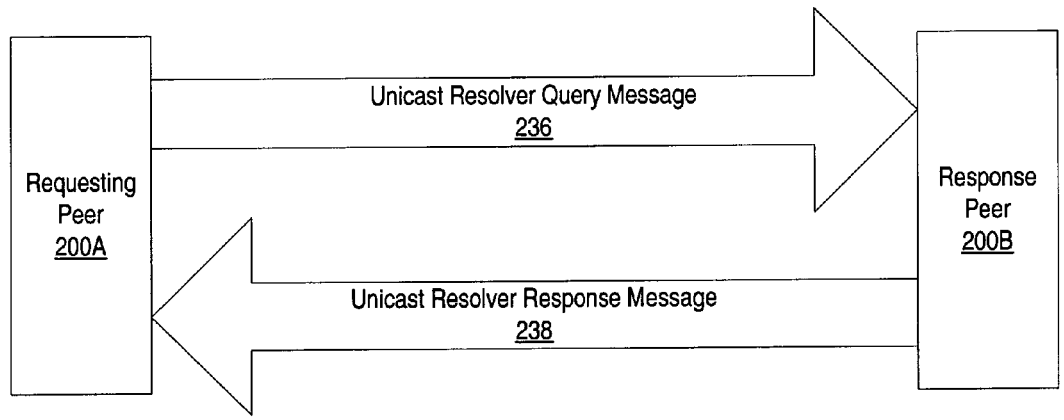
FIG. 16 illustrates one embodiment of using peer resolver protocol messages between a requesting peer and a responding peer.

FIG. 16 illustrates one embodiment of using peer resolver protocol messages between a requesting peer 200A and a responding peer 200B. A resolver query message 236 may be used to send a resolver query to a named handler on one or more peers 200 that are members of the peer group. In one embodiment, a resolver query message 236 may be used to send (unicast) a resolver query request to a service on another member 200B of a peer group. In one embodiment, the resolver query may be sent as a query string to a specific service handler. In one embodiment, each query has a unique identifier. The query string may be any string that may be interpreted by the targeted service handler. A resolver response message 238 may be sent (unicast) to the requesting peer 200A by the service handler. The following is an example of one embodiment of a resolver query message in XML, and is not intended to be limiting:

<ResolverQuery>
<Credential> Credential </Credential>
<HandlerName> name of handler </HandlerName>
<SrcPeerID> source peer identifier </SrcPeerID>
<QueryID> incremental query identifier </QueryID>
<Query> query string </Query>
</ResolverQuery>

Embodiments of a resolver query message may include, but are not limited to, the following fields:

Credential: The credential of the sender
HandlerName: service the query needs to be passed
SrcPeerID: The identifier of the peer originating the query (e.g. a URN)
QueryId: Query identifier
Query: query string A resolver response message may be returned in response to a resolver query message. The following is an example of one embodiment of a resolver response message in XML, and is not intended to be limiting:

<ResolverResponse>
<Credential> Credential </Credential>
<HandlerName> name of handler </HandlerName>
<QueryID> query identifier </QueryID>
<Response> response </Response>
</ResolverResponse>

Embodiments of a resolver response message may include, but are not limited to, the following fields:

Credential: The credential of the respondent
QueryID: Query identifier of the query to which this is a response
HandlerName: Specifies how to handle the response; e.g. service the query needs to be passed to
Response: response string including the response(s)

In one embodiment, the peer resolver protocol communicates by exchanging endpoint messages. Endpoint addresses specify a handler name. The peer resolver protocol attaches a listener by that name to the endpoint service.

In one embodiment, peer resolver protocol implementations may use the same scheme for building their handler names. The convention used by all services of the world peer group may use the concatenation of the service name, the peer group identifier, and a value unique within the service.

The handler name in peer resolver protocol messages may perform a role similar to that of the handler name in endpoint message addresses: it is a demultiplexing key that specifies how, by which higher-level protocol, or by which module, the message is to be processed. In one embodiment, the users of the peer resolver protocol are typically services. Each instance of a given service (one per peer per group that uses this service) generates a handler name that is unique on its peer, but will be identical for the instances of this service on other peers. In one embodiment, this may be achieved by concatenating the service name (which is unique in the group), the group identifier, which is unique in the peer, and an additional parameter that serves to discriminate between several handlers used by the same service, if needed.

The handler name may be used both to register the appropriate handler for incoming queries or responses, and as a destination for outgoing queries or responses. In one embodiment, clients of the resolver may define two names: one for propagated messages (e.g. queries), and one for unicast messages (e.g. responses).

In one embodiment, the peer resolver protocol may not allow the registration of more than one handler with the same name. A service may register for any handler name that it uses as a destination, thereby preventing other services from registering themselves to receive these messages. In one embodiment, a service or application that receives queries or responses from a service instance on another peer is de-facto the local instance of that service and may handle these messages as specified.

In one embodiment, the peer resolver protocol may not guarantee peers that define a query handler name will receive that query or mandate that all peers that define this handler name will receive it. In this embodiment, the peer resolver protocol may be used to disseminate the query in a way that maximizes the chance of obtaining a response, if one can be obtained. In one embodiment, response to a resolver query request is optional; a peer is not required to respond. In this embodiment, it may not be guaranteed that a response to a resolver query request will be made.

In one embodiment, a reliable transport may not be required by the peer resolver protocol, and the peer resolver protocol may not assume the presence of reliable message delivery. In one embodiment, multiple resolver query messages may be sent. None, one, multiple or redundant responses may be received.

In one embodiment, the task of propagating a query to the next set of peers may be handled by the rendezvous protocol. In one embodiment, a rendezvous service may be responsible for determining the set of peers that should receive a message being propagated, but may not automatically re-propagate an incoming propagated message. In this embodiment, the service (query handler) handling the message may determine if further propagation is to be performed. In one embodiment, the peer resolver protocol may use the following policy: if the query handler does not instruct the peer resolver protocol to discard the query, and if the local peer is a rendezvous, then the query is re-propagated (within the limits of loop and TTL rules enforced by the rendezvous service). In addition, if instructed by the query handler, an identical query may be issued with the local peer as the originator.

Peer Information Protocol

Once a peer is located, its capabilities and status may be of interest. In one embodiment, the peer-to-peer platform may include a peer information protocol that may allow a peer to learn about other peers' capabilities and status. For example, a peer can send a ping message to see if another peer is alive. A peer may also query another peer's properties where each property has a name and a value string. In one embodiment, a peer may not be required to respond to a peer information protocol request.

Figure 17:
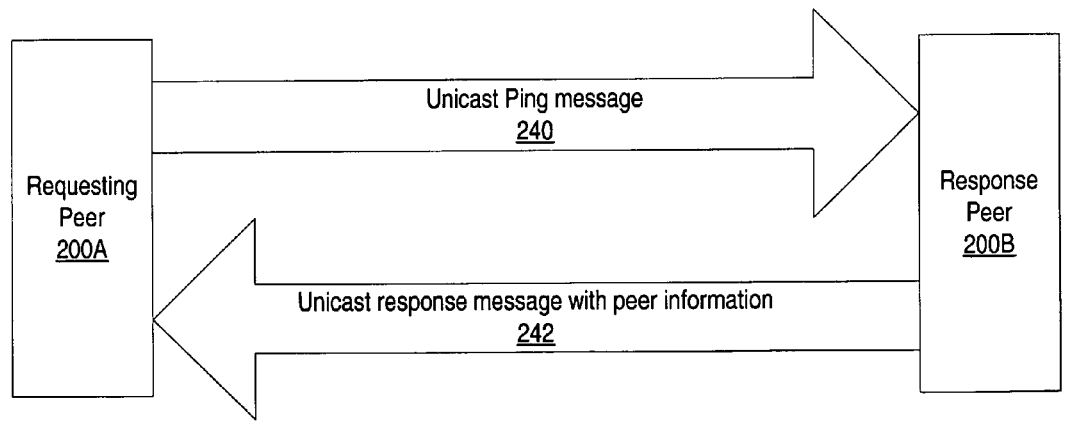
FIG. 17 illustrates one embodiment of using peer information protocol messages between a requesting peer and a responding peer.

FIG. 17 illustrates one embodiment of using peer information protocol messages between a requesting peer 200A and a responding peer 200B. In one embodiment, to see if peer 200B is alive (i.e. responding to messages), peer 200A may be sent a ping message 240. The ping message 240 may include a destination address that is peer 200B's "main" endpoint returned during discovery, for example. The message may also include a group membership credential of the requesting peer 200A that may identify the probing peer 200A to the message recipient 200B. The message may also contain an identifier unique to the sender. In one embodiment, this identifier may be returned in the response message 242. Response message 242 may include information about peer 200B, including information on the status of the peer 200B. If peer 200B responds with a message 242, this may indicate to peer 200A that peer 200B is "alive" and thus currently responding to messages.

In one embodiment, messages may be used to get a list of named control "properties" exported by a peer. A property is a "knob" used to get information or configuration parameters from the peer. In one embodiment, all properties may be named (e.g., by a string), and may be "read-only." In one embodiment, higher-level services may offer "read-write" capability to the same information, given proper security credentials. In one embodiment, each property may have a name and a value string. Read-write widgets may allow the string value to be changed, while read-only widgets do not. In one embodiment, the peer information protocol only gives read access. The destination address is a peer's main endpoint that may have been returned in a discovery response message.

Once a peer is located, its capabilities and status may be queried. The peer information protocol provides a set of messages to obtain a peer status information. In one embodiment, the peer information protocol is an optional peer-to-peer platform protocol. In one embodiment, peers are not required to respond to peer information protocol requests.

In one embodiment, the peer information protocol may be layered upon the peer resolver protocol. In one embodiment, a <QueryID> message element may be used to match peer information protocol queries containing <request> elements to the peer information protocol response messages containing the matching responses.

In one embodiment, the peer information protocol query message may include a request field that may be used to encode a specific request. In one embodiment, the peer information protocol does not dictate the format of the request field and it is left up to the consumer to do so. Higher-level services may utilize the request field to offer expanded capabilities.

In one embodiment, a reliable transport is not required by the peer information protocol. In one embodiment, multiple peer information messages may be sent. None, one or multiple responses may be received.

In one embodiment, a peer information protocol query message may be sent to a peer to query the current state of the peer, and to optionally obtain other relevant information about the peer. In one embodiment, a peer information protocol query message without a defined request field may expect in return a default set of information about a peer (i.e. uptime, message count, etc.). In one embodiment, a peer information protocol query message may include a source peer identifier message element that indicates the peer identifier of the requesting peer. In one embodiment, a peer information protocol query message may include a target peer identifier message element that indicates the peer identifier of the peer being queried. In one embodiment, a peer information protocol query message may include a request element. In one embodiment, the request element may be optional.

In one embodiment, a peer information protocol response message may include specific information about the current state of a peer, such as uptime, inbound and outbound message count, time last message received, and time last message sent. In one embodiment, a peer information protocol response message may include a source peer identifier message element that indicates the peer identifier of the requesting peer. In one embodiment, a peer information protocol response message may include a target peer identifier message element that indicates the peer identifier of the peer being queried. In one embodiment, a peer information protocol response message may include an uptime element that may indicate the relative time (e.g. in milliseconds) since the responding peer information service began execution. In one embodiment, peers may include this element in all peer information protocol responses. In one embodiment, peers may choose to not include this element if the information is unavailable or would represent a security breach. In one embodiment, a peer information protocol response message may include a timestamp element that indicates the absolute time at which this response was generated. In one embodiment, peers may include this element in all peer information protocol responses. In one embodiment, peers may choose to not include this element if the information is unavailable or would represent a security breach. In one embodiment, a peer information protocol response message may include a response element that may include a response to a previous request from a peer information protocol query message. In one embodiment, to match queries to responses, a query identifier element of the peer resolver Protocol must match. This field may include any desired content. In one embodiment, a peer information protocol response message may include a traffic element that may include information about the network traffic performed by the target peer. In one embodiment, this element is optional.

In one embodiment, a ping message may be sent to a peer to check if the peer is alive and/or to get information about the peer. The ping option may define the response type returned. In one embodiment, a full response (peer advertisement) or a simple acknowledge response (alive and uptime) may be returned. The following is an example of one embodiment of a ping message in XML, and is not intended to be limiting:

<Ping>
    <Credential> Credential </Credential>
    <SourcePid> Source Peer identifier </SourcePid>
    <TargetPid> Target Peer identifier </TargetPid>
    <Option> type of ping requested</Option>
    </Ping>

In one embodiment, a peer information response message may be used to send a response message in response to a ping message. The following is an example of one embodiment of a peer information response message in XML, and is not intended to be limiting:

<PeerInfo>
    <Credential> Credential </Credential>
    <SourcePid> Source Peer identifier </SourcePid>
    <TargetPid> Target Peer identifier </TargetPid>
    <Uptime> uptime</Uptime>
    <TimeStamp> timestamp </TimeStamp>
    <PeerAdv> Peer Advertisement </PeerAdv>
    </PeerInfo>

Peer Membership Protocol

In one embodiment, the peer-to-peer platform may include a peer membership protocol that may allow a peer to join or leave peer groups, and to manage membership configurations, rights and responsibilities. This protocol may allow a peer to obtain group membership requirements (such as an understanding of the necessary credential for a successful application to join the group), to apply for membership and receive a membership credential along with a full group advertisement, to update an existing membership or application credential, and to cancel a membership or an application credential. In one embodiment, authenticators and/or security credentials may be used to provide the desired level of protection.

In one embodiment, the process of joining a peer group may include obtaining a credential that is used to become a group member. In one embodiment, the process of joining a peer group may include obtaining a "form" listing the set of requirements asked of all group members. In one embodiment, this form may be a structured document (e.g. a peer group advertisement) that lists the peer group membership service.

In one embodiment, the peer membership protocol may define messages including, but not limited to, an apply message, a join message, an acknowledgement (ACK) message, a renew message, and a cancel message. A peer membership protocol apply message may be sent by a potential new group member to the group membership application authenticator. In one embodiment, the authenticator's endpoint may be listed in the peer group advertisement of every member. In one embodiment, a successful response from the group's authenticator may include an application credential and a group advertisement that may list, at a minimum, the group's membership service. In one embodiment, the apply message may include, but is not limited to, the current credential of the candidate group member and the peer endpoint for the peer group membership authenticator to respond to with an acknowledgement (ACK) message.

The following is an example of one embodiment of a peer membership protocol apply message in XML, and is not intended to be limiting:

<MembershipApply>
    <Credential> Credential of requestor </Credential>
    <SourcePid> Source pipe identifier </SourcePid>
    <Authenticator> Authenticator pipe advertisement </Authenticator>
    </MembershipApply>

A peer membership protocol join message may be sent by a peer to the peer group membership authenticator to join a group. In one embodiment, the peer may pass an application credential (from an apply response ACK message) for authentication purposes. In one embodiment, a successful response from the group's authenticator may include a full membership credential and a full group advertisement that lists, at a minimum, the group's membership configurations requested of full members in good standing. The message may include a credential (application credential of the applying peer: see ACK message). This credential may be used as the application form when joining. The message may also include the peer endpoint for the authenticator to respond to with an ACK message.

The following is an example of one embodiment of a peer membership protocol join message in XML, and is not intended to be limiting:

<MembershipJoin>
    <Credential> Credential of requestor </Credential>
    <SourcePid> Source pipe identifier </SourcePid>
    <Membership> membership pipe advertisement </Membership>
    <Identity> identity</Identity>
    </MembershipJoin>

A peer membership protocol ACK message is an acknowledge message that may be used for both join and apply operations. A peer membership protocol ACK message may be sent back by the membership authenticator to indicate whether or nor the peer was granted application rights to the peer group if the peer is applying, or full membership to the peer group if peer is attempting to join. In one embodiment, an ACK message may also be sent in response to peer membership protocol renew messages and cancel messages. The message may include a credential (an application or membership credential allocated to the peer by the peer group authenticator). The message may also include a more complete peer group advertisement that may provide access to further configurations. In one embodiment, not all configuration protocols are visible until the peer has been granted membership or application rights. Some configurations may need to be protected. Also, depending on the peer credential, the peer may not have access to all the configurations.

The following is an example of one embodiment of a peer membership protocol ack message in XML, and is not intended to be limiting:

<MembershipAck>
<Credential> Credential </Credential>
<SourcePid> Source pipe identifier </SourcePid>
<Membership> membership pipe advertisement </Membership>
<Peer groupAdv> peer group advertisement </Peer groupAdv>
<Peer groupCredential> credential granted </Peer groupCredential>
</MembershipAck>

A peer membership protocol renew message may be sent by a peer to renew its credential (membership or application) access to the peer group. An ACK (acknowledgement) message may be returned with a new credential and lease if the new is accepted. The renew message may include, but is not limited to, a credential (a membership or application credential of the peer) and the peer endpoint to which an ACK response message may be sent.

The following is an example of one embodiment of a peer membership protocol renew message in XML, and is not intended to be limiting:

<MembershipRenew>
<Credential> Credential </Credential>
<SourcePid> Source pipe identifier </SourcePid>
<Membership> membership pipe advertisement </Membership>
</MembershipRenew>

A peer membership protocol cancel message may be sent by a peer to cancel the peer's membership or application rights in a peer group. The message may include, but is not limited to, a credential (a membership or application credential of the peer) and the peer endpoint to send an ACK message. In one embodiment, an ACK to a cancel may include a response status indicating the cancel was accepted.

The following is an example of one embodiment of a peer membership protocol cancel message in XML, and is not intended to be limiting:

<MembershipCancel>
<Credential> Credential </Credential>
<SourcePid> Source pipe identifier </SourcePid>
<Membership> membership pipe advertisement </Membership>
</MembershipCancel>

Pipe Binding Protocol

In one embodiment, the peer-to-peer platform may include a pipe binding protocol that may allow a peer to find the physical location of a pipe endpoint and to bind a pipe advertisement to the pipe endpoint, thus indicating where messages actually go over the pipe. A pipe is conceptually a virtual channel between two pipe endpoints (input and output pipes) and may serve as a virtual link between two or more peer software components (e.g. services or applications).

A pipe may be viewed as an abstract, named message queue that supports a number of abstract operations such as create, open, close, delete, send, and receive. The pipe virtual link (pathway) may be layered upon any number of physical network transport links such as TCP/IP, HTTP, and TLS. In one embodiment, the pipe binding protocol is layered upon the endpoint protocol that allows it to use a variety of transport protocols, such as HTTP Transport, TCP/IP Transport, or a secure TLS Transport. Each end of the pipe may work to maintain the virtual link and to reestablish it, if necessary, by binding endpoints or finding the pipe's currently bound endpoints.

Actual pipe implementations may differ, but in one embodiment, peer-to-peer platform-compliant implementations may use the pipe binding protocol to bind pipes to pipe endpoints. In one embodiment, during the abstract create operation, a local peer binds a pipe endpoint to a pipe transport. In another embodiment, bind may occur during the open operation. Unbind occurs during the close operation. In one embodiment, each peer that "opens" a group pipe may make an endpoint available (binds) to the pipe's transport. In one embodiment, messages may be sent only to the one or more endpoints bound to the pipe. Peers that have not opened the pipe may not receive or send any messages on that pipe. In one embodiment, when some peer software wants to accept incoming pipe messages, the receive operation may remove a single message in the order it was received, not in the order it was sent. In one embodiment, a peek operation may be used as a mechanism to see if any message(s) has arrived in the pipe's queue.

In one embodiment, the pipe binding protocol may define messages including, but not limited to, a query message and a response message. In one embodiment, a pipe binding protocol query message may be sent by a peer pipe endpoint to find a pipe endpoint bound to the same pipe advertisement. The following is an example of one embodiment of a pipe binding protocol query message in XML, and is not intended to be limiting:

<PipeBindingQuery>
<Credential> query credential </Credential>
<Peer> optional tag. If present, it may include the peer identifier of the only peer that should answer the request.
</Peer>
<Cached> true if the reply can come from a cache </Cached>
<PipeId> pipe identifier to be resolved </PipeId>
</PipeBindingQuery>

In one embodiment, the requestor may ask that the information not be obtained from a cache. This is to obtain the most up-to-date information from a peer to address stale connection. The Peer field specifies a peer identifier. This peer is the one that should respond to the query. In one embodiment, there may be no guarantee that a response to a pipe binding request will be made. In one embodiment, a peer is not required to respond to a binding request. In one embodiment, a reliable transport is not required. In one embodiment, multiple binding query messages may be sent. None, one or multiple responses may be received.

In one embodiment, a pipe binding protocol response message may be sent to the requesting peer by each peer bound to the pipe in response to a query message. The following is an example of one embodiment of a pipe binding protocol response message in XML, and is not intended to be limiting:

<PipeBindingAnswer>
<Credential> credential </Credential>
<PipeId> pipe identifier resolved </PipeId>

```
<Peer> peer URI where a corresponding InputPipe has
    been created </Peer>
<Found> true: the InputPipe does exist on the specified
    peer (ACK) false: the InputPipe does not exist on the
    specified peer (NACK)
</Found>
</PipeBindingAnswer>
```

Endpoint Routing Protocol

In one embodiment, the peer-to-peer platform may include an endpoint routing protocol. The endpoint routing protocol may be used by peers to send messages to router peers requesting available routes for sending message(s) to destination peers. In one embodiment, this may be accomplished through message exchanges between peer routers. Peer routing may be necessary to enable two peers to communicate depending on their location in the network. For instance, the two peers may be on different transports; the peers may be separated by a firewall; or the peers may be using incompatible private IP address spaces. When necessary, one or more peer routers may be used to deliver a message from the originating peer endpoint to the destination peer endpoint.

A peer-to-peer platform network is typically an ad hoc, multi-hops, and adaptive network by nature. Connections in the network may be transient, and message routing may be nondeterministic. Routes may be unidirectional and change rapidly. Peers may appear and leave frequently. Two communicating peers may not be directly connected to each other. Two communicating peers may need to use router peers to route messages depending on the network topology. For example, the two peers may be on different network transports, or the peers may be separated by a firewall or a NAT (Network Address Translation) router. A peer behind a firewall may send a message directly to a peer outside a firewall. But a peer outside the firewall cannot establish a connection directly with a peer behind the firewall.

The endpoint routing protocol may define a set of request/query messages that is processed by a routing service to help a peer route messages to its destination. When a peer is asked to send a message to a given peer endpoint address, it may look in its local cache to determine if it has a cached route to this peer. If the peer does not find a route, it may send a route resolver query message to available peer routers requesting route information. A peer may have access to as many peer routers as it can find, or optionally a peer may be pre-configured to access certain routers.

Peer routers may provide the low-level infrastructures to route a message between two peers in the network. Any number of peers in a peer group may elect themselves to become peer routers for other peers. Peers routers offer the ability to cache route information, as well as bridging different physical (different transport) or logical (firewall and NAT) networks. A peer may dynamically find a router peer via a qualified discovery search. A peer may find out if a peer it has discovered is a peer router via the peer advertisement, for example by a properties tag and/or by a parameters element.

When a peer router receives a route query, if it knows the destination (a route to the destination), it may answer the query by returning the route information as an enumeration of hops. The message may be sent to the first router and that router may use the route information to route the message to the destination peer. The route may be ordered from the next hop to the final destination peer. At any point, the routing information may become obsolete, requiring the current router to find a new route in order to complete the message delivery.

The peer endpoint may add extra routing information to the messages sent by a peer. When a message goes through a peer, the endpoint of that peer may leave its trace on the message. The trace may be used for loop detection and to discard recurrent messages. The trace may also be used to record new route information by peer routers.

In one embodiment, the endpoint routing protocol may provide last resort routing for a peer. More intelligent routing may be implemented by more sophisticated routing services in place of the core routing service. High-level routing services may manage and optimize routes more efficiently than the core service. In one embodiment, the hooks necessary for user defined routing services to manipulate and update the route table information (route advertisements) used by the peer router may be provided by the endpoint routing protocol. Thus, in one embodiment, the complex route analysis and discovery may be performed above the core by high-level routing services, and those routing services may provide intelligent hints to the peer router to route messages.

Router peers may cache route information. Router peers may respond to queries with available route information. Route information may include a list of gateways along the route. In one embodiment, any peer may become a router peer by implementing the endpoint routing protocol. The following is an example of one embodiment of route information in XML, and is not intended to be limiting:

```
<endpoint router>
    <Credential> credential </Credential>
    <Src> peer identifier of the source </Src>
    <Dest> peer identifier of the destination </Dest>
    <TTL> time to live </TTL>
    <Gateway> ordered sequence of gateway </Gateway>
    . . .
    <Gateway> ordered sequence of gateway </Gateway>
</endpoint router>
```

The time-to-live parameter specifies how long this route is valid. In one embodiment, the time-to-live indicator may be measured in hops. The creator of the route can decide how long this route will be valid. The gateways may be defined as an ordered sequence of peer identifiers that define the route from the source peer to the destination peer. The sequence may not be complete, but in one embodiment, at least the first gateway is present. The first gateway is sufficient to initially route the messages. In one embodiment, the remaining gateway sequence may be optional.

The endpoint routing protocol may provide messages including, but not limited to, a route request message and a route answer message from the router peer. In one embodiment, a peer may send a route request message to a router peer to request route information. Route information may be cached or not cached. In some cases, the route query request message may indicate to bypass the cache content and thus to search dynamically for a route. In one embodiment, it may not be guaranteed that a route response will be received after a query is sent. The following is an example of one embodiment of a route query request message in XML, and is not intended to be limiting:

```
<endpoint router Query>
    <Credential> credential </Credential>
    <Dest> peer identifier of the destination </Dest>
    <Cached> true: if the reply can be a cached reply false: if
        the reply must not come from a cache
    </Cached>
</endpoint router Query>
```

In one embodiment, a router peer may send a route answer message to a peer in response to a route information request.

The following is an example of one embodiment of a route answer message in XML, and is not intended to be limiting:

```
<endpoint router Answer>
<Credential> credential </Credential>
<Dest> peer identifier of the destination </Dest>
<RoutingPeer> Peer identifier of the router that knows a
    route to DestPeer
</RoutingPeer>
<RoutingPeerAdv> Advertisement of the routing peer
    </RoutingPeerAdv>
<Gateway> ordered sequence of gateways </Gateway>
...
<Gateway> ordered sequence of gateways </Gateway>
</endpoint router Answer>
```

In one embodiment, the gateway(s) may be represented by peer-to-peer platform identifiers.

Endpoint Service

One embodiment may include an endpoint service that may be responsible for performing end-to-end messaging between two peers, using one of the underlying peer-to-peer platform transport protocols, such as TCP or HTTP bindings. The endpoint service may be used by other services or applications that need to have an understanding of the network topology, such as a resolver service or a propagation service. In one embodiment, the endpoint service is not responsible for routing messages for peers that are not directly connected to each other. This task is performed by the endpoint router transport protocol that may provide the illusion that the source and destination peers are directly connected.

In one embodiment, when the endpoint service transmits a message it may add the source peer identifier as an element to the message. In one embodiment, the element is a representation of the peer identifier at the point of emission of the message. In one embodiment, this information is optional and may be used by the emitter endpoint service to detect and eliminate propagated messages that loop back to the emitter. If this element is not present, the message may be assumed to not be looping back.

The endpoint service may expect incoming and outgoing messages to have a source address and a destination address. The encapsulation of that information is specified by the message wire format being used. In one embodiment, the source and destination addresses of a message may be represented as strings in URI format.

In one embodiment, the endpoint service may delegate the sending of outgoing messages to the endpoint protocol designated by a "protocol" part of the message's destination address. In one embodiment, the endpoint service may deliver incoming messages to the listener registered under the name that matches a concatenation of "unique name of recipient" and "unique name in recipient context" portions of the message's destination address.

Endpoint Router Transport Protocol

One embodiment may include an endpoint router transport protocol that is a logical peer-to-peer platform transport protocol at a level "below" the endpoint service and with one or more other transport protocols such as TCP and HTTP Transport Protocols. The endpoint router may be responsible for exchanging messages between peers that do not have a direct connection between each other. The endpoint router may provide a virtual direct connection to the peer's endpoint service.

In one embodiment, the endpoint router transport protocol defines a set of query and response messages that may be used to communicate with instances of the endpoint router on other peers. In one embodiment, the messages may be sent and received by the endpoint router using a resolver service. These messages may include one or more of, but are not limited to:

Route query: when the endpoint router is requested to send a message to a peer for which it does not have yet a route for, the endpoint router may send a route query request to other peers. One or more peers that have a route for the given peer may answer with route responses.

Route response: a peer that desires to inform another peer about a give route may send a route response to the other peer. A route response may be a reply to a route query.

Ping query: a ping query may be sent to a peer in order to validate a route. A peer receiving a ping query is requested to answer with a ping response.

Ping response: a ping response may be sent to an originator of a ping query.

In one embodiment, the endpoint router may define an informational message that requires no reply. This message may be sent by any peer that detects that a route used by another peer is not valid. For example, a router peer that is requested to route a message to a peer for which it does not have a route may send an informational message. In one embodiment, the informational message is optional: routers are not required to send them. While an informational message is typically sent to the source peer of a message, peers may send informational messages to other peers of their choice.

In one embodiment, the endpoint router transport protocol may append a message element to each message it transports. In one embodiment, the element may be a markup language (e.g. XML) document. In one embodiment, the element may include one or more of, but is not limited to, the following:

Source: the original endpoint address of the source of the message. In one embodiment, this may be required.

Destination: the original endpoint address of the destination of the message. In one embodiment, this may be required.

Last Hop: The endpoint router endpoint address of the last router that processed the incoming message to route. In one embodiment, this may be required.

Number of hops: the number of the peers the incoming message to route has already been through. In one embodiment, this may be required.

Forward Route: a list of one or more endpoint router endpoint addresses of the peers the message is supposed to go through in order to reach its destination. In one embodiment, this list is optional since each router may use a query route request in order to find a route. This list may be used to preferably decrease the network traffic by limiting the use of queries, which may be expensive.

Reverse Route: a list of one or more endpoint router endpoint addresses of the peers the message is supposed to go through in order to reach its source. In one embodiment, this list is optional since each router may use the query route request in order to find a route. This list may be used to preferably decrease the network traffic by limiting the use of queries, which may be expensive.

In one embodiment, queries and responses defined by the endpoint router transport protocol may be sent using a resolver service. In one embodiment, the messages may be represented by a markup language (e.g. XML) document (passed to and by the resolver service). In one embodiment, endpoint router transport protocol messages may include one or more of, but is not limited to, version information, type information (e.g. route query, route response, ping query, ping response, or informational message), destination peer (e.g. endpoint router endpoint address), routing peer (e.g. endpoint router endpoint address), routing peer advertisement, number of hops, and gateway forward (e.g. endpoint router endpoint address).

In one embodiment, depending on the type of the message, only a subset of the above may be used. For a route query, destination peer may include the peer identifier (in its endpoint router definition) of the peer for which a route is requested. For a route response, destination peer may include the peer identifier (in its endpoint router definition) of the peer for which a route was requested. Routing peer may include the endpoint address of the peer that knows how to route message to the destination peer. Routing peer advertisement may optionally include the peer advertisement of the routing peer, which if included may allow the requesting peer to not have to search for the advertisement later on. Number of hops may indicate the number of hops of the route starting at the routing peer. Gateway forward may include the endpoint address(es) of routing peer(s) within the route. In one embodiment, gateway forward is a list of that may define the entire route to be used starting at the routing peer in order to reach the destination. In one embodiment, endpoint routers are not required to fill up this list; however, filling the list may be desired if the endpoint router desires to use the optimization of embedding the forward route within the message.

For a ping query, destination peer may include the peer identifier (in its endpoint router definition) of the peer for which a ping is requested. For a ping response, destination peer may include the peer identifier (in its endpoint router definition) of the peer for which a ping was requested. For an informational message, destination peer may include the peer identifier (in its endpoint router definition) of the peer for which the route has failed. If a message for which a route has failed includes a list in gateway forward, this list may be included in the informational message.

In one embodiment, the endpoint router transport protocol may append an endpoint router message element to messages it transports. In one embodiment, the element may be a markup language (e.g. XML) document. In one embodiment, the element may include one or more of, but is not limited to, a source, a destination, a last peer, a number of hops, a gateway forward, and a gateway reverse. The source may include the endpoint address of the original source of the message. The destination may include the address of the original destination of the message. The last peer may indicate the address of an immediately previous peer that has received the message. The number of hops may indicate the number of hops of the reverse route (0 if there is no reverse route.) The gateway forward may include the endpoint address(es) of one or more routing peers within the forward route. In one embodiment, gateway forward may be a list that defines the route to be used in order to reach the destination peer of the message. In one embodiment, endpoint routers may not be required to fill up this list; however, doing so may decrease latency of communication between peers. Gateway reverse may include the endpoint address(es) of one or more routing peers within the reverse route. In one embodiment, gateway forward may be a list that defines the route to be used in order to reach the source peer of the message. In one embodiment, endpoint routers may not be required to fill up this list; however, doing so may decrease latency of communication between peers.

In one embodiment, the endpoint router transport protocol may have its own endpoint address format. The following is an exemplary endpoint address format for the endpoint router transport protocol and is not intended to be limiting:

xxxx://uuid-<PeerID unique value>

Routing

In one embodiment, the peer-to-peer platform may provide a mechanism or mechanisms for searching and accessing peers, peer groups, content, services and other information in a dynamic topology of peers and peer groups, where peers and peer groups can come and go. In one embodiment, peers and peer groups may come and go potentially with limited or no control and notification. Peers may connect to a peer-to-peer network through various wired and wireless protocols, including "not connected" protocols such as may be used by mobile consumer devices such as pagers and PDAs. Peers may also have to cross boundaries, for example boundaries created by firewalls and NAT (Network Address Translation) routers, to connect to other peers.

In one embodiment, an application that supports the peer-to-peer platform may help in routing and discovering. Some of the information needed to accomplish routing and discovering may be only known by the application. For example, the application may support a special type of data as content, and so the application may best "know" how to discover items of this special content. Also, the application may have a better knowledge of the topology (related to the nature of the application and/or peer group) than the core peer-to-peer platform.

In one embodiment, in order to bootstrap the system, and also in order to have a fallback mechanism if an application cannot or does not support one or more of the tasks, the core peer-to-peer protocols may provide a discovery and router mechanism for discovering peers and other core abstractions such as advertisements, pipes, and peer groups. In one embodiment, the discovery and routing mechanism of the peer-to-peer platform may use as few protocols as possible, is simple, and makes use of underlying optimizations when available. Hooks into the core discovery and router mechanism may be provided so that applications and services may participate in the discovery and router mechanisms, for example, by passing information to the core discovery and router mechanism. In one embodiment, an application or service may be allowed to override the core discovery and router mechanism with its own custom mechanism.

In one embodiment, the core discovery and router mechanism may be based on web crawling. Web crawling may be well suited for use in self-organizing networks such as peer-to-peer networks. In one embodiment, peers may be configured to participate or not to participate in the discovery and router mechanism, and may be configured as to the level of involvement in the process In one embodiment, a peer may decide whether to participate in a discovery or routing task depending on the peer's configuration in the peer-to-peer network. In one embodiment, the configuration may be determined using an automated detection of the position of the peer on the network and a network configuration wizard tool.

Web crawling may not create bottlenecks such as may be created by the mechanism of a client knowing a server and always going to the same server to find and retrieve information (e.g. DNS, NFS etc.). Even if a server is replicated, like DNS, it is still a centralized server. If all the known instances of the server are not reachable, a client may lose access to the server, even if another (but unknown) server is, indeed, available. In a point-to-point network, the information a peer is looking for is generally "close by" or may eventually be "close by", so web crawling may not go too far.

Figure 18:
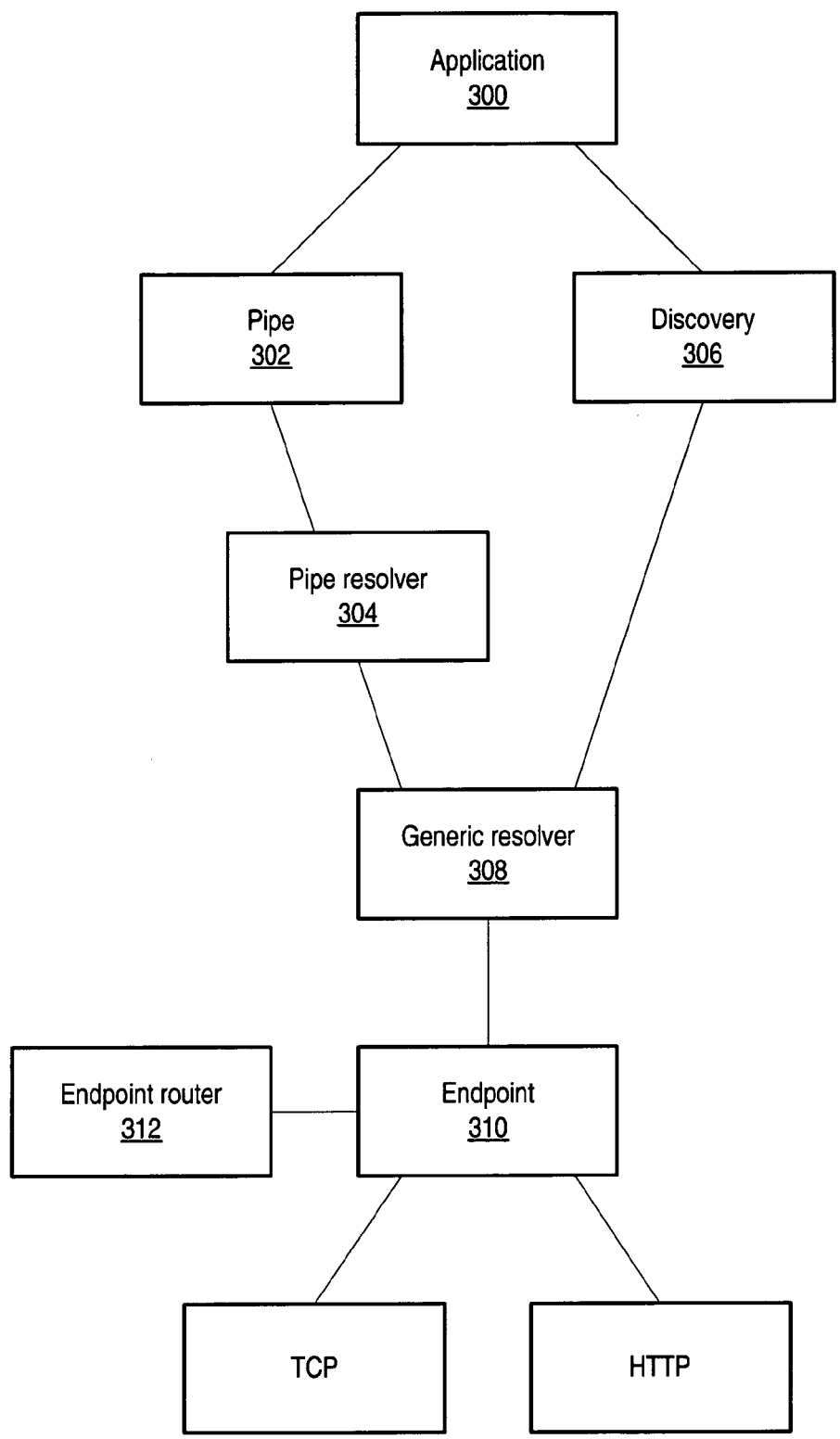
FIG. 18 illustrates several core components and how they interact for discovery and routing according to one embodiment.

FIG. 18 illustrates several core components and how they interact for discovery and routing according to one embodiment. Application 300 may use discovery 308 to find peers, peer groups, advertisements, and other entities on the peer-to-peer network, and may also publish pipe, peer, peer group, service, and other advertisements for access by other peers, applications and services on the peer-to-peer network. In one embodiment, the endpoint 310 may be responsible for exchanging messages between peers that are directly "connected" to each other (i.e. the peers can reach each other without any routing and/or discovering). When available, multicast may be used to discover peers that the endpoint can reach (multicast is a mechanism which has been introduced in IP in order to optimize this kind of process). In addition to that, or when multicast is not available, A rendezvous and invitation mechanism may also be provided. The rendezvous and invitation method may be used, for example, if multicast is not available. For example, HTTP does not provide multicast capabilities.

The endpoint router 312 may manage a cache of routes, for example routes to remote peers. In one embodiment, the endpoint router 312 may be configured from caching no routes to caching all routes it is aware of, depending on what the configuration wizard has decided with user control. The endpoint router 312 may also forward (route) messages depending on what is found in the cache, and what has been configured. For instance, the endpoint router 312 may be configured to route search (propagate) requests or to not route the requests.

In one embodiment, the generic resolver 308 is a protocol that implements a sort of RPC (query/response) protocol on top of the endpoint 310. Discovery 306 and pipe resolver 304 may use the generic resolver. In one embodiment, discovery 306 may be responsible for searching, caching and generating core advertisements (e.g. peer, peer group, and pipe advertisements). Discovery 306 may use the generic resolver 308 to send query messages and to receive answers. In one embodiment, discovery 306 may be aware of rendezvous peers and may have an invitation mechanism that may be used to assist the generic resolver 308. In one embodiment, the pipe resolver 304 may be responsible for localizing the receiving end of a pipe 302 given a pipe advertisement. In one embodiment, the pipe resolver 304 does not search for a pipe advertisement. In one embodiment, the pipe resolver 304 may be configured to manage a cache of the locations of the receiving ends (i.e. receiving peers) of the pipe 302.

The pipe protocol may use the endpoint 310 for transferring messages (with the potential help of the endpoint router 312) between the sending end of the pipe 302, and the receiving end of the pipe 302. In one embodiment, a pipe 302 may be viewed as an endpoint 310 that has not been bound to a particular peer. In one embodiment, a pipe 302 may be moved seamlessly from one peer to another. In one embodiment, a pipe 302 may also provides uniqueness that may not be provided by an endpoint 310 since a pipe identifier is unique in time and space, and an endpoint 310, being a network address, may not be.

A discovery and router mechanism based on web crawling may be time-expensive, and higher level protocols (such as applications) may have information that the core is not aware of that may help in the web crawling process. In one embodiment, to enable applications to participate in the process, components of the core mechanism may provide hooks that enable the applications to assist in the process (e.g. by providing information). Some transport protocols such as HTTP may be configured for and/or dynamically learn about web rendezvous peers it can use. An application may be provided access to the list of rendezvous peers. In one embodiment, an application may be allowed to set/unset routes in an endpoint router 312. Each route may be qualified to route or not route propagate messages such as web crawling messages and/or unicast messages. The endpoint router 312 may be viewed as a route cache manager, which is may be controlled by an endpoint 310 and/or other entities that may need to control it. In one embodiment, an endpoint router 312 may be able to discover unknown routes from applications. In one embodiment, discovery 308 may be configured (statically and/or dynamically) to control the nature and the amount of data that it manages. In one embodiment, discovery 308 may be taught where to go search, or where not to go search. In one embodiment, discovery 308 may make an "upcall" to a search/retrieve mechanism. In one embodiment, a pipe resolver 304 may manage a cache of input pipes (receiving ends). In one embodiment, pipe resolver 304 may be accessed by applications to set/unset entries in the cache.

Router Peers

Figure 19:
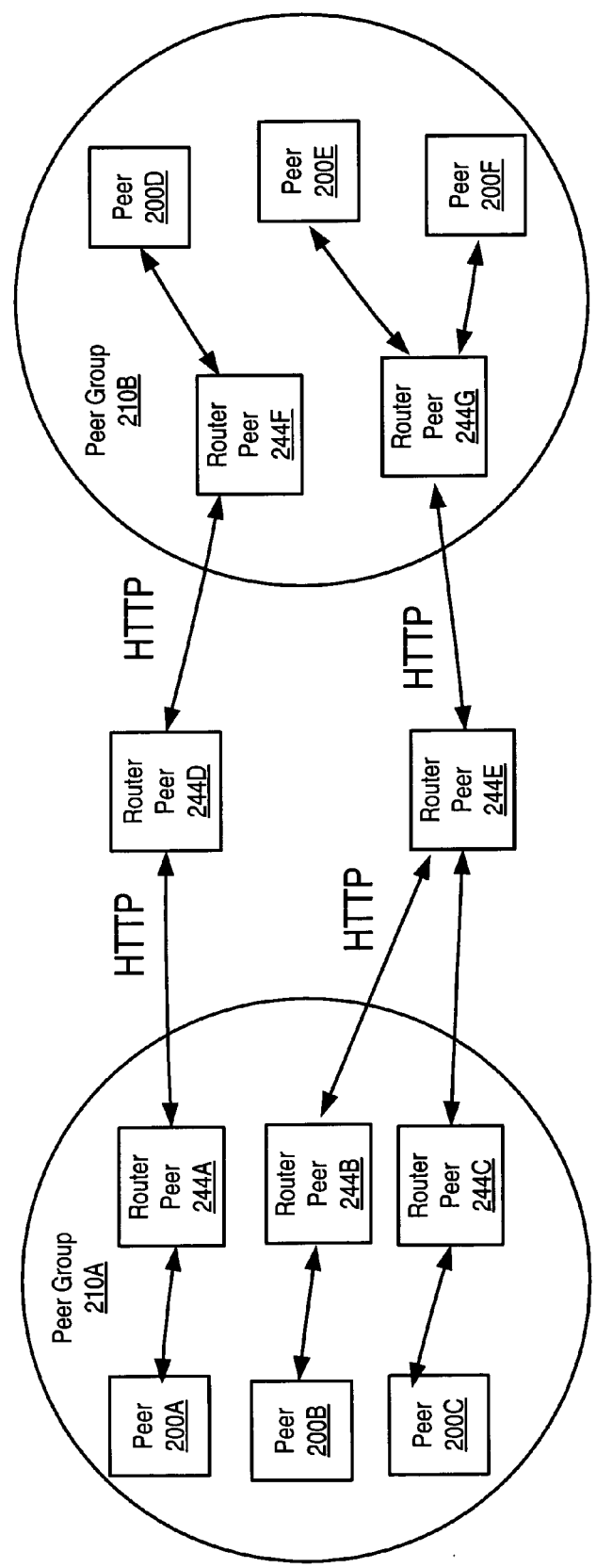
FIG. 19 illustrates one embodiment of message routing in a peer-to-peer network that uses the peer-to-peer platform.

FIG. 19 illustrates one embodiment of message routing in a peer-to-peer network that uses the peer-to-peer platform. Peers 200 in peer groups 210A and 210B may communicate with each other through one or more router peers 244. In one embodiment, message routing may route messages to "unreachable" peers, i.e. may allow messages sent from a peer 200 to reach peers 200 that are otherwise unreachable. Networks may be partitioned by firewalls, NAT (Network Address Translation) routers, etc. Message routing may allow messages to be delivered in partitioned networks. Message routing may also allow peers 200 separated by one or more partitions to participate in the same peer group(s) 210. Message routing may provide optimized message delivery, for example by optimizing routes between peers 200. Message routing may allow for an adaptive peer-to-peer network (e.g. peers may move to remote locations and still receive messages). Message routing may provide load balancing. In one embodiment, any peer may be a router peer 244.

One embodiment may provide for HTTP routing servers. In one embodiment, HTTP routers may provide for message routes that traverse firewalls. In one embodiment, HTTP routers may provide NAT support. In one embodiment, HTTP routers may act as message gateways (TTL). TTL stands for Time To Live (how long the request lives in the system).

The widespread use of NAT (Network Address Translation) and firewalls may affect the operation of many P2P systems. It also may affect the peer-to-peer platform. In particular, a peer outside a firewall or a NAT gateway cannot discover peers inside the firewall or the NAT gateway. In the absence of getting system administrators to let the peer-to-peer platform traffic through (say by opening a special incoming port at the firewall or gateway), possible methods to deal with this problem include, but are not limited to:

In one embodiment, peers inside firewalls may be asked to initiate connections to peers outside the firewall.

In one embodiment, peer nodes may be set up that operate like mailbox offices where traffic to a peer inside the firewall is queued up to be picked up at a designated relay peer outside the firewall. The peer inside the firewall can initially reach outside the firewall, select a relay peer, and widely advertise this fact. Later, it can periodically contact the relay peer to retrieve messages.

One embodiment of the peer-to-peer platform may provide router peers. The router peers may be at a lower level than rendezvous peers. The router peers may provide "pure" message routing. By looking at the destination and source addresses, the router peer may determine where a message needs to be sent. In one embodiment, a router peer may call or access a rendezvous peer to "discover" information about peers, etc. In other words, the router peer may access information from a rendezvous peer to use the information in routing messages.

In one embodiment, router peers may provide the lowest message routing layer in the peer-to-peer platform. Routing may involve complex topologies. For example, the routing peers may provide a method to route across a firewall, particularly from peers outside the firewall to peers inside the firewall. A peer cannot send a message directly to another peer behind a firewall, since by definition there may be no direct route from a peer outside the firewall to a peer inside the firewall. A router peer may route messages to a gateway peer (a mailbox server where messages for peers behind the firewall may be temporarily stored). In one embodiment, the gateway peer may be a router peer acting as a gateway. The peers behind the firewall may periodically poll the mailboxes provided by the gateway peer to determine if someone has tried to contact them (i.e. are there any messages in my mailbox?). Note that a "pipe" provides an abstraction at a higher level than the message routing provided by router peers, and thus, a pipe may be an abstraction across the network topology between peers, for example peers on opposite sides of a firewall, through which the peers may communicate. At the lowest level, one or more router peers may discover and establish the actual communications route between the peers. This level, however, may be transparent to the peers, who only "see" the pipes.

In one embodiment, a router peer may build a route table. The router peer may keep information about routes that it discovers and store them in the route table. This allows the router peer to build a knowledge base (the route table) about the network topology as more messages flow on the system. This information may be used by the router peer to discover and establish optimal routes between entities in the network, and may increase its ability to reach other peers.

A router peer may access another router peer it is aware of to get route information. The route information may be described as a stacked set of destinations (and the routes to the destinations). In one embodiment, the information the router peer stores on a particular route may be incomplete, because the router peer may only know about the route up to a certain point. For example, the router peer may know about a first portion of a route up to another router peer, which knows about the next portion of the route, and so on.

In one embodiment, each peer has a unique peer identifier that is independent of, and is not assigned to, fixed addresses. Peers may move around. Therefore, the peer-to-peer network topology may be dynamic, and may change every time a peer goes away or moves. Thus, in one embodiment, the routing method provided by the router peers may be dynamic to support the dynamic topology. When a peer moves and reconnects, the peer is recognized as the same peer that was previously connected elsewhere in the network. This process may use the unique identifier of the peer to indicate that the peer is the same one that was previously connected elsewhere. In one example, when a peer moves, it may go through a discovery process to discover peers and rendezvous peers in its new local subnet or region. If the peer wishes to join a peer group that it used at its previous location, it may then attempt to discover other peers that have knowledge of the peer group or other peers in the peer group. The message may be passed through several router peers until it may reach a router peer that has knowledge about the peer group (e.g. a route to the peer group) to return to the requesting peer. For example, a user with a laptop may fly from a home office to another city. When the user connects to the network in the other city, a route may be established, through the services provided by router peers, to the home office network peer group. The user may then access email and other services provided by the peer group. From the user's standpoint, this process may seem automatic. For example, the user may not be required to "dial in" or connect remotely to an ISP to access the office as is required in typical networks using static addressing.

In one embodiment, when a peer becomes a router peer, it may access a stored route table as a starting point. In one embodiment, the peer may start from scratch with an empty route table. In one embodiment, the peer, when it becomes a router peer, may initiate a discovery of other router peers and/or rendezvous peers to get as much connectivity information to key peers in the network as possible.

In one embodiment, every peer may have knowledge of at least one router peer. In one embodiment, there may be a "universal router" that many or all peers may be aware of that may be accessed when a peer cannot find anyone. The universal router may be able to put the peer into contact with somebody (e.g. another peer) to help in the bootstrapping process.

Security

The security requirements of a peer-to-peer system may be similar to any other computer system. The three dominant requirements are confidentiality, integrity, and availability. These translate into specific functionality requirements that include authentication, access control, audit, encryption, secure communication, and non-repudiation. Such requirements are usually satisfied with a suitable security model or architecture, which is commonly expressed in terms of subjects, objects, and actions that subjects can perform on objects. For example, UNIX has a simple security model. Users are subjects. Files are objects. Whether a subject can read, write, or execute an object depends on whether the subject has permission as expressed by the permissions mode specified for the object. However, at lower levels within the system, the security model is expressed with integers, in terms of UID, GID, and the permission mode. Here, the low-level system mechanisms do not (need to) understand the concept of a user and do not (need to) be involved in how a user is authenticated and what UID and GID they are assigned.

In one embodiment, to support different levels of resource access in a dynamic and ad hoc peer-to-peer network, the peer-to-peer platform may provide a role-based trust model in which an individual peer may act under the authority granted to it by another trusted peer to perform a particular task. Peer relationships may change quickly and the policies governing access control need to be flexible in allowing or denying access. In one embodiment, the trust model may provide security including, but not limited to, confidentiality, authorization, data integrity and refutability. Confidentiality guarantees that the contents of the message are not disclosed to unauthorized individuals. Authorization guarantees that the sender is authorized to send a message. Data integrity guarantees that a message was not modified accidentally or deliberately in transit. Refutability guarantees a message was transmitted by a properly identified sender and is not a replay of a previously transmitted message.

In one embodiment, peer-to-peer platform messages are structured to allow peer-to-peer platform services and applications to add arbitrary metadata information to the messages such as credentials, digests, certificates, public keys, etc. A credential is a token that when presented in a message body is used to identify a sender and can be used to verify that sender's right to send the message to the specified endpoint. The credential is an opaque token that must be presented each time a message is sent. The sending address placed in the message envelope may be cross-checked with the sender's identity in the credential. Each credential's implementation is specified as a plug-in configuration, which allows multiple authentication configurations to co-exist on the same network. Message digests guarantee the data integrity of messages. Messages may also be encrypted and signed for confidentiality and refutability.

In one embodiment, the peer-to-peer platform protocols may be compatible with widely accepted transport layer security mechanisms for message-based architectures such as Transport Layer Security (TLS), Secure Sockets Layer (SSL), and Internet Protocol Security (IPSec). However, secure transport protocols such as TLS, SSL and IPSec may only provide the integrity and confidentiality of message transfer between two communicating peers. In order to provide secure transfer in multi-hops network, a trust association may be established among all the intermediary peers. Security is compromised if anyone of the communication links is not secured. One embodiment of the peer-to-peer platform may provide a virtualized Transport Layer Security (TLS) implementation that allows secure endpoint-to-endpoint communications regardless of the number of hops required to deliver each message.

The peer-to-peer platform security model may be implemented to provide a P2P web of trust. The web of trust may be used to exchange public keys among its members. Each peer group policy may permit some members to be trusted to the extent that they have the authority to sign public keys for other members as well as to do things like authenticate, add new members, and remove or revoke membership.

Embodiments may implement security classes for the RSA public key exchange, the RC4 byte stream cipher, and the SHA-1 hash algorithm, among others. These classes may enable privacy by the means of a P2P TLS implementation; integrity with signed hashes; non-repudiation using the web of trust; and MACs for data authenticity. Combinations of these classes may form security suites, and the peer-to-peer platform provides the mechanism to add new customized suites as required.

In some embodiments, for peer group authentication a separate Pluggable Authentication Module (PAM) may be provided. Embodiments may provide anonymous or guest login, and login with user name and password. A login session may be in clear or cipher-text as per the peer group security policy.

The security module may be available to the core level, and thus services, applications and advanced services and applications may plug in their own security components and protocols. For example, the web of trust may be defined by a policy that requires authorized peer group members to be well-known certificate authorities, and that peers exchange X509v3 CA signed certificates.

Given that the peer-to-peer platform is defined around the concepts of peers and peer groups, one embodiment may include a security architecture in which peer identifiers and group identifiers are treated as low-level subjects (just like UID and GID), codats are treated as objects (just like files), and actions are those operations on peers, peer groups, and codats.

One or more of several other characteristics of the peer-to-peer platform may further affect the security requirements of the peer-to-peer platform. In one embodiment, the peer-to-peer platform may be focused on mechanisms and not policy. For example, UUIDs are used throughout, but they by themselves have no external meaning. Without additional naming and binding services, UUIDs are just numbers that do not correspond to anything like a user or a principal. Therefore, in one embodiment, the peer-to-peer platform may not define a high-level security model such as information flow, Bell-LaPadula, or Chinese Wall. In one embodiment, when UUIDs are bound to external names or entities to form security principals, authenticity of the binding may be ensured by placing in the data field security attributes, for example, digital signatures that testify to the trustworthiness of the binding. Once this binding is established, authentication of the principal, access control based on the principal as well as the prevailing security policy, and other functions such as resource usage accounting may be performed.

In one embodiment, the peer-to-peer platform may be neutral to cryptographic schemes and security algorithms. As such, the peer-to-peer platform may not mandate any specific security solution. In such cases, a framework may be provided where different security solutions can be plugged in. In one embodiment, hooks and placeholders may be provided so that different security solutions may be implemented. For example, every message may have a designated credential field that may be used to place security-related information. In one embodiment, exactly how to interpret such information is not defined in the peer-to-peer platform, and may be left to services and applications.

In one embodiment, the peer-to-peer platform may sometimes satisfy security requirements at different levels of the system. In one embodiment, to provide flexibility and avoid redundancy, the peer-to-peer platform may not force a particular implementation on developers. Instead, enhanced platforms based on the peer-to-peer platform may provide the appropriate security solutions to their targeted deployment environment. To illustrate the last point, two security concerns (communications security and anonymity) are examined.

Peers communicate through pipes. As an example, suppose both confidentiality and integrity in the communications channel are desired. In one embodiment, Virtual Private Networks (VPNs) may be used to move all network traffic. In one embodiment, a secure version of the pipe may be created, similar to a protected tunnel, such that any message transmitted over this pipe is automatically secured. In one embodiment, regular communications mechanisms may be used, and specific data payloads may be protected with encryption techniques and digital signatures. Embodiments of the peer-to-peer platform may accommodate one or more of these and other possible solutions.

Anonymity does not mean the absence of identity. Indeed, sometimes a certain degree of identification is unavoidable. For example, a cell phone number or a SIM card identification number cannot be kept anonymous, because it is needed by the phone company to authorize and set up calls. As another example, the IP number of a computer cannot be hidden from its nearest gateway or router if the computer wants to send and receive network traffic. In general, anonymity can be built on top of identity, but not vice versa. There may be multiple ways to ensure anonymity. In the examples above, it is difficult to link a prepaid SIM card sold over the retail counter for cash to the actual cell phone user. Likewise, a cooperative gateway or router may help hide the computer's true IP address from the outside world by using message relays or NAT (Network Address Translation).

In one embodiment, a peer-to-peer platform-based naming service may bind a peer to a human user. The user's anonymity may be ensured through the naming service, or the authentication service, or a proxy service, or any combination of these. In one embodiment, the peer-to-peer platform may be independent of the solution chosen by a particular application.

At many places, the peer-to-peer platform may be independent of specific security approaches. In one embodiment, the peer-to-peer platform may provide a comprehensive set of security primitives to support the security solutions used by various peer-to-peer platform services and applications. Embodiments of the peer-to-peer platform may provide one or more security primitives including, but not limited to:

- A simple crypto library supporting hash functions (e.g., MD5), symmetric encryption algorithms (e.g., RC4), and asymmetric crypto algorithms (e.g., Diffie-Hellman and RSA).
- An authentication framework that is modeled after PAM (Pluggable Authentication Module, first defined for the UNIX platform and later adopted by the Java security architecture).
- A simple password-based login scheme that, like other authentication modules, can be plugged into the PAM framework.
- A simple access control mechanism based on peer groups, where a member of a group is automatically granted access to all data offered by another member for sharing, whereas non-members cannot access such data.
- A transport security mechanism that is modeled after SSL/TLS, with the exception that it is impossible to perform a handshake, a crypto strength negotiation, or a two-way authentication on a single pipe, as a pipe is unidirectional.
- The demonstration services called InstantP2P and CMS (content management service) also make use of additional security features provided by the underlying Java platform.

In one embodiment, peers, configurations, peer groups, and pipes form the backbone of the peer-to-peer platform. Security in some embodiments of the peer-to-peer platform may use credentials and authenticators (code (e.g. computer-executable instructions) that may be used to receive messages that either request a new credential or request that an existing credential be validated). A credential is a token that when presented in a message body is used to identify a sender and can be used to verify that sender's right to send the message to the specified endpoint and other associated capabilities of the sender. The credential is an opaque token that must be presented each time a message is sent. The sending address placed in the message envelope may be crosschecked with the sender's identity in the credential. In one embodiment, each credential's implementation may be specified as a plug-in configuration, which allows multiple authentication configurations to co-exist on the same network.

In one embodiment, messages may include, at a minimum, a peer group credential that identifies the sender of the message as a full member peer in the peer group in good standing. Membership credentials may be used that define a member's rights, privileges, and role within the peer group. Content access and sharing credentials may also be used that define a member's rights to the content stored within the group.

In one embodiment, the peer-to-peer platform may provide different levels of security. In one embodiment, APIs may be provided to access well known security mechanisms such as RCA. In one embodiment, the peer-to-peer platform may provide a distributed security mechanism in a peer-to-peer environment. In one embodiment, this distributed security may not depend on certificates administered by a central authority. The distributed security mechanism may allow a peer group "web of trust" to be generated. In the distributed security mechanism, peers may serve as certificate authorities (security peers). Each peer group may include one or more peers that may serve as a certificate authority in the group. In one embodiment, the creator of a peer group may become the default security authority in the group. In one embodiment, if there is more than one creator, the creator peers may choose one of the peers to be the security authority in the group. In one embodiment, the peer or peers that create a peer group may define the security methods that are to be used within the group (anywhere from no security to high levels of security). In one embodiment, more than one peer in a peer group may serve as a security peer. Since peers are not guaranteed to be up at all times, having multiple security peers in a peer group may help insure that at least one security peer is available at all times. In one embodiment, the peer group's certificate peer may verify keys to provide a weak level of trust. In one embodiment, peer-to-peer platform advertisements may include information to describe the security mechanism(s) to be used in a peer group. For example, the advertisement may include information to do public key exchange, information to indicate what algorithms are to be used, etc. The advertisement may also include information that may be used to enforce secure information exchange on pipes (e.g. encryption information).

In one embodiment, peer group security may establish a "social contract". The role of security is distributed across peer groups, and across members of peer groups, that all agree to participate by the rules. A peer group may establish the set of rules by which security in the group is enforced. A peer may join the peer group with a low level of security clearance (low trust). If the peer stays in the group and behaves (follows the rules), the peer may build up its level of trust within the group, and may eventually be moved up in its security level. Within peer groups operating under a social contract, certificates and/or public keys may be exchanged without the participation of a strict certificate authority; i.e. the members may exchange certificates based upon their trust in each other. In one embodiment, a peer group may use an outside challenge (e.g. a secret group password) that may be encrypted/decrypted with public/private keys, as a method to protect and verify messages within the group. In one embodiment, peer groups may be configured to use other types of security, including a high level of security, for example using a strict certificate authority, and even no security. In one embodiment, peer-to-peer platform messages exchanged within a group may have a "placeholder" for security credentials. This placeholder may be used for different types of credentials, depending upon the security implementation of the particular group. In one embodiment, all peer-to-peer messages within the group may be required to have the embedded credential. One embodiment may support private secure pipes.

Peer-to-Peer Platform Firewalls and Security

Figure 20:
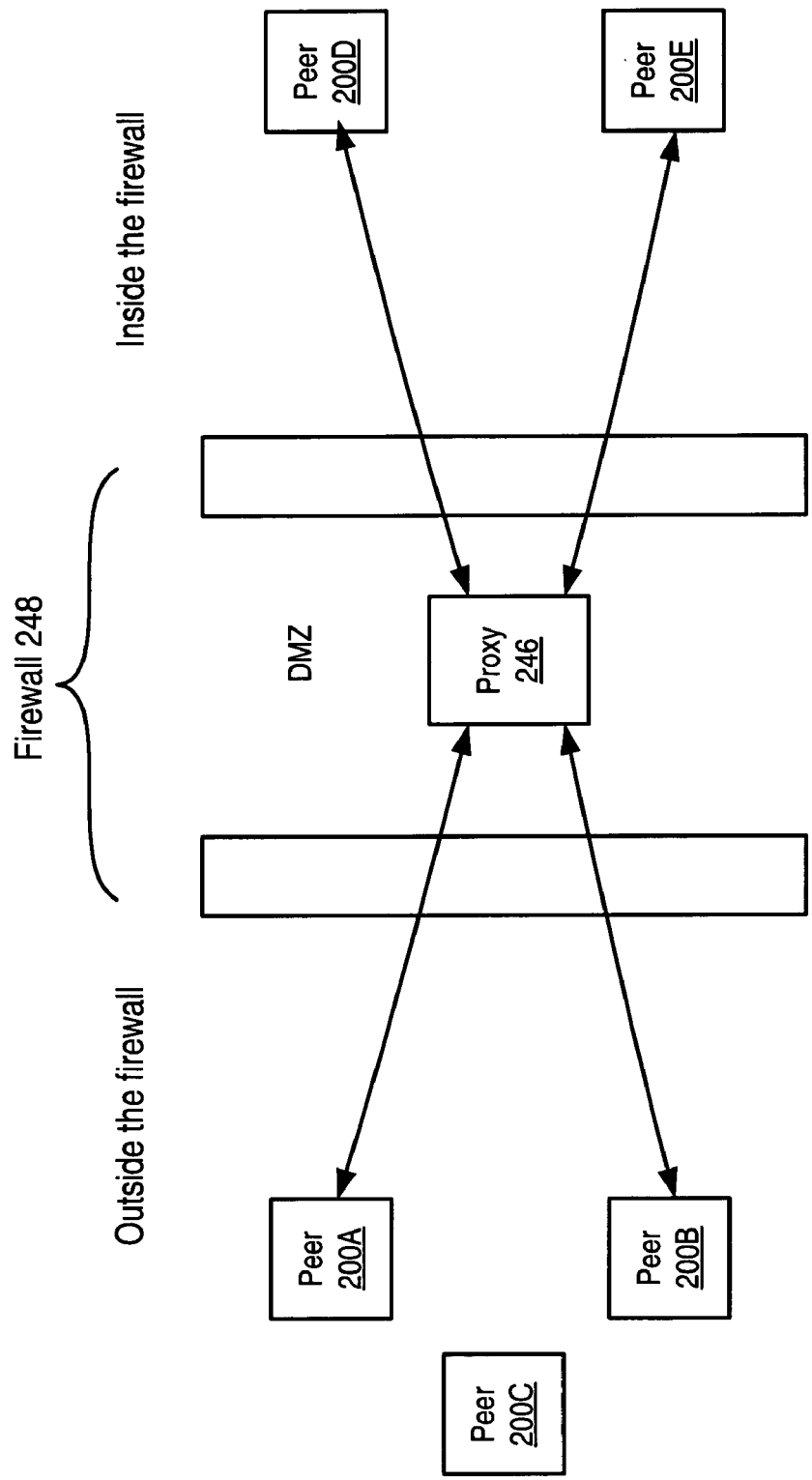
FIG. 20 illustrates traversing a firewall in a virtual private network when access is initiated from outside only according to one embodiment.

The peer-to-peer platform may provide one or more methods for traversing firewalls. FIG. 20 illustrates traversing a firewall 248 in a virtual private network when access is initiated from outside only according to one embodiment. Peers 200 on either side of the firewall 248 may each belong to one or more peer groups. In one embodiment, entry may be restricted to peers 200 with access privileges. In this example, peers 200A and 200B have access privileges, but peer 200C does not. Thus, peers 200A and 200B may access peers 200D and 200E through firewall 248. In one embodiment, HTTP "tunnels" may be used, with proxies 246 in the "DMZ" of the firewall 248.

Figure 21:
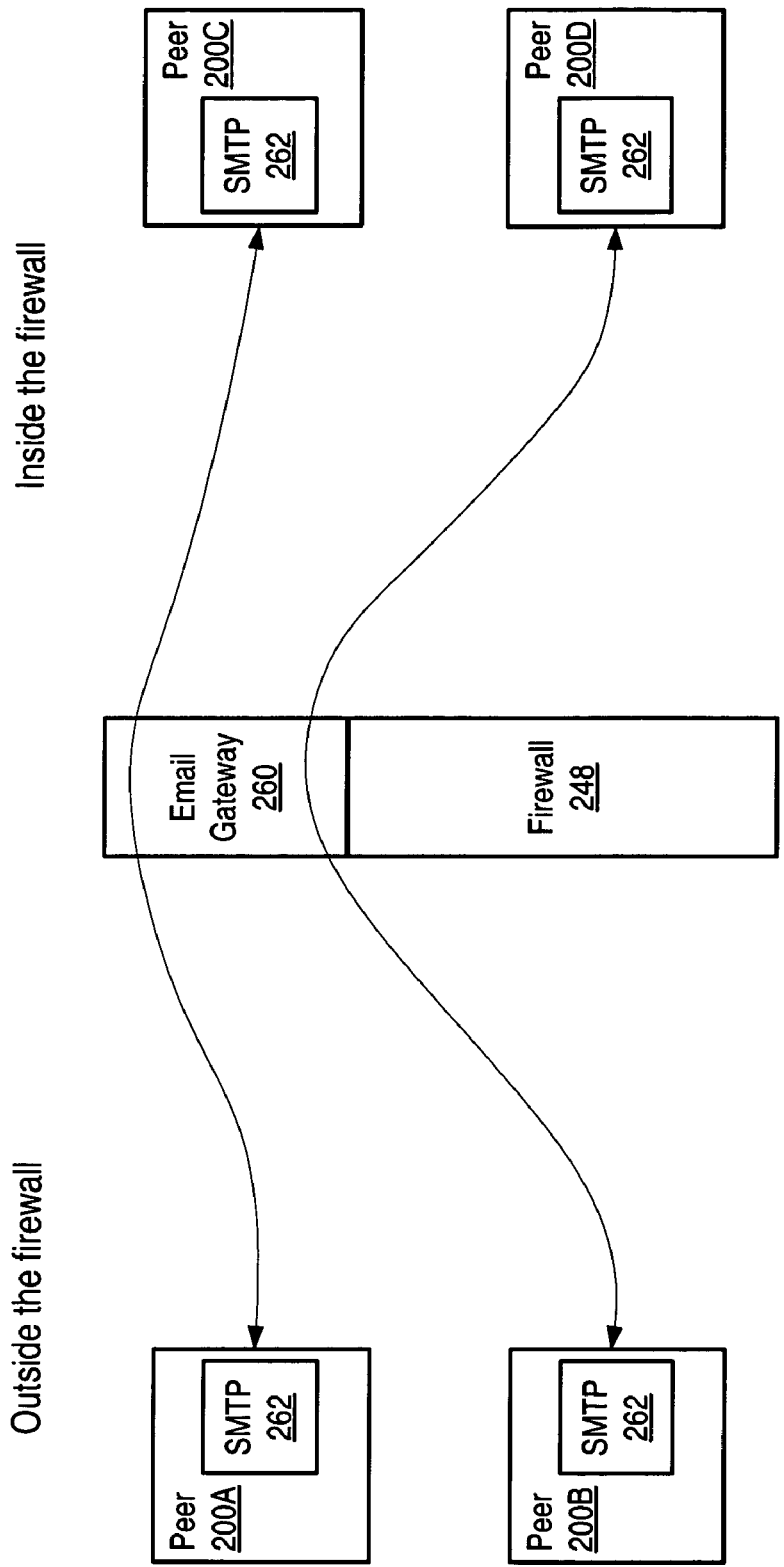
FIG. 21 illustrates email exchange through an email gateway according to one embodiment.

FIG. 21 illustrates email exchange through a firewall 248 via an email gateway 260 according to one embodiment. In this example, peers 200A and 200B outside the firewall 248 may exchange messages to peers 200C and 200D via the email gateway 260. In one embodiment, there may be an SMTP (Simple Mail Transfer Protocol) service 262 on each peer 200. In one embodiment, 100% peer-to-peer access may not be guaranteed. In one embodiment, inside the firewall 248, mail account administration may impose restrictions. In one embodiment, email addresses may not be required for all peers 200 outside of the firewall 248.

Figure 22:
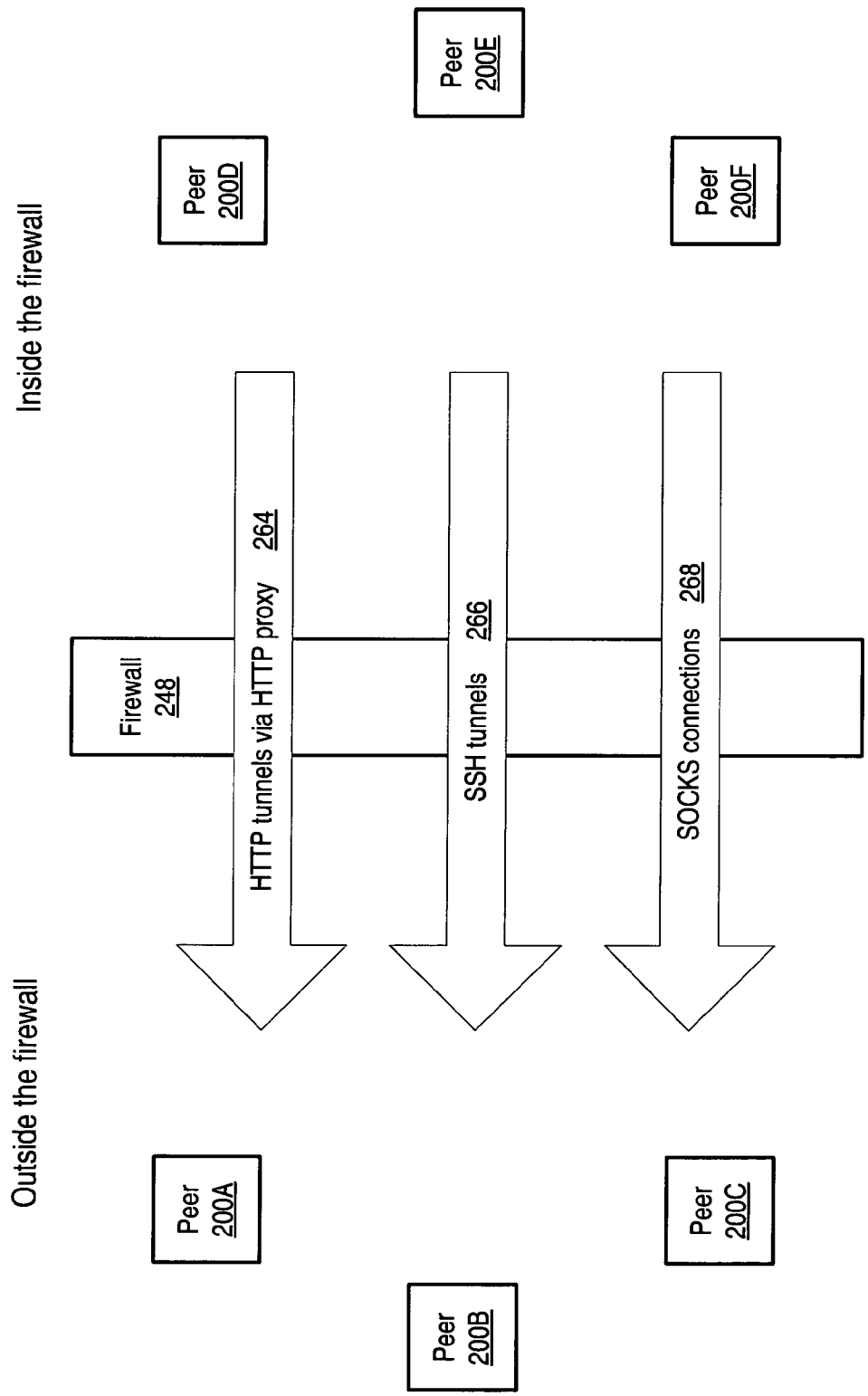
FIG. 22 illustrates traversing a firewall when access is initiated from the inside according to one embodiment.

FIG. 22 illustrates several methods of traversing a firewall 248 when access is initiated from the inside according to one embodiment. One or more peers 200 may be inside the firewall 248, and one or more peers 200 may be outside the firewall 248. In one embodiment, each peer 200 that needs to traverse firewall 248 may include a mini-HTTP server. In this embodiment, an HTTP proxy may be used to provide peer-to-peer HTTP tunnels 264 through firewall 248. In one embodiment, Secure Shell (SSH) tunnels 266 may be used to traverse firewall 248. One embodiment may support SOCKS connections 268 if SOCKS is supported in the firewall 248. SOCKS is typically used to telnet/ftp to the "outside." Other embodiments may include other methods of traversing firewalls.

In one embodiment, peer-to-peer platform core protocols may be used for firewall traversal. In one embodiment, the impact on the peer-to-peer protocol core may be minimized in the traversal method. In one embodiment, peers may use the "pure" core protocols for traversal whenever possible. In embodiments where the core protocols need to be extended for traversal, a "divide and conquer" technique may be used. In a divide and conquer technique, any new configurations (policies) may be isolated behind the firewall. A proxy or proxies may then be used to mediate with and bridge to the core protocols.

In one embodiment, peers on either side of the firewall may initiate peer group contact with full peer-to-peer protocol implementation including, but not limited to, the ability to initiate peer group discovery, the ability to join/leave peer groups, and the ability to create end-to-end pipes (cipher text data exchange when required).

Figure 23:
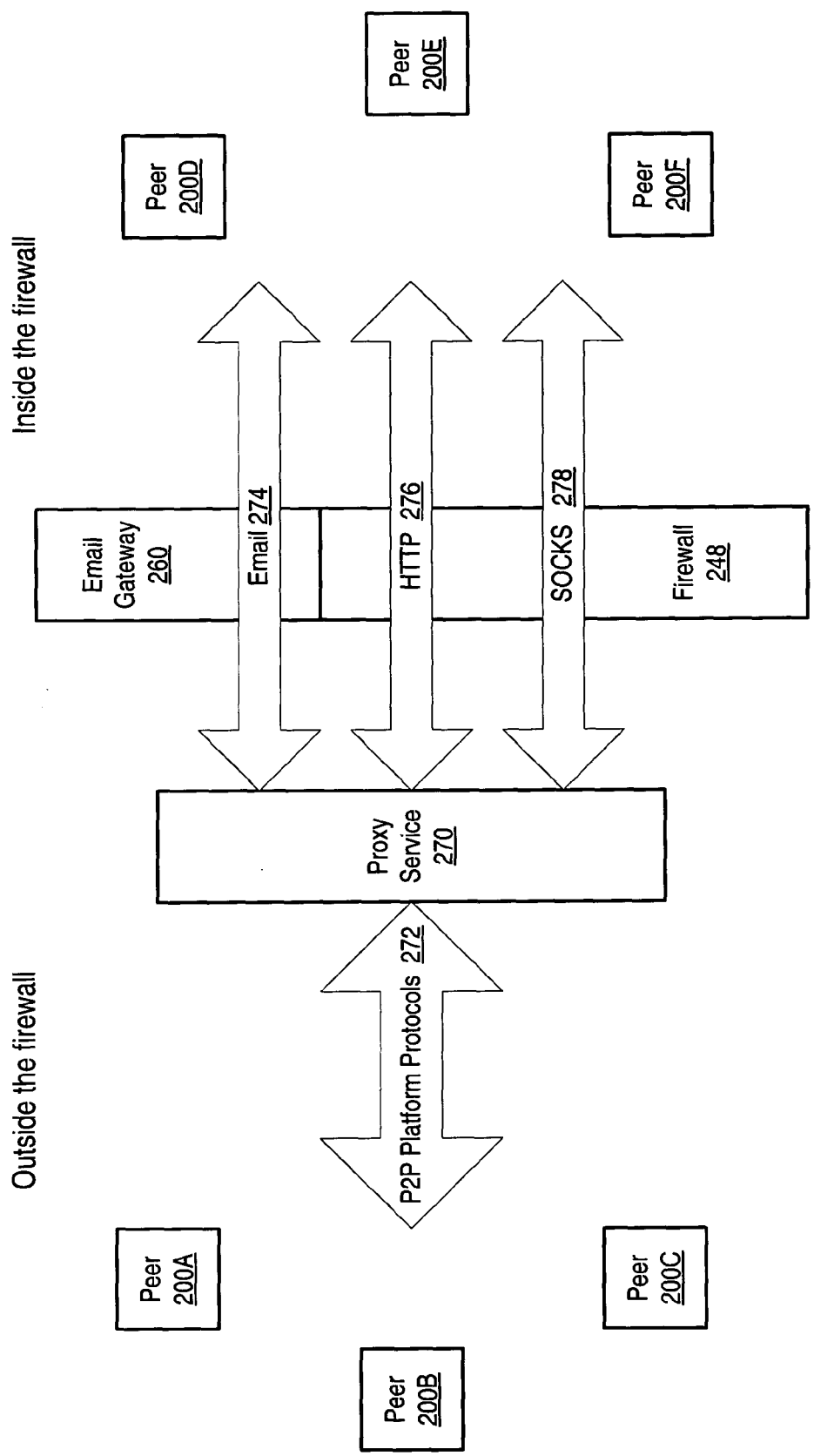
FIG. 23 illustrates embodiments of a peer-to-peer platform proxy service, and shows various aspects of the operation of the proxy service.

FIG. 23 illustrates one embodiment of a peer-to-peer platform proxy service 270, and shows various aspects of the operation of the proxy service. One or more peers 200 may be inside a firewall 248, and one or more peers 200 may be outside the firewall 248. Peer-to-peer platform proxy service 270 is also shown outside the firewall 248. Proxy service 270 may be used to enable peer 200 and peer group contact across firewall 248. Firewall 248 may include an email gateway 260. In one embodiment, the proxy service 270 may be used to bridge peer-to-peer platform protocols 272 with HTTP 274, email 276 and/or SOCKS 278. The proxy service 270 may allow peers 200 to send requests to communicate across firewall 248. Through the proxy service 270, peer-to-peer platform messages may be posted for delivery across the firewall 248. In one embodiment, the proxy service 270 may allow secure pipes to be established across the firewall 248 as necessary.

Figure 24:
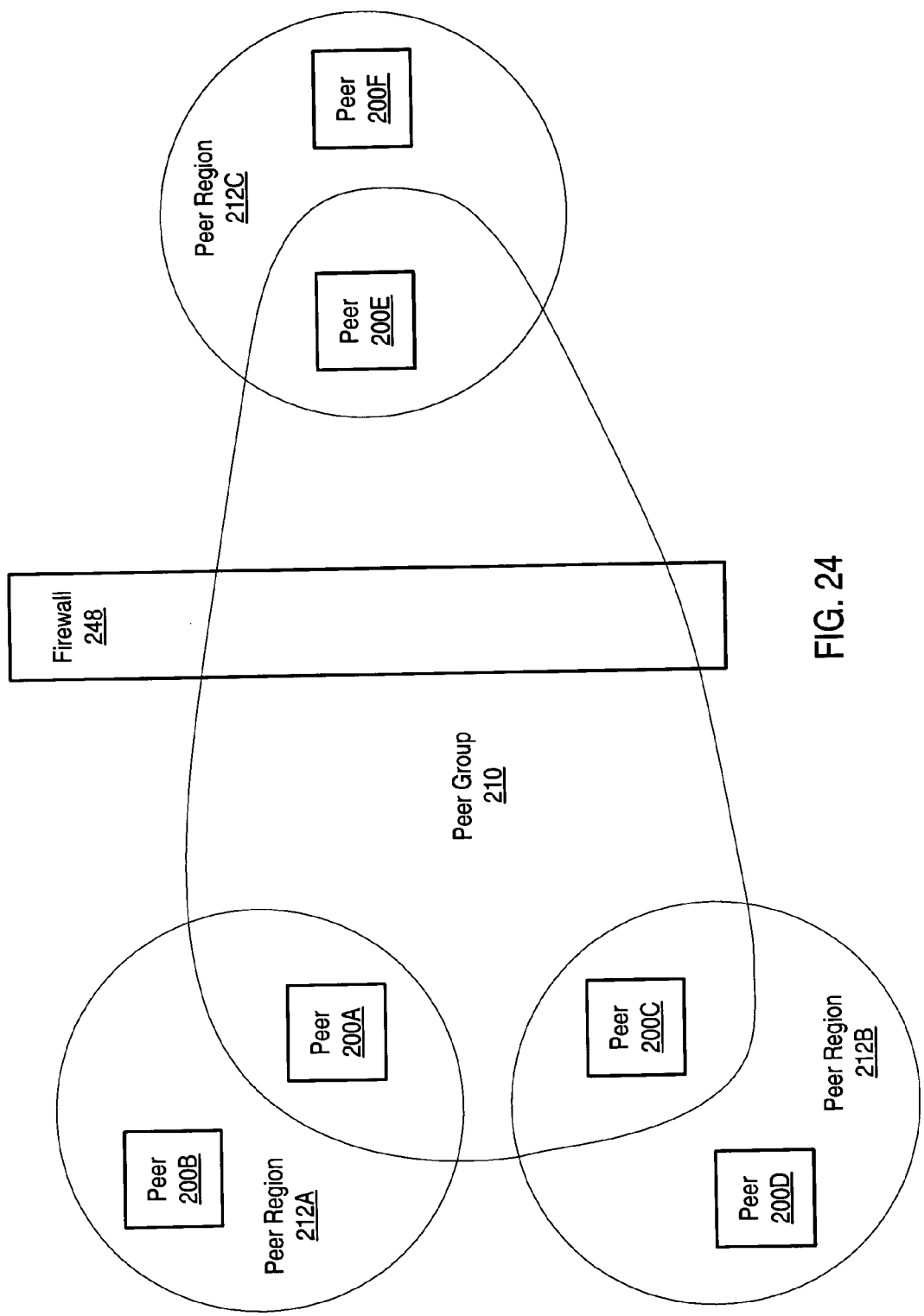
FIG. 24 illustrates a method of using a proxy service for peer group registration according to one embodiment.

FIG. 24 illustrates a method of using a proxy service for peer group registration according to one embodiment. The proxy service may permit firewall-independent peer group membership. Three peer regions 212 are shown, with two (region 212A and 212B) on one side of firewall 248 and one (region 212C) on the other side of firewall 248. A peer group 210 may be established that extends across the firewall 248 into regions 212A, 212B and 212C. One or more peers 200 in each region 212 may be members of the peer group 210.

Figure 25:
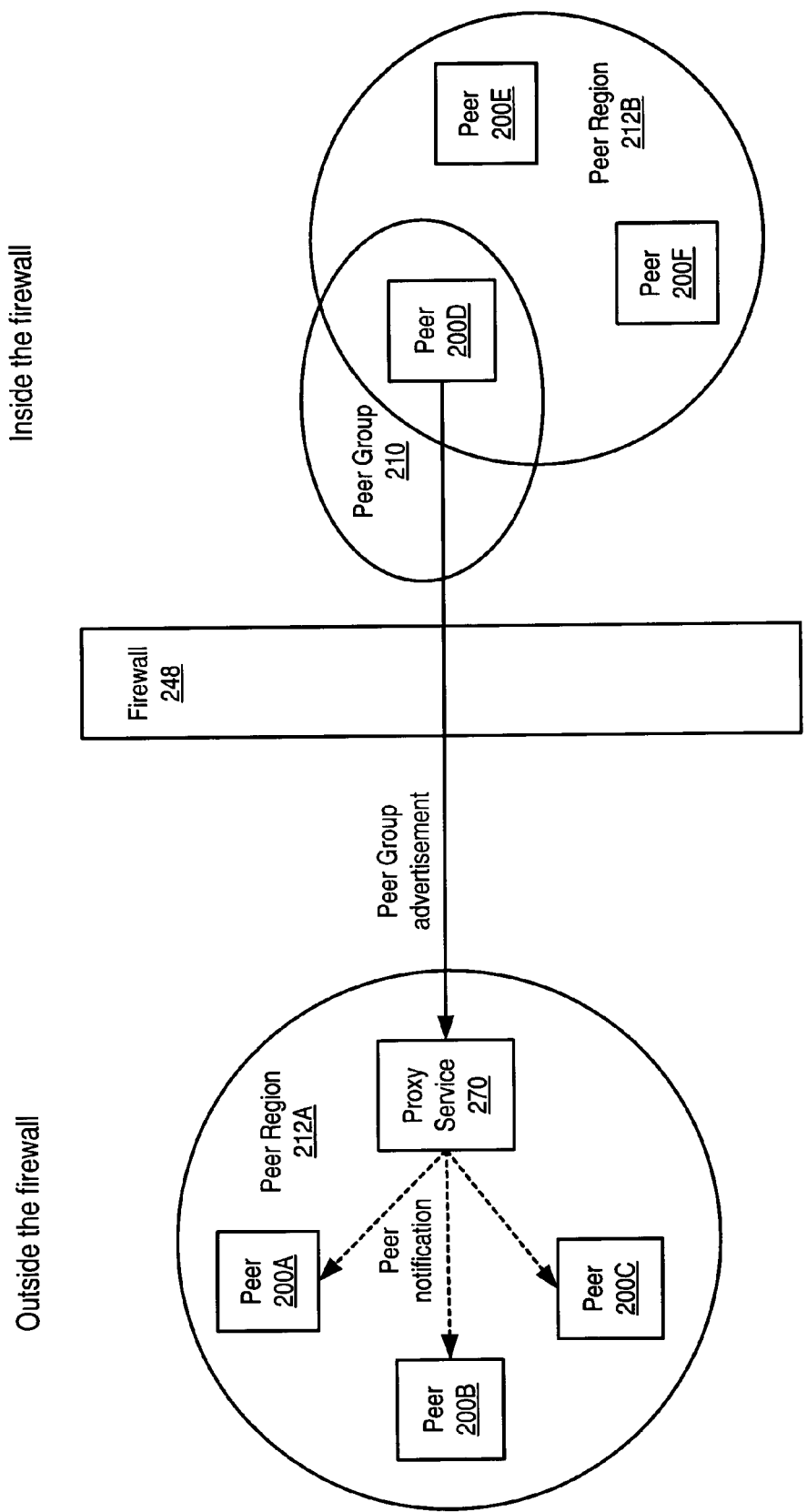
FIG. 25 illustrates peer group registration across a firewall according to one embodiment.

FIG. 25 illustrates peer group registration across a firewall according to one embodiment. Peer region 212A is shown outside of a firewall 248 and peer region 212B is behind the firewall 248. Peer region 212A includes a peer-to-peer platform proxy service 270 and several peers 200. In one embodiment, a peer 200 may be serving as a proxy peer that provides the proxy service 270. Peer region 212B includes several peers 200 behind the firewall 248. At some point, peer 200D in peer region 212B may form a peer group 210. An advertisement for the peer group 210 may be registered on the proxy service 270 in the region 212A. One or more peers 200 in region 212A may be notified of the newly registered peer group 200 by the proxy service 270. In one embodiment, the proxy service may also notify other known peer-to-peer platform proxy services in this or other regions 212, who in turn may notify other proxy services, and so on. Peers 200 in region 212A may then apply for membership in peer group 200.

Figure 26:
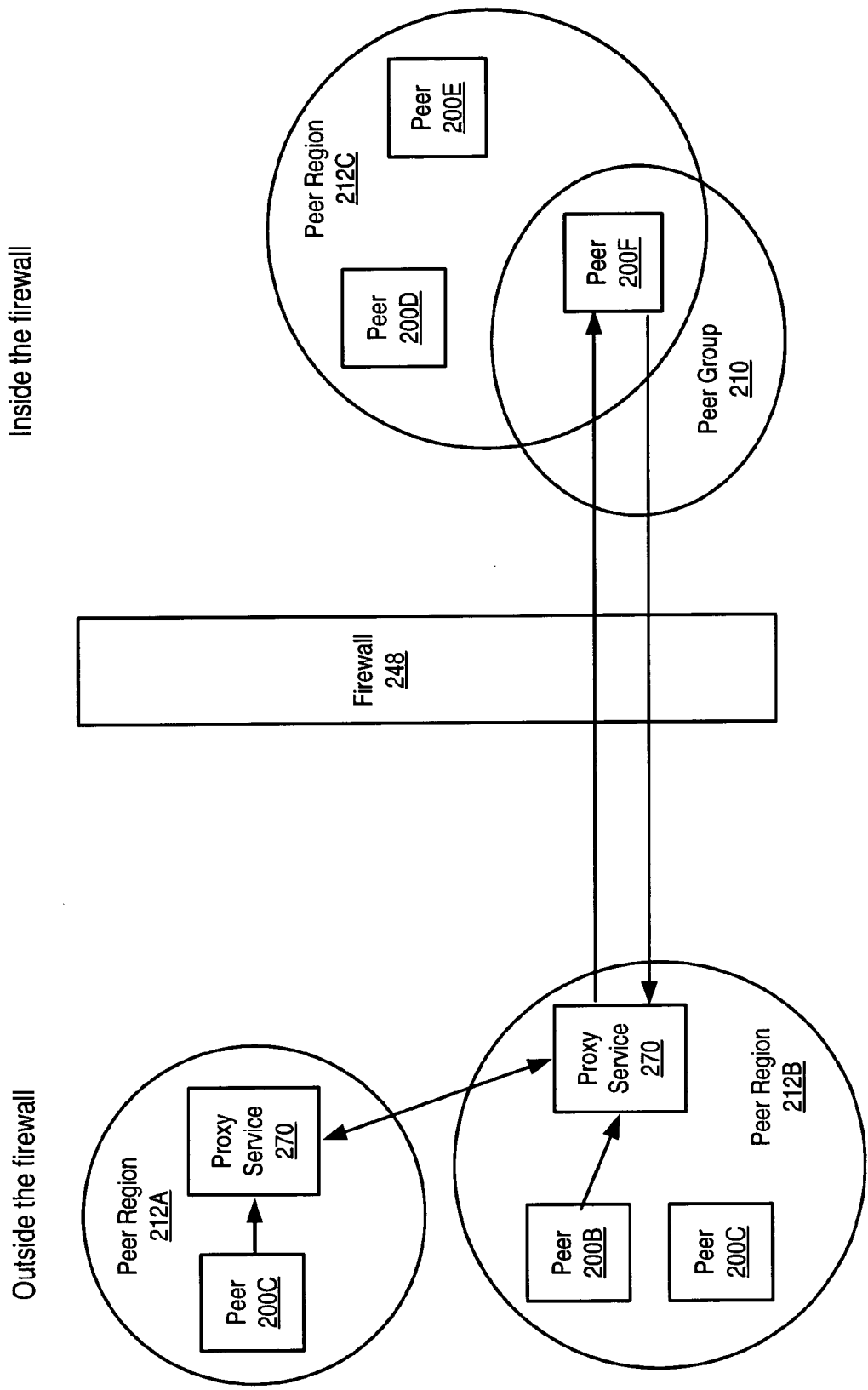
FIG. 26 illustrates a method of providing peer group membership through a proxy service according to one embodiment.

FIG. 26 illustrates a method of providing peer group membership through a peer-to-peer platform proxy service according to one embodiment. Peer regions 212A and 212B are shown outside of a firewall 248, and peer region 212C is behind the firewall 248. The two peer group regions 212 outside the firewall 248 each include a proxy service 270. At least one of the peers (peer 200F, in this example) in region 212C behind the firewall belongs to a peer group 210. The peer group 210 may be registered with the proxy services 270 in the regions 212A and 212B outside the firewall 248. A peer 200 in either of the regions outside the firewall may join the peer group 200 by proxy through the proxy service 270 in its region 212. Peers 200 in the regions 212 outside the firewall 248 that are members of the peer group 210 may also leave the peer group 210 through the proxy service 270. Membership information (e.g. included in peer group advertisements) for the peer group 200 may be synchronized on all known proxy services 270 outside the firewall 248. In one embodiment, a proxy service 270 may be a member peer of all locally registered peer groups 200.

Several levels of authentication may be provided in one or more embodiments of the peer-to-peer platform. Anonymous login may be provided in one embodiment. In one embodiment, a plain text login (user or user and password) may be provided. In one embodiment, login with privacy may be provided. In this embodiment, public key exchange may be used and/or a symmetric master key. In one embodiment, the login process may return a credential to the joining peer so that the peer may bypass the login process until the credential expires. One embodiment may provide a public key chain that may be used by registered users to eliminate public key exchanges and thus provides unauthenticated access. On embodiment may provide secure public key exchange with signed certificates.

Figure 27B:
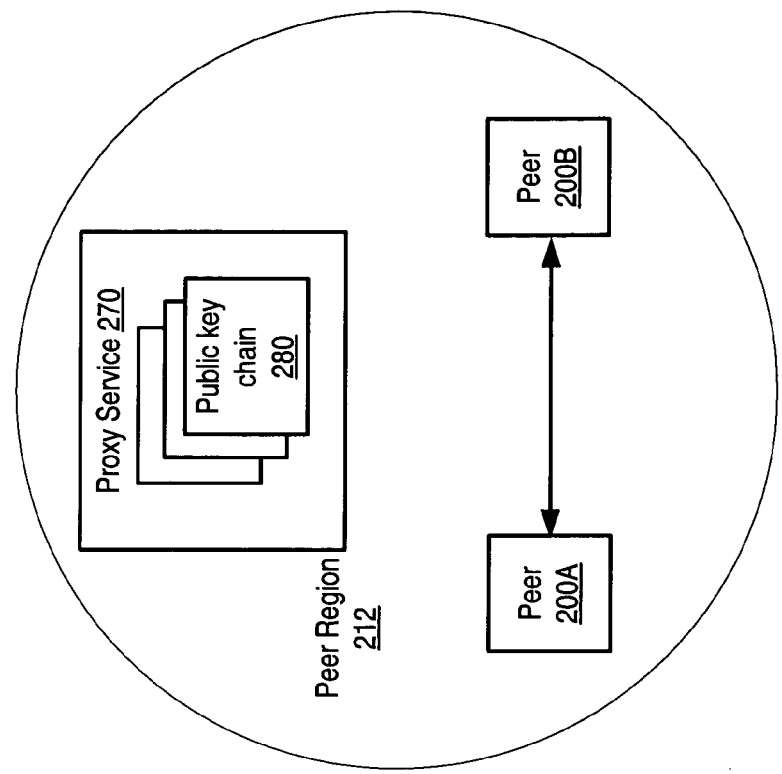
FIGS. 27A and 27B illustrate a method of providing privacy in the peer-to-peer platform according to one embodiment.
Figure 27A:
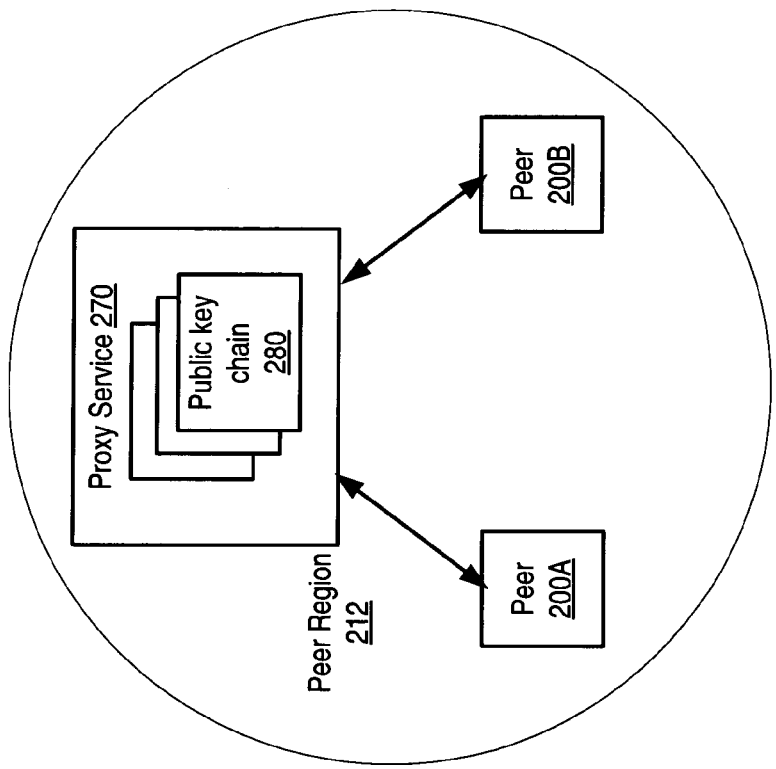

FIGS. 27A and 27B illustrate a method of providing privacy in the peer-to-peer platform according to one embodiment. FIG. 27A shows a peer region 212 with peers 200A and 200B and a peer-to-peer platform proxy service 270. Peers 200A and 200B may fetch and cache public keys from a public key chain 280 of the proxy service 270. The cached public keys may have expiration dates. Peers 200A and/or 200B may compute a master secret key for one or more of the public keys. Using the keys, cipher text may be exchanged between peers 200A and 200B in privacy as illustrated in FIG. 27B.

The peer-to-peer platform may include one or more methods for providing data integrity in the peer-to-peer environment. These methods may be used to insure that what is sent is what is received. One embodiment may use a standard hash on data (e.g. Secure Hash Algorithm (SHA-1) as defined by the Secure Hash Standard of the Federal Information Processing Standards Publication 180-1). A weak form and/or a strong form may be used in embodiments. In one embodiment, the weak form may use a public key ring and symmetric master to sign data. This method may work best between two peers each having the other's public key. In one embodiment, the strong form may use a symmetric key algorithm such as RSA (Rivest-Shamir-Adleman) and certificate authorities. In one embodiment, the peer-to-peer platform may provide a proxy public certificate authority service. The authority service may create, sign and distribute certificates (e.g. X509 certificates) for all peers on a public key chain. In one embodiment, the proxy service's public key may be resident on each proxied peer. Other embodiments may utilize other integrity methods.

Figure 28B:
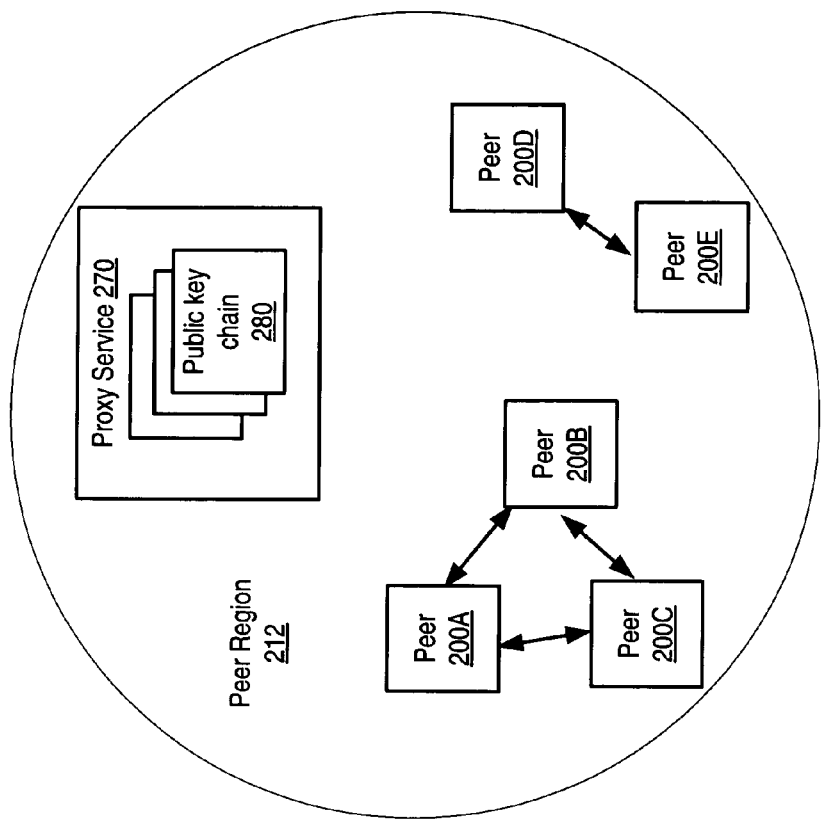
FIGS. 28A and 28B illustrate one embodiment of a method for using a peer-to-peer platform proxy service as a certificate authority.
Figure 28A:
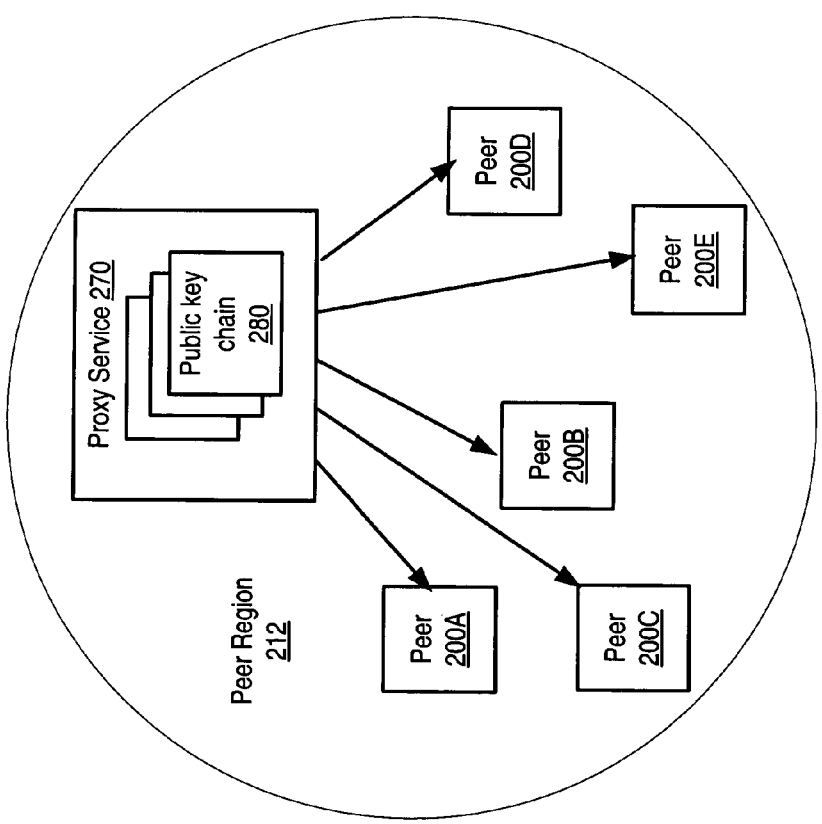

FIGS. 28A and 28B illustrate one embodiment of a method for using a peer-to-peer platform proxy service as a certificate authority. FIG. 28A illustrates a peer region 212 with several peers 200 and a proxy service 270. The proxy service 270 may distribute signed certificates in response to peer requests as required. The peers 200 may validate the proxy service 270 signature using a proxy service public key. As illustrated in FIG. 28B, when exchanging content with other peers 200, a peer 200 may sign the content with the destination peer's public key and distribute the cipher text.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
 a plurality of devices implementing a plurality of peer nodes coupled to a network, wherein each of the plurality of devices implements at least one peer node;
 at least one of the plurality of peer nodes, wherein each of the at least one of the plurality of peer nodes is configured as a publisher peer node for a plurality of contents cached on the respective peer node, wherein each publisher peer node is configured to publish one or more advertisements on the network, wherein each advertisement corresponds to a specific one of the plurality of contents cached on the peer node, and wherein each advertisement includes information for requesting the specific corresponding content;
 wherein to publish the one or more advertisements on the network the publisher peer node is configured to send the one or more advertisements to a rendezvous peer node, wherein the rendezvous peer node caches the one or more advertisements; and
 at least a subset of the plurality of peer nodes, wherein each peer node in the subset is configured to:
  discover published advertisements on the network from the rendezvous peer node by accessing the rendezvous peer node, wherein the published advertisements include two or more advertisements published by two or more content publisher peer nodes to advertise a particular content cached on each of the two or more content publisher peer nodes;
  determine one of the two or more content publisher peer nodes as logically nearest on the network, wherein a logically nearest peer node is a peer node to which communications over the network take the least time;
  request one or more specific contents each corresponding to one of the discovered advertisements in accordance with the information included in the respective advertisements; and
  request the particular content from the logically nearest content publisher peer node in accordance with the advertisement corresponding to the logically nearest content publisher peer node;
 wherein a publisher peer node that caches a content corresponding to a discovered advertisement is configured to provide the content corresponding to the discovered advertisement to a requesting peer node in response to a request for the content from the requesting peer node; and
 wherein the requesting peer node is configured to cache the content and become an additional content publisher peer node for the content corresponding to the discovered advertisement.

2. The system as recited in claim 1, wherein the at least a subset of the plurality of peer nodes are each further configured to cache content obtained from one or more of the content publisher peer nodes and become an additional content publisher peer node for the cached content.

3. The system as recited in claim 1, wherein the at least a subset of the plurality of peer nodes are each configured to:
 send a request for other content on the network;
 in response to the request:
  receive a portion of the other content from a first content publisher peer node that caches the other content; and
  receive another portion of the other content from a second content publisher peer node that also caches the other content.

4. The system as recited in claim 1, wherein the at least a subset of the plurality of peer nodes are each configured to:
 broadcast a request for other content on the network;
 receive a response to the request from each of two or more content publisher peer nodes that cache the other content;
 determine a logically nearest one of the two or more content publisher peer nodes that cache the other content on the network, wherein a logically nearest peer node is a peer node to which communications over the network take the least time; and
 get the other content from the logically nearest one of the two or more content publisher peer nodes that cache the other content.

5. The system as recited in claim 1, wherein the at least a subset of the plurality of peer nodes are member peers in a peer group.

6. The system as recited in claim 1, wherein the plurality of peer nodes is configured to participate in a peer-to-peer environment on the network in accordance with one or more peer-to-peer platform protocols for enabling the plurality of peer nodes to discover each other, communicate with each other, and cooperate with each other to form peer groups and share network resources in the peers-to-peer environment.

7. A system, comprising:
a primary content publisher peer node configured to cache user-requestable contents and publish the cached contents for access by other peer nodes on a network;
an edge content publisher peer node configured to:
receive a plurality of the user-requestable contents from the primary content publisher peer node;
cache the received plurality of contents; and
publish the received plurality of contents for access by one or more of the other peer nodes on the network for which the edge content publisher peer node is logically nearer to the one or more of the other peer nodes than the primary content publisher peer node such that communications over the network between the edge content publisher peer node and the other peer node take less time than communications over the network between the primary content publisher peer node and the other peer node regardless of physical proximity;
an edge peer node configured to:
send a request for particular content on the network in response to a user request for the particular content;
if the edge content publisher peer node is logically nearer to the edge peer node on the network than the primary content publisher peer node, receive the particular content from the edge content publisher peer node; and
if the primary content publisher peer node is logically nearer to the edge peer node on the network than the edge content publisher peer node, receive the particular content from the primary content publisher peer node;
wherein a logically nearer peer node is the peer node to which communications over the network take the least time.

8. The system as recited in claim 7, wherein the edge peer node is further configured to become an additional content publisher peer node for the particular content, wherein to become an additional content publisher peer node for the particular content, the edge peer node is configured to cache the particular content and publish the particular content for access by the other peer nodes on the network.

9. The system as recited in claim 7, further comprising wherein the edge peer node is configured to:
send a request for other content on the network in response to a user request for the other content;
receive a portion of the other content from the primary content publisher peer node in response to the request for other content;
receive a redirection to the edge content publisher peer node from the primary content publisher peer node; and
receive another portion of the other content from the edge content publisher peer node in response to the redirection.

10. The system as recited in claim 7, wherein the peer nodes are member peers in a peer group.

11. The system as recited in claim 7, wherein the peer nodes are configured to participate in a peer-to-peer environment on the network in accordance with one or more peer-to-peer platform protocols for enabling the peer nodes to discover each other, communicate with each other, and cooperate with each other to form peer groups and share network resources in the peer-to-peer environment.

12. A method, comprising:
a content publisher peer node caching a plurality of separately user-requestable contents and publishing the cached user-requestable contents for access by other peer nodes on a network;
one of the other peer nodes:
requesting a particular content on the network in response to a user request for the particular content;
receiving the particular content from the content publisher peer node;
caching the received particular content; and
publishing the received particular content for access by the other peer nodes on the network;
a different peer node requesting the particular content on the network in response to a user request for the particular content, wherein the different peer node is an edge peer node;
if the one of the other peer nodes is logically nearer to the different peer node on the network than the content publisher peer node, the different peer node receiving the particular content from the one of the other peer nodes; and
if the content publisher peer node is logically nearer to the different peer node on the network than the one of the other peer nodes, the different peer node receiving the particular content from the content publisher peer node;
wherein a logically nearer peer node is the peer node to which communications over the network take the least time.

13. The method as recited in claim 12, further comprising the different peer node caching the particular content and publishing the particular content for access by the other peer nodes on the network.

14. The method as recited in claim 12, further comprising:
the different peer node receiving a portion of the particular content from the content publisher peer node in response to the request;
the different peer node receiving a redirection to the one of the other peer nodes from the content publisher peer node; and
the different peer node receiving another portion of the particular content from the one of the other peer nodes in response to the redirection.

15. The method as recited in claim 12, wherein the content publisher peer node is a primary publisher of the particular content, and wherein the one of the other peer nodes is an edge publisher of the particular content.

16. The method as recited in claim 12, wherein the peer nodes are member peers in a peer group.

17. The method as recited in claim 12, wherein the peer nodes are configured to participate in a peer-to-peer networking environment implemented in accordance with one or more peer-to-peer platform protocols for enabling peer nodes to discover each other, communicate with each other, and cooperate with each other to form peer groups and share network resources in the peer-to-peer environment.

18. A non-transitory computer-accessible storage medium, comprising program instructions, wherein the program instructions are computer-executable to implement:
a content publisher peer node caching a plurality of separately user-requestable contents and publishing the cached user-requestable contents for access by other peer nodes on a network;

one of the other peer nodes:
  requesting a particular content on the network in response to a user request for the particular content;
  receiving the particular content from the content publisher peer node;
  caching the received particular content; and
  publishing the received particular content for access by the other peer nodes on the network;
a different peer node requesting the particular content on the network in response to a user request for the particular content, wherein the different peer node is an edge peer node;
if the one of the other peer nodes is logically nearer to the different peer node on the network than the content publisher peer node, the different peer node receiving the particular content from the one of the other peer nodes; and
if the content publisher peer node is logically nearer to the different peer node on the network than the one of the other peer nodes, the different peer node receiving the particular content from the content publisher peer node;
wherein a logically nearer peer node is the peer node to which communications over the network take the least time.

19. The non-transitory computer-accessible storage medium as recited in claim 18, wherein the program instructions are further computer-executable to implement the different peer node caching the particular content and publishing the particular content for access by the other peer nodes on the network.

20. The non-transitory computer-accessible storage medium as recited in claim 18, wherein the program instructions are further computer-executable to implement:
  the different peer node receiving a portion of the particular content from the content publisher peer node in response to the request;
  the different peer node receiving a redirection to the one of the other peer nodes from the content publisher peer node; and
  the different peer node receiving another portion of the particular content from the one of the other peer nodes in response to the redirection.

21. The non-transitory computer-accessible storage medium as recited in claim 18, wherein the content publisher peer node is a primary publisher of the particular content, and wherein the one of the other peer nodes is an edge publisher of the particular content.

22. The non-transitory computer-accessible storage medium as recited in claim 18, wherein the peer nodes are member peers in a peer group.

23. The non-transitory computer-accessible storage medium as recited in claim 18, wherein the peer nodes are configured to participate in a peer-to-peer networking environment implemented in accordance with one or more peer-to-peer platform protocols for enabling peer nodes to discover each other, communicate with each other, and cooperate with each other to form peer groups and share network resources in the peer-to-peer environment.

* * * * *